United States Patent
Mallet et al.

(10) Patent No.: US 10,520,644 B1
(45) Date of Patent: Dec. 31, 2019

(54) IMAGING A SUBSURFACE GEOLOGICAL MODEL AT A PAST INTERMEDIATE RESTORATION TIME

(71) Applicants: EMERSON PARADIGM HOLDING LLC, Houston, TX (US); Jean-Laurent Mallet, Luxembourg-Beggen (LU)

(72) Inventors: Jean-Laurent Mallet, Luxembourg-Beggen (LU); Anne-Laure Tertois, Saint Cyr la Riviere (FR)

(73) Assignee: EMERSON PARADIGM HOLDING LLC, Houston, TX (US)

( * ) Notice: Subject to any disclaimer, the term of this patent is extended or adjusted under 35 U.S.C. 154(b) by 0 days.

(21) Appl. No.: 16/244,544

(22) Filed: Jan. 10, 2019

(51) Int. Cl.
| | |
|---|---|
| *G06F 17/10* | (2006.01) |
| *G01V 99/00* | (2009.01) |
| *G01V 1/30* | (2006.01) |
| *G06T 17/05* | (2011.01) |
| *G06T 19/20* | (2011.01) |

(52) U.S. Cl.
CPC ............ *G01V 99/005* (2013.01); *G01V 1/302* (2013.01); *G06T 17/05* (2013.01); *G06T 19/20* (2013.01); *G01V 2210/66* (2013.01)

(58) Field of Classification Search
CPC ...... G01V 99/005; G01V 1/302; G06T 17/05; G06T 19/20
USPC .................................................. 703/2, 9, 10
See application file for complete search history.

(56) References Cited

U.S. PATENT DOCUMENTS

| | | | |
|---|---|---|---|
| 3,731,269 | A | 5/1973 | Judson et al. |
| 4,063,213 | A | 12/1977 | Itria et al. |
| 4,504,438 | A | 12/1985 | Levy et al. |
| 4,672,546 | A | 9/1987 | Flinchbaugh |
| 4,715,021 | A | 12/1987 | Dittert |
| 4,821,164 | A | 11/1989 | Swanson |
| 4,953,140 | A | 8/1990 | Dablain |

(Continued)

FOREIGN PATENT DOCUMENTS

| | | |
|---|---|---|
| AU | 2002329615 | 7/2002 |
| CA | 2 455 810 | 7/2005 |

(Continued)

OTHER PUBLICATIONS

U.S. Appl. No. 15/295,009, filed Oct. 17, 2016, Aldred, Rick.

(Continued)

*Primary Examiner* — Andre Pierre Louis
(74) *Attorney, Agent, or Firm* — Pearl Cohen Zedek Latzer Baratz LLP

(57) ABSTRACT

A system and method is provided for restoring a 3D tomographic model of the Earth's subsurface geology from the present-day to a past restoration time. Whereas at the present time all faults represent active discontinuities, at a past restoration time some faults have not yet formed. Accordingly, the restored model divides the fault network into τ-active faults (discontinuous surfaces for faults that intersect the layer deposited at the past restoration time) and τ-inactive faults (continuous surfaces for faults that do not intersect the layer deposited at the past restoration time). A new 3D restoration transformation is also provided that uses linear geological constraints to process the restoration model in less time and generate more accurate geological images.

22 Claims, 17 Drawing Sheets

(56) References Cited

U.S. PATENT DOCUMENTS

| | | |
|---|---|---|
| 4,964,099 A | 10/1990 | Carron |
| 4,991,095 A | 5/1991 | Swanson |
| 5,056,066 A | 8/1991 | Howard |
| 5,251,184 A | 5/1993 | Hildebrand et al. |
| 5,384,752 A | 1/1995 | Duren et al. |
| 5,465,323 A | 7/1995 | Mallet |
| 5,475,589 A | 12/1995 | Armitage |
| 5,570,106 A | 10/1996 | Viswanathan |
| 5,586,082 A | 12/1996 | Anderson et al. |
| 5,594,807 A | 1/1997 | Liu |
| 5,615,171 A | 3/1997 | Hildebrand |
| 5,675,551 A | 7/1997 | Sitoh |
| 5,671,136 A | 9/1997 | Willhoit |
| 5,844,799 A | 1/1998 | Joseph et al. |
| 5,740,342 A | 4/1998 | Kocberber |
| 5,862,513 A | 1/1999 | Mezzatesta et al. |
| 5,930,730 A | 7/1999 | Kirlin et al. |
| 5,987,388 A | 11/1999 | Crawford et al. |
| 5,995,907 A | 11/1999 | Van Bemmel et al. |
| 6,005,916 A | 12/1999 | Johnson et al. |
| 6,018,497 A | 1/2000 | Gunasekera |
| 6,018,498 A | 1/2000 | Neff et al. |
| 6,078,869 A | 6/2000 | Gunasekera |
| 6,106,561 A | 8/2000 | Farmer |
| 6,138,075 A | 10/2000 | Yost |
| 6,138,076 A | 10/2000 | Graf et al. |
| 6,151,555 A | 11/2000 | Van Bemmel et al. |
| 6,169,959 B1 | 1/2001 | Dragoset, Jr. |
| 6,256,599 B1 | 3/2001 | Tiribuzi |
| 6,236,942 B1 | 5/2001 | Bush |
| 6,278,949 B1 | 8/2001 | Alam |
| 6,246,963 B1 | 12/2001 | Cross et al. |
| 6,353,577 B1 | 5/2002 | Orban et al. |
| 6,388,947 B1 | 5/2002 | Washbourne et al. |
| 6,401,042 B1 | 6/2002 | Van Riel et al. |
| 6,411,903 B2 | 6/2002 | Bush |
| 6,480,790 B1 | 11/2002 | Calvert et al. |
| 6,597,995 B1 | 7/2003 | Cornu et al. |
| RE38,229 E | 8/2003 | Marfurt et al. |
| 6,665,615 B2 | 12/2003 | Van Riel et al. |
| 6,771,800 B2 | 3/2004 | Keskes et al. |
| 6,725,174 B2 | 4/2004 | Bouts et al. |
| 6,778,909 B1 | 8/2004 | Popovici et al. |
| 6,791,900 B2 | 9/2004 | Gillard et al. |
| 6,820,043 B2 | 11/2004 | Mallet et al. |
| 6,847,737 B1 | 1/2005 | Kouri et al. |
| 6,850,845 B2 | 1/2005 | Stark |
| 6,889,142 B2 | 3/2005 | Schonewille |
| 6,904,169 B2 | 7/2005 | Kalevo et al. |
| 7,024,021 B2 | 4/2006 | Dunn et al. |
| 7,089,166 B2 | 8/2006 | Malthe-Sorenssen et al. |
| 7,126,340 B1 | 10/2006 | Ameen et al. |
| 7,149,672 B2 | 12/2006 | Torkildsen |
| 7,184,991 B1 | 2/2007 | Wentland et al. |
| 7,227,983 B1 | 5/2007 | Christian et al. |
| 7,187,794 B2 | 6/2007 | Liang et al. |
| 7,248,539 B2 | 7/2007 | Borgos et al. |
| 7,280,918 B2 | 9/2007 | Williams |
| 7,446,765 B2 | 4/2008 | Dugge |
| 7,418,149 B2 | 8/2008 | Dinh et al. |
| 7,412,363 B2 | 12/2008 | Callegari |
| 7,480,205 B2 | 1/2009 | Wei et al. |
| 7,523,024 B2 | 4/2009 | Endres et al. |
| 7,561,992 B2 | 7/2009 | Leflon et al. |
| 7,616,213 B2 | 10/2009 | Chuter |
| 7,711,532 B2 | 4/2010 | Dulac et al. |
| 7,742,875 B2 | 6/2010 | Li et al. |
| 7,744,534 B2 | 6/2010 | Chalana et al. |
| 7,660,481 B2 | 9/2010 | Schaap et al. |
| 7,844,402 B2 | 11/2010 | Klein et al. |
| 7,991,717 B1 | 2/2011 | Bush |
| 7,970,593 B2 | 6/2011 | Roggero et al. |
| 8,010,294 B2 | 8/2011 | Dorn et al. |
| 8,022,947 B2 | 9/2011 | Wei et al. |
| 7,869,954 B2 | 11/2011 | Lennert et al. |
| 8,065,088 B2 | 11/2011 | Dorn et al. |
| 8,117,019 B2 | 2/2012 | Sun et al. |
| 8,120,991 B2 | 2/2012 | Koren et al. |
| 8,150,663 B2 | 3/2012 | Mallet |
| 8,165,817 B2 | 4/2012 | Betancourt et al. |
| 8,194,068 B1 | 6/2012 | Staten et al. |
| 8,274,859 B2 | 9/2012 | Maucec et al. |
| 8,219,370 B1 | 10/2012 | Diverdi et al. |
| 8,600,708 B1 | 3/2013 | Mallet et al. |
| 8,619,499 B2 | 12/2013 | Maucec et al. |
| 8,635,052 B1 | 1/2014 | Mallet et al. |
| 8,743,115 B1 | 3/2014 | Mallet et al. |
| 8,711,140 B1 | 4/2014 | Mallet |
| 8,731,875 B2 | 5/2014 | Hilliard et al. |
| 8,803,878 B2 | 12/2014 | Andersen et al. |
| 9,176,245 B2 | 3/2015 | Craig |
| 9,053,570 B1 | 6/2015 | Mallet et al. |
| 9,086,507 B2 | 7/2015 | Beasley et al. |
| 9,052,413 B1 | 9/2015 | Mallet et al. |
| 9,142,059 B1 | 9/2015 | Mallet et al. |
| 9,146,329 B2 | 9/2015 | Houck et al. |
| 9,229,130 B1 | 5/2016 | Mallet |
| 9,355,494 B1 | 5/2016 | Mallet et al. |
| 9,395,466 B1 | 7/2016 | Mallet et al. |
| 9,418,182 B2 | 8/2016 | Mallet |
| 9,477,010 B2 | 10/2016 | Mallet |
| 9,524,590 B1 | 12/2016 | Mallet |
| 9,536,022 B1 | 3/2017 | Tertois et al. |
| 9,697,621 B2 | 7/2017 | Palandri et al. |
| 9,759,826 B2 | 9/2017 | Mallet et al. |
| 9,846,260 B2 | 12/2017 | Mallet |
| 2001/0036294 A1 | 1/2001 | Keskes et al. |
| 2002/0022930 A1 | 2/2002 | Bouts et al. |
| 2002/0032550 A1 | 3/2002 | Ward et al. |
| 2002/0038201 A1 | 3/2002 | Balaven et al. |
| 2002/0099504 A1 | 7/2002 | Cross et al. |
| 2003/0018436 A1 | 1/2003 | Stark |
| 2003/0023383 A1 | 1/2003 | Stark et al. |
| 2003/0112704 A1 | 6/2003 | Goff et al. |
| 2003/0132934 A1 | 7/2003 | Fremming |
| 2003/0216897 A1 | 11/2003 | Endres et al. |
| 2004/0153247 A1 | 5/2004 | Czernuszenko et al. |
| 2004/0122640 A1 | 6/2004 | Dusterhoft |
| 2004/0193960 A1 | 9/2004 | Vassilev |
| 2004/0204859 A1 | 10/2004 | Knobloch |
| 2004/0260476 A1 | 12/2004 | Borgos et al. |
| 2004/0267454 A1 | 12/2004 | Granjeon |
| 2005/0114831 A1 | 5/2005 | Callegari et al. |
| 2005/0203375 A1 | 9/2005 | Willis et al. |
| 2005/0216197 A1 | 9/2005 | Zamora et al. |
| 2005/0228623 A1 | 10/2005 | Leflon et al. |
| 2006/0025976 A1 | 2/2006 | Kennon et al. |
| 2006/0004522 A1 | 5/2006 | Cacas |
| 2006/0133206 A1 | 6/2006 | Barnes |
| 2006/0122780 A1 | 8/2006 | Cohen et al. |
| 2006/0203613 A1 | 9/2006 | Thomsen |
| 2006/0253759 A1 | 9/2006 | Wei |
| 2006/0235666 A1 | 10/2006 | Assa et al. |
| 2007/0024623 A1 | 1/2007 | Dugge |
| 2007/0118293 A1 | 5/2007 | Adams |
| 2007/0168169 A1 | 7/2007 | Neave |
| 2007/0230268 A1 | 10/2007 | Hoogeveen et al. |
| 2007/0239414 A1 | 11/2007 | Song et al. |
| 2008/0015784 A1 | 1/2008 | Dorn et al. |
| 2008/0021684 A1 | 1/2008 | Dulac et al. |
| 2008/0243447 A1 | 2/2008 | Roggero et al. |
| 2008/0243452 A1 | 2/2008 | Bowers et al. |
| 2008/0243454 A1 | 2/2008 | Mallet |
| 2008/0088621 A1 | 4/2008 | Grimaud et al. |
| 2008/0273421 A1 | 6/2008 | Koren et al. |
| 2008/0109168 A1 | 8/2008 | Koren et al. |
| 2008/0232694 A1 | 9/2008 | Sulatycke |
| 2009/0116338 A1 | 5/2009 | Hoetz |
| 2009/0119076 A1 | 5/2009 | Madatov et al. |
| 2009/0119082 A1 | 5/2009 | Fitzpatrick et al. |
| 2009/0122060 A1 | 5/2009 | Porat et al. |
| 2009/0132170 A1 | 5/2009 | Krueger et al. |
| 2009/0157322 A1 | 6/2009 | Levin |
| 2009/0192717 A1 | 7/2009 | Iversen et al. |

(56) References Cited

U.S. PATENT DOCUMENTS

| | | |
|---|---|---|
| 2009/0204332 A1 | 8/2009 | Lomask et al. |
| 2009/0204377 A1 | 8/2009 | Wagoner et al. |
| 2009/0230969 A1 | 9/2009 | Hall et al. |
| 2009/0231955 A1 | 9/2009 | Barnes |
| 2009/0265152 A1 | 10/2009 | Cacas et al. |
| 2009/0303233 A1 | 10/2009 | Lin et al. |
| 2009/0070079 A1 | 12/2009 | Harada |
| 2009/0299637 A1 | 12/2009 | Dasgupta |
| 2010/0223039 A1 | 2/2010 | Maliassov |
| 2010/0053161 A1 | 4/2010 | Chuter |
| 2010/0156920 A1 | 6/2010 | Shin et al. |
| 2010/0186950 A1 | 7/2010 | Neelamani et al. |
| 2010/0256964 A1 | 7/2010 | Lee et al. |
| 2010/0245347 A1 | 9/2010 | Dorn et al. |
| 2010/0246322 A1 | 9/2010 | Welker |
| 2010/0250210 A1 | 9/2010 | Dorn et al. |
| 2010/0299117 A1 | 11/2010 | Bjerkholt |
| 2010/0332139 A1 | 12/2010 | Bruun et al. |
| 2011/0015910 A1 | 1/2011 | Ran et al. |
| 2011/0044546 A1 | 2/2011 | Pan et al. |
| 2011/0054857 A1 | 3/2011 | Moguchaya |
| 2011/0071799 A1 | 3/2011 | Slotte |
| 2011/0106507 A1 | 5/2011 | Lepage |
| 2011/0115787 A1 | 5/2011 | Kadlec |
| 2011/0120702 A1 | 5/2011 | Craig |
| 2011/0170373 A1 | 7/2011 | Hsu et al. |
| 2011/0264430 A1 | 10/2011 | Tapscott et al. |
| 2011/0310101 A1 | 12/2011 | Prange et al. |
| 2011/0313745 A1 | 12/2011 | Mezghani et al. |
| 2012/0014218 A1 | 1/2012 | Houck et al. |
| 2012/0022837 A1 | 1/2012 | Asbury et al. |
| 2012/0026167 A1 | 2/2012 | Ran et al. |
| 2012/0037379 A1 | 2/2012 | Hilliard et al. |
| 2012/0072116 A1 | 3/2012 | Dorn et al. |
| 2012/0265510 A1 | 10/2012 | Lepage |
| 2012/0290274 A1 | 11/2012 | Seningen |
| 2012/0318500 A1 | 12/2012 | Urbancic et al. |
| 2013/0262052 A1 | 3/2013 | Mallet et al. |
| 2013/0124161 A1 | 5/2013 | Poudret et al. |
| 2013/0231903 A1 | 5/2013 | Li et al. |
| 2013/0231910 A1 | 5/2013 | Kumar et al. |
| 2013/0144532 A1 | 6/2013 | Williams et al. |
| 2013/0151215 A1 | 6/2013 | Mustapha |
| 2013/0204598 A1 | 8/2013 | Mallet |
| 2013/0211796 A1 | 8/2013 | Aquelet |
| 2013/0215712 A1 | 8/2013 | Geiser et al. |
| 2013/0246031 A1 | 9/2013 | Wu et al. |
| 2013/0238297 A1 | 12/2013 | Lepage et al. |
| 2013/0333483 A1 | 12/2013 | Horoshenkov et al. |
| 2014/0076543 A1 | 3/2014 | Ejofodomi et al. |
| 2014/0136158 A1 | 5/2014 | Hegazy et al. |
| 2014/0136171 A1 | 5/2014 | Sword, Jr. et al. |
| 2014/0207430 A1 | 7/2014 | Li et al. |
| 2015/0120262 A1 | 4/2015 | Dulac et al. |
| 2015/0009215 A1 | 8/2015 | Vallikkat Thachaparambil et al. |
| 2015/0260016 A1 | 9/2015 | Fung et al. |
| 2015/0276979 A1 | 10/2015 | Hugot et al. |
| 2015/0293260 A1 | 10/2015 | Ghayour et al. |
| 2016/0124113 A1 | 5/2016 | Bi et al. |
| 2016/0124117 A1 | 5/2016 | Huang et al. |
| 2016/0154130 A1 | 6/2016 | Koren et al. |
| 2016/0298427 A1* | 10/2016 | Kauerauf ............ G01V 99/005 |
| 2016/0370482 A1 | 12/2016 | Mallet et al. |
| 2017/0184760 A1 | 6/2017 | Li et al. |
| 2017/0293041 A1 | 10/2017 | Mallet et al. |
| 2017/0299770 A1 | 10/2017 | Brewer et al. |
| 2017/0330373 A1* | 11/2017 | Medwedeff .......... G01V 99/005 |
| 2018/0067229 A1 | 5/2018 | Li et al. |
| 2018/0143337 A1 | 5/2018 | Koren et al. |

FOREIGN PATENT DOCUMENTS

| | | |
|---|---|---|
| EP | 1 429 157 | 6/2004 |
| EP | 2 317 348 | 5/2011 |
| EP | 2 560 030 | 2/2013 |
| EP | 2 778 725 A2 | 9/2014 |
| FR | 2 987 903 | 9/2013 |
| GB | 2 444 506 | 6/2008 |
| GB | 2 444 167 | 3/2011 |
| RU | 2 145 100 | 1/2000 |
| WO | WO 1999/041676 | 8/1999 |
| WO | WO 2003/009003 | 1/2003 |
| WO | WO 2003/050766 | 6/2003 |
| WO | WO 2004/038654 | 5/2004 |
| WO | WO 2006/007466 | 1/2006 |
| WO | WO 2008/005690 | 1/2008 |
| WO | WO 2011/024161 | 3/2011 |
| WO | WO 2011/077227 | 6/2011 |
| WO | WO 2013/015764 | 1/2013 |
| WO | WO 2013/028237 | 2/2013 |

OTHER PUBLICATIONS

U.S. Appl. No. 16/282,077, filed Feb. 21, 2019, Hollander et al.

Admasu et al., "Automatic Method for Correlating Horizons across Faults in 3D Seismic Data", 2004, Proceedings of the 2004 IEEE Computer Society Conference on Computer Vision and Pattern Recognition, pp. 1-6.

Bakker, "Image Structure Analysis for Seismic Interpretation," doctoral thesis, publicly defended on Jun. 4, 2002.

Barbosa et al., "Gravity Inversion of Basement Relief using Approximate Equality Constraints on Depths", 1997, Geophysics, vol. 62, No. 6, pp. 1745-1757.

Calcagno et al., "Geological Modelling from Field Data and Geological Knowledge Part I. Modelling Method Coupling 3D Potential-Field Interpolation and Geological Rules", 2008, Physics of the Earth and Planetary Interiors, vol. 171, pp. 147-157.

Carr et al., "Reconstruction and Representation of 3D Objects with Radial Basis Functions," ACM SIGGRAPH 2001, ACM Press New York, Computer Graphics Proceedings, pp. 67-76, 2001 (ISBN 1-58113-374-X).

Cary, "Common-offset-vector Gathers: an Alternative to Cross-spreads for Wide-azimuth 3-D surveys", SEG Annual Meeting, Society of Exploration Geophysicists, 1999, pp. 1-4.

Caumon et al. "Building and Editing a Sealed Geological Model," Mathematical Geology, vol. 36, No. 4, May 2004; pp. 405-424.

Caumon et al., "Elements for Stochastic Structural Perturbation of Stratigraphic Models," Proc. Petroleum Geostatistics, Sep. 10-14, 2007.

Caumon et al., "Surface-Based 3D Modeling of Geological Structures", 2009, Mathematical Geosciences, vol. 41, pp. 927-945.

Caumon, et al., "Three-Dimensional Implicit Stratigraphic Model Building From Remote Sensing Data on Tetrahedral Meshes: Theory and Application to a Regional Model of La Popa Bsin, NE Mexico", IEEE Transactions on Geoscience and Remote Sensing, vol. 51, No. 3, Mar. 2013, pp. 1613-1621.

Chih-Ping, et al., "Flower Plot: A new tool for smart Survey Design", SEG Expanded Abstracts, Oct. 6, 2002, pp. 1-2.

Chiles et al., "Modelling the Geometry of Geological Units and its Uncertainty in 3D From Structural Data: The Potential-Field Method," Orebody Modelling and Strategic Mine Planning, pp. 313-320, Nov. 22-24, 2004.

Cignoni et al., "Multiresolution Representation and Visualization of Volume Data," IEEE Transactions on Visualizations and Computer Graphics; 3(4), Oct.-Dec. 1997; pp. 352-369.

Claerbout, "Fundamentals of Geophysical Data Processing with Applications to Petroleum Prospecting," Blackwell Scientific Publications, 1985.

Clawson et al., "The Value of 3D Seismic Attributes for Illuminating Deep Water Deposits by Seismic Forward Modeling of the Brushy Canyon Formation," 2003 SEG Annual Meeting, Oct. 26-31, 2003, Dallas, Texas (only Abstract submitted).

Cotesta et al. (Jan. 2007). "Application of Scientific Visualisation-Stress Control on Permeability Anisotropy in Moderately Fractured Rock" In 1st Canada-US Rock Mechanics Symposium. American Rock Mechanics Association. (Year: 2007).

(56) References Cited

OTHER PUBLICATIONS

Courrioux et al., "3D Volumetric modelling of Cadomian Terranes (Northern Brittany, France): an automatic method using Voronoi diagrams," Tectonophysics 331(1-2), Feb. 2001, pp. 181-196.
Cremeens et al., "On Chronostratigraphy, Pedostratigraphy, and Archaeological Context," Soil Science Society of America, 1995.
Cuisenaire, "Distance Transformations: Fast Algorithms and Applications to Medical Image Processing," Laboratoire de Telecommunications et Teledetection; Oct. 1999.
Davies, "Conditioning Poorly Sampled Gathers for Pre and Post Stack Analysis," Journal of Conference Abstracts, 2002, vol. 7, No. 2, pp. 142-143.
De Groot et al., "How to create and use 3D Wheeler transformed seismic volumes," SEG/New Orleans 2006 Annual Meeting, pp. 1038-1042.
Dorn et al., "Chapter 13, Interpreting 3-D Seismic Data", The Leading Edge, Sep. 1998, pp. 1261-1272.
Dulac, "Advances in chrono-stratigraphic interpretation modeling," First Break, vol. 27, Oct. 2009.
Durand-Riard et al., "Balanced restoration of geological volumes with relaxed meshing constraints," Computers and Geosciences, vol. 36, No. 4, Apr. 1, 2010, pp. 441-452.
Durlofsky, "Upscaling and Gridding of Fine Scale Geological Models for Flow Simulation", 8th International Forum on Reservoir Simulation, Iles Borromees, Stresa, Italy, Jun. 20-24, 2005, pp. 1-59.
EAGE Daily News, "Paradigm is Redefining Interpretation," 2011 EAGE Conference & Exhibition, May 2011.
Edelstein-Keshet, "Integral Calculus: Mathematics 103", University of British Columbia (Jan. 2, 2010), pp. 61-80.
Egan et al., "Three-Dimensional Modelling and Visualisation in Structural Geology: New Techniques for the Restoration and Balancing of Volumes", Proceeding of GIG Conference on Geological Visualisation—the Intelligent Picture?, British Geological Survey, Oct. 1996.
Ernens, "Finite Element Methods with exact geometry representation", Master of Science Thesis, Delft University of Technology, Nov. 2011. 128 pages.
Escalona et al., Sequence-stratigraphic analysis of Eocene clastic foreland basin deposits in central Lake Maracaibo using high-resolution well correlation and 3-D seismic data, AAPG Bulletin, vol. 90, No. 4, pp. 581-623 (Apr. 2006).
Field, "Some Advantages of the Logarithmic Scale in Statistical Diagrams", Journal of Political Economy, vol. 25, No. 8, Oct. 1917, pp. 805-841.
Frank et al., "3D-reconstruction of Complex Geological Interfaces from Irregularly Distributed and Noisy Point Data," Computers & Geosciences 33 (2007) 932-943.
Frank, "Advanced Visualization and Modeling of Tetrahedral Meshes", Doctorat de l'Institut National Polytechnique de Lorraine; pp. 1-140; 2006.
"Geomodeling Releases VisualVoxAT™ 6.2 Software— Introducing the Geobody Paintbrush," New Release, Sep. 24, 2007, printed from http://www.geomodeling.com/news_22.htm; on Oct. 5, 2009.
Gerstner, Fast Multiresolution Extraction of Multiple Transparent Isosurfaces, 2001, in Data Visualization 2001, editor D.S. Ebert et al., Springer-Verlag, pp. 35-44.
Gibbons, "Seismic Applications Overview," Society of Petroleum Engineers, Aug. 2003, 9 pages.
GoCAD Suite 2.5 2007 User Guide: Parts 1-12, published Sep. 15, 2007.
Gringarten, et al., New Grids for Robust Reservoir Modeling, SPE 116649, 2008, pp. 1-11.
Harris et al., "Fault Seal Risk Volumes—A New Tool for the Assessment of Reservoir Compartmentalisation" 71st EAGE Conference & Exhibition—Amsterdam, The Netherlands, Jun. 8-11, 2009.
Hasle 2007 (Geometric Modelling, Numerical Simulation, and Optimization: Applied Mathematics at SINTEF, Springer 2007).

Hauge, V.L. et al. "Flow-based grid coarsening for transport simulations." in: Proceedings of ECMOR XII—12th European Conference on the Mathematics of Oil Recovery (EAGE), Oxford, UK, Sep. 6-9, 2010.
Herrmann, et al., "Shot-Based Pre-Processing Solution for Wide Azimuth Towed Streamer Datasets", EAGE, First Break, vol. 25, Mar. 2007, pp. 71-76.
Jayr et al., "The Need for a Correct Geological Modelling Support: the Advent of the UVT-Transform," First Break, vol. 26, Oct. 2008, pp. 73-79.
Jentzsch et al., "Kinematic subsidence modelling of the Lower Rhine Basin," Netherlands Journal of Geosciences, vol. 81, No. 2, pp. 231-239 (2002).
Jones, "Data structures for three-dimensional spatial information systems in geology," Int. J. Geographical Information Systems, 3(1), 1989, pp. 15-30.
Kass et al., "Snakes: Active Contour Models", International Journal of Computer Vision, Dordrecht, NL, Jan. 1, 1988, pp. 321-331, XP000675014.
Labrunye et al., "New 3D flattened space for seismic interpretation," SEG Houston 2009 International Exposition and Annual Meeting, pp. 1132-1136.
Launay et al., "A flexible iterative method for 3D reconstruction from X-ray projections." Pattern Recognition, 1996, Proceedings of the 13th International Conference on. vol. 3. IEEE, 1996.
Ledez, "Modelisation D'Objets Naturals par Formulation Implicite," Ecole Nationale Superieure de Geologie; Oct. 28, 2003; pp. 1-158, see English Abstract.
Lee et al., "Pitfalls in Seismic Data Flattening," The Leading Edge, Feb. 2001, pp. 161-164.
Lepage, "Generation de Maillages Tridimensionnels Pour la Simulation des Phenomenes Physiques en Geosciences," Ecole National Superieure de Geologie; Oct. 28, 2003; pp. 1-224, see English Abstract.
Lessenger et al., "An Inverse Stratigraphic Simulation Model: Is stratigraphic Inversion Possible?" Energy Exploration & Exploitation, vol. 14, No. 6, pp. 627-637 (1996) (only Abstract submitted).
Ligtenberg et al., "Sequence Stratigraphic Interpretation in the Wheeler Transformed (Flattened) Seismic Domain," EAGE 68th Conference & Exhibition—Vienna, Austria, Jun. 12-15, 2006.
Liwanag, "Reservoir Characterisation, Introducing geological processes in reservoir models," GEO ExPro Oct. 2005, pp. 28-32.
Lixin, "Topological relations embodied in a generalized tri-prism (GTP) model for a 3D geoscience modeling system," Computers & Geosciences 30(4), May 2004, pp. 405-418.
Lomask et al., "Flattening Without Picking," Geophysics, vol. 71, No. 4, pp. P13-P20, Jul.-Aug. 2006.
Lomask et al., "Flattening Without Picking," Stanford Exploration Project, Report 112, Nov. 11, 2002, pp. 141-150.
Lomask et al., "Update on Flattening Without Picking," Stanford Exploration Project, Report 120, May 3, 2005, pp. 137-159.
Lomask, "Flattening 3-D Seismic Cubes Without Picking," Jan. 8, 2004.
Mallet, "Discrete Smooth Interpolation in Geometric Modelling," Journal of Computer Aided Design, 24(4), 1992, pp. 178-191.
Mallet, "Space-Time Mathematical Framework for Sedimentary Geology," Journal of Mathematical Geology, vol. 36, No. 1, Jan. 2004, pp. 1-32.
Mallet, Geomodeling (Book chapter); Chapter 6; Oxford University Press; cover and preface pages and pp. 244-315, 2002.
Mallet, Geomodeling, Oxford University Press, Sep. 22, 2004 (ISBN 0-19-514460.0).
Mallet, J.L., "Elements of Mathematical Sedimentary Geology: the GeoChron Model." 2014, 374 pages, EAGE publishing company.
Mallet, Jean-Laurent, "Numerical Earth Models," 2008 EAGE Publications, ISBN 978-90-7378163-4.
McInerney et al., "Improved 3D Geology Modelling using an Implicit Function Interpolator and Forward Modelling of Potential Field Data". 2007, Proceedings of Exploration 07: Fifth Decennial International Conference on Mineral Exploration, pp. 919-922.
Medeiros et al., "Geophysical Inversion using Approximate Equality Constraints", 1996, Geophysics, vol. 61, No. 6, pp. 1678-1688.

(56) References Cited

OTHER PUBLICATIONS

Medwedeff et al., "Practical and Efficient Three Dimensional Structural Restoration using "Geological Knowledge-Oriented" Earth Models", 2016 RING-MEETING, Sep. 2016, Nancy, France.
Mitchum et al., "Seismic Stratigraphy and Global Changes of Sea Level, Part 6: Stratigraphic Interpretation of Seismic Reflection Patterns in Depositional Sequences," received Jan. 6, 1977, accepted Jun. 13, 1977, pp. 117-133.
Monsen et al., "Geological process controlled interpretation based on 3D Wheeler diagram generation," SEG/San Antonio 2007 Annual Meeting pp. 885-889.
Moretti et al., "KINE3D: a New 3D Restoration Method Based on a Mixed Approach Linking Geometry and Geomechanics," Oil & Gas Science and Techonology, Rev. IFP, vol. 61 (2006), No. 2, pp. 277-289.
Moyen et al., "3D-Parameterization of the 3D Geological Space—The Geochron Model," 9th European Conference on the Mathematics of Oil Recovery—Cannes, France, Geological Modelling I, Aug. 30-Sep. 2, 2004.
Moyen, "Paramétrisation 3D de L'espace en Géologie Sédimentaire: Le Modèle Geochron Thèse," Doctorat de l'Institut National Polytechnique de Lorraine, Jun. 9, 2005 (original text in French and English translation).
Müller et al. "3D Restoration and mechanical properties," from structure.harvard.edu/projects/restoration, Harvard University Structural Geology and Earth Resources Group, 2005, accessed on Aug. 21, 2012.
Muttalib, "PHZ3113 Notes", Scalar Fields, Nov. 5, 2007.
O'Malley et al., "Towards Robust Structure-Based Enhancement and Horizon Picking in 3-D Seismic Data," Proceedings of the 2004 IEEE Computer Society Conference on Computer Vision and Pattern Recognition (CVPR '04), 2004, vol. 2, pp. 482-489.
Oil-Gas SKUA—A Step Change in Modeling, 3D Modeling, Scandinavian Oil—Gas Magazine No. 9/10, 2008.
OpendTect Workflows Documentation version 4.2, dGB Beheer B.V., dGB Earth Sciences, Copyright © 2002-2010.
Oyedele, "3D High Resolution Seismic Imaging of Middle-Late Quaternary Depositional Systems, Southeast Green Canyon, Sigsbee Escarpment, Gulf of Mexico," Thesis presented to the Faculty of the Dept. of Geosciences at the University of Houston, Aug. 2005.
Paradigm Geotechnology: GOCAD Suite 2.5 User Guide: Part VIII 3D Grid Building: pp. 1-284; Jan. 2008.
Paradigm™ SKUA™ 2009 User Guide: Part V Seismic Interpretation Modeling, Feb. 3, 2009.
Prevost et al., Unstructured 3D Gridding and Upscaling for Coarse Modeling of Geometrically Complex Reservoirs, 9th European Conference on the Mathematics of Oil Recovery—Cannes, France, Aug. 30-Sep. 2, 2004, pp. 1-8.
Ravve et al., "Spherical gridding in seismic imaging," SEG Technical Program Expanded Abstracts, Sep. 23, 2009, (pp. 2388-2392, XP055129074.
Rouby et al., "3-D Restoration of Complexly Folded and Faulted Surfaces Using Multiple Unfolding Mechanisms," AAPG Bulletin, vol. 84, No. 6, pp. 805-829 (Jun. 2000).
Rumpf et al., "A Continuous Skeletonization Method Based on Level Sets," Joint Europgraphics—IEEE Symposium on Visualization, pp. 151-157 (2002).
Saito, "New Algorithms for Euclidean Distance Transformation of an n-Dimensional Digitized Picture with Applications," Pattern Recognition, 27(11) 1994; pp. 1551-1565.
Samson et al., "Quantifying the Impact of Structural Uncertainties on Gross-Rock vol. Estimates", SPE 35535, 1996, pp. 381-392.
Sederberg et al., "Free-Form Deformation of Solid Geometric Models", SIGGRAPH, vol. 20, No. 4, pp. 151-160, Aug. 1986.
Smith et al., "SUSAN—A New Approach to Low Level Image Processing," International Journal of Computer Vision, 1997, vol. 23, Iss. 1, pp. 45-78.
Souche, "Integration of fault models into unstructured grids and geo-chronological space," 24th GOCAD Meeting, Jun. 2004.

Stark, "Generation of a 3D seismic 'Wheeler Diagram' from a high resolution Age Volume," pp. 782-786, submitted to the 75th Annual SEG Convention, Nov. 6-11, 2005, Houston, TX.
Stark, "Relative Geologic Time (Age) Volumes—Relating Every Seismic Sample to a Geologically Reasonable Horizon," The Leading Edge, Sep. 2004, pp. 928-932.
Svensson, U. (2001). "A continuum representation of fracture networks. Part I: Method and basic test cases". Journal of Hydrology, 250(1-4), 170-186. (Year: 2001).
Terraspark Geosciences, "Geoscience Interpretation Visualization Consortium (GIVC)," http://terraspark.com/GIVC.consort, accessed on May 11, 2006.
Tertois et al., "Editing faults within tetrahedral vol. models in real time," In Jolley, S.J., Barr, D. Walsh, J.J. et al. (Eds), Structurally Complex Reservoirs, London, UK: Geological Society of London, Special Publications, 2007; v. 292; p. 89-101 (doi: 10.1144/SP292.5).
Tertois et al., Real-time Tetrahedral Volume Editing Accounting for Discontinuities; Ninth International Conference on Computer Aided Design and Computer Graphics (CAD/CG 2005) 2005 IEEE; pp. 1-6.
Tertois, "Création et édition de modèles géologiques par Champs de potential: Application au modele GeoChron—Thèse," Institut National Polytechnique de Lorraine, Jun. 21, 2007, see English Abstract.
Tertois, Preserving Geological Information During Real-Time Editing of Faults in Tetrahedral Models; Int. Assoc. For Mathematical Geology XIth International Congress Universite de Liege—Belgium; 2006; S14-24; pp. 1-4.
Theisel, Holger., "Vector Field Curvature and Applications"., PhD Dissertation., Universifat Rostock., Nov. 1995.
Thomsen et al., "Towards a balanced 3D Kinematic Model of a Faulted Domain—the Bergheim Open Pit Mine, Lower Rhine Basin," Netherlands Journal of Geoscience, vol. 81, No. 2, pp. 241-250 (2002).
Thore et al., Integration of Structural Uncertainties into Reservoir grid construction—70th EAGE Conference & Exhibition—Rome, Italy, Jun. 9-12, 2008.
Trudgill et al., "Integrating 3D Seismic Data with Structural Restorations to Elucidate the Evolution of a Stepped Counter-Regional Salt System, Eastern Louisiana Shelf, Northern Gulf of Mexico," pp. 165-176. (2004).
Urbancic et al. (Feb. 2014). "Enhancing recovery in shales through stimulation of pre-existing fracture networks", In SPE Hydraulic Fracturing Technology Conference. Society of Petroleum Engineers. (Year: 2014).
Vermeer, "3-D Seismic Survey Design", Society of Exploration Geophysicists, Tulsa, Oklahoma, USA, Geophysical References Series No. 12, 2002.
Vermeer, "3D Seismic Survey Design", Society of Exploration Geophysicists, Tulsa, Oklahoma, USA, Second Edition, Geophysical References Series No. 12, 2012.
Voller, "Basic Control Volume Finite Element Methods for Fluid and Solids", IISc Research Monographs Series, 2009.
Volume Based Method (VBM) Horizon Modeler, http://support.software.slb.com/Knowledgebase/Pages/KBArticles/Petrel/KB6327229.aspx, meta data indicates document created Dec. 10, 2013.
Wen et al., "Use of Border Regions for Improved Permeability Upscaling," Mathematical Geology, 35(5), Jul. 2003; pp. 521-547.
Wikipedia, "Coordinate system", version from Jan. 5, 2012, URL: https://en.wikipedia.org/w/index.php?title=Coordinate_system&oldid=469704600.
Wood et al., "Applying Sequence Stratigraphy and Seismic Stratal Slice Technology in the Gulf of Mexico," GASTIPS, Lang et al. (Eds.), Winter 2003, vol. 9, No. 1, pp. 10-21.
Yang et al., Sediments, Facies Tracts, and Variations in Sedimentation Rates of Holocene Platform Carbonate Sediments and Associated Deposits, Northern Belize—Implications for "Representative" Sedimentation Rates; Journal of Sedimentary Research, vol. 74, No. 4, Jul. 2004, p. 498-512.
Zeng et al., "High-frequency Sequence Stratigraphy from Seismic Sedimentology: Applied to Miocene, Vermilion Block 50, Tiger Shoal Area Offshore Louisiana", AAPG Bulletin, Feb. 2004, vol. 88, No. 2, pp. 153-174 (only Abstract submitted).

(56) References Cited

OTHER PUBLICATIONS

Zeng et al., "Interpretive Advantages of 90 Degree-Phase Wavelets: Part 2—Seismic Applications," Geophysics, SEG, vol. 70, No. 3, May 2005-Jun. 2005. pp. C-17-C-24.
Zeng et al., "Seismic Frequency Control on Carbonate Seismic Stratigraphy: A Case Study of the Kingdom Abo Sequence, West Texas," AAPG Bulletin, vol. 87, Issue No. 2, pp. 273-293 (2003) (only Abstract submitted).
Zeng et al., "Stratal Slicing of Miocene-Pliocene Sediments in Vermilion Block 50-Tiger Shoal Area, Offshore Louisiana," The Leading Edge, Offshore Technology Special Section, vol. 20, No. 4, Apr. 2001, pp. 408-418.
Zeng et al., "Stratal Slicing, Part I and II: Read 3-D Seismic Data," Geophysics, vol. 63, No. 2 (Mar.-Apr. 1998); pp. 502-522.
Zeng et al., "Three-D Seismic Facies Imaging by Stratal Slicing of Miocene-Pliocene Sediments in Vermilion Block 50-Tiger Shoal Area, Offshore Louisiana," Secondary Gas Recovery, AAPG 2000.
Zeng et al., "Stratal Slicing and Seismic Facies Imaging," Bureau of Economic Geology, The University of Texas at Austin, 1998. (only Abstract submitted).
Zeng, "From Seismic Stratigraphy to Seismic Sedimentology: A Sensible Transition," GCAGS Transactions, vol. 51, pp. 413-420 (2001) (only Abstract submitted).
Zeng,"Stratal Slicing: Benefits and Challenges," The Leading Edge 29, 1040 (Sep. 2010).
Zhai, The Computer Mouse and Related Input Devices, Manuscript Version 6. Official copy "Mouse" in Berkshire Encyclopedia of Human-Computer Interaction, W.S. Bainbridge (ed). 2004, pp. 1-6.
Zhang, et al. "Percolation-theory and fuzzy rule-based probability estimation of fault leakage at geologic carbon sequestration sites", pp. 1447-1459, published online Mar. 18, 2009.
Zhao, "Based on three-dimensional geological modeling of geological section", School of Computer Science and Technology, 2011 IEEE, pp. 263-266.
Advisory Action issued for U.S. Appl. No. 14/211,744 dated Dec. 17, 2015.
Corrected Notice of Allowability for U.S. Appl. No. 15/262,124 dated Apr. 17, 2017.
Corrected Notice of Allowance issued for U.S. Appl. No. 14/860,084 dated Feb. 22, 2016.
Final Office Action issued for U.S. Appl. No. 13/458,264 dated Oct. 30, 2015.
Final Office Action issued for U.S. Appl. No. 13/458,264 dated Aug. 28, 2017.
Final Office Action issued for U.S. Appl. No. 13/458,264 dated Oct. 31, 2016.
Final Office Action issued for U.S. Appl. No. 13/461,361 dated Apr. 15, 2015.
Final Office Action issued for U.S. Appl. No. 13/461,361 dated Feb. 1, 2016.
Final Office Action issued for U.S. Appl. No. 14/211,744 dated May 4, 2016.
Final Office Action issued for U.S. Appl. No. 14/211,744 dated Sep. 14, 2015.
Final Office Action issued for U.S. Appl. No. 14/260,760, dated Nov. 14, 2014.
Final Office Action issued for U.S. Appl. No. 14/260,760, dated Nov. 25, 2014.
Final Office Action issued for U.S. Appl. No. 14/485,018 dated Mar. 8, 2018.
Final Office Action issued for U.S. Appl. No. 14/526,844 dated Mar. 27, 2018.
Final Office Action issued for U.S. Appl. No. 14/743,118 dated Apr. 22, 2016.
Final Office Action issued for U.S. Appl. No. 15/203,633 dated Oct. 5, 2018.
Final Office Action issued for U.S. Appl. No. 15/205,281 dated Apr. 13, 2018.
Final Office Action issued for U.S. Appl. No. 15/299,566 dated Mar. 20, 2018.
Final Office Action issued for U.S. Appl. No. 15/631,368 dated Mar. 21, 2018.
Final Office Action issued for U.S. Appl. No. 14/961,049 dated Nov. 19, 2018.
Final Office Action issued for U.S. Appl. No. 15/203,633 dated Dec. 8, 2017.
Final Office Action issued for U.S. Appl. No. 15/258,776 dated Dec. 1, 2017.
Notice of Allowability issued for U.S. Appl. No. 13/458,264 dated Jul. 9, 2018.
Notice of Allowability issued for U.S. Appl. No. 14/312,018 dated Mar. 7, 2017.
Notice of Allowability issued for U.S. Appl. No. 14/743,118 dated Feb. 17, 2017.
Notice of Allowability issued for U.S. Appl. No. 14/961,049 dated Feb. 25, 2019.
Notice of Allowability issued for U.S. Appl. No. 15/166,438 dated Mar. 24, 2017.
Notice of Allowability issued for U.S. Appl. No. 15/203,633 dated Mar. 5, 2019.
Notice of Allowability issued for U.S. Appl. No. 15/205,281 dated Feb. 25, 2019.
Notice of Allowability issued for U.S. Appl. No. 15/271,389 dated Jun. 29, 2017.
Notice of Allowability issued for U.S. Appl. No. 15/299,566 dated Feb. 11, 2019.
Notice of Allowability issued for U.S. Appl. No. 15/631,368 dated Feb. 26, 2018.
Notice of Allowability issued for U.S. Appl. No. 15/812,604 dated Nov. 28, 2018.
Notice of Allowability issued for U.S. Appl. No. 15/875,332 dated Feb. 12, 2019.
Notice of Allowability issued for U.S. Appl. No. 16/020,622 dated Feb. 20, 2019.
Notice of Allowability issued for U.S. Appl. No. 15/600,485 dated Sep. 28, 2017.
Notice of Allowability issued for U.S. Appl. No. 15/669,454 dated Mar. 21, 2018.
Notice of Allowance issued for U.S. Appl. No. 14/605,152 dated Mar. 21, 2016.
Notice of Allowance issued for U.S. Appl. No. 11/628,559, dated Dec. 24, 2009.
Notice of Allowance issued for U.S. Appl. No. 12/042,417 dated Aug. 7, 2015.
Notice of Allowance issued for U.S. Appl. No. 12/791,352 dated Dec. 6, 2013.
Notice of Allowance issued for U.S. Appl. No. 12/791,370, dated Jul. 22, 2013.
Notice of Allowance issued for U.S. Appl. No. 12/909,981 dated Jan. 27, 2014.
Notice of Allowance issued for U.S. Appl. No. 13/461,361 dated Sep. 12, 2016.
Notice of Allowance issued for U.S. Appl. No. 13/836,502 dated Apr. 11, 2016.
Notice of Allowance issued for U.S. Appl. No. 14/059,099, dated Oct. 21, 2014.
Notice of Allowance issued for U.S. Appl. No. 14/065,713, dated Oct. 20, 2014.
Notice of Allowance issued for U.S. Appl. No. 14/189,505, dated Sep. 3, 2015.
Notice of Allowance issued for U.S. Appl. No. 14/211,744 dated Jun. 22, 2016.
Notice of Allowance issued for U.S. Appl. No. 14/260,760, dated May 22, 2015.
Notice of Allowance issued for U.S. Appl. No. 14/260,778 dated May 25, 2016.
Notice of Allowance issued for U.S. Appl. No. 14/260,778 dated Feb. 9, 2016.
Notice of Allowance issued for U.S. Appl. No. 14/743,118 dated Jan. 27, 2017.
Notice of Allowance issued for U.S. Appl. No. 14/860,084 dated Feb. 1, 2016.

(56) References Cited

OTHER PUBLICATIONS

Notice of Allowance issued for U.S. Appl. No. 14/987,158 dated Aug. 31, 2016.
Notice of Allowance issued for U.S. Appl. No. 13/862,680 dated May 5, 2016.
Office Action issued for U.S. Appl. No. 14/605,152 dated Nov. 16, 2015.
Office Action issued for U.S. Appl. No. 11/628,559, dated Jun. 24, 2009.
Office Action issued for U.S. Appl. No. 12/791,370, dated Nov. 26, 2012.
Office Action issued for U.S. Appl. No. 12/791,483, dated Aug. 17, 2012.
Office Action issued for U.S. Appl. No. 12/909,981 dated Aug. 19, 2013.
Office Action issued for U.S. Appl. No. 13/458,264 dated Apr. 22, 2015.
Office Action issued for U.S. Appl. No. 13/458,264 dated May 13, 2016.
Office Action issued for U.S. Appl. No. 13/461,361 dated Dec. 16, 2014.
Office Action issued for U.S. Appl. No. 13/461,361 dated Aug. 4, 2015.
Office Action issued for U.S. Appl. No. 13/836,502 dated Nov. 25, 2015.
Office Action issued for U.S. Appl. No. 13/862,680 dated Dec. 21, 2015.
Office Action issued for U.S. Appl. No. 14/059,099, dated Jun. 16, 2014.
Office Action issued for U.S. Appl. No. 14/065,713, dated Jun. 19, 2014.
Office Action issued for U.S. Appl. No. 14/189,505, dated Dec. 4, 2014.
Office Action issued for U.S. Appl. No. 14/189,505, dated May 21, 2015.
Office Action issued for U.S. Appl. No. 14/211,744 dated Feb. 24, 2015.
Office Action issued for U.S. Appl. No. 14/211,744 dated Jan. 14, 2016.
Office Action issued for U.S. Appl. No. 14/211,744, dated Jun. 3, 2014.
Office Action issued for U.S. Appl. No. 14/260,760, dated Jul. 9, 2014.
Office Action issued for U.S. Appl. No. 14/312,018 dated Aug. 17, 2016.
Office Action issued for U.S. Appl. No. 14/485,018 dated Aug. 9, 2018.
Office Action issued for U.S. Appl. No. 14/485,018 dated Jan. 10, 2019.
Office Action issued for U.S. Appl. No. 14/526,844 dated Sep. 21, 2018.
Office Action issued for U.S. Appl. No. 14/743,118 dated Dec. 4, 2015.
Office Action issued for U.S. Appl. No. 14/743,118 dated Sep. 9, 2016.
Office Action issued for U.S. Appl. No. 14/757,839 dated Aug. 9, 2018.
Office Action issued for U.S. Appl. No. 14/987,158 dated May 16, 2016.
Office Action issued for U.S. Appl. No. 15/166,438 dated Oct. 28, 2016.
Office Action issued for U.S. Appl. No. 15/203,633 dated May 2, 2018.
Office Action issued for U.S. Appl. No. 15/205,281 dated Sep. 17, 2018.
Office Action issued for U.S. Appl. No. 15/258,776 dated Jul. 16, 2018.
Office Action issued for U.S. Appl. No. 15/295,009 dated Nov. 16, 2018.
Office Action issued for U.S. Appl. No. 15/299,566 dated Sep. 7, 2018.
Office Action issued for U.S. Appl. No. 15/631,368 dated Aug. 31, 2018.
Office Action issued for U.S. Appl. No. 15/812,604 dated Jul. 11, 2018.
Office Action issued for U.S. Appl. No. 15/875,332 dated Dec. 13, 2018.
Office Action issued for U.S. Appl. No. 16/020,622 dated Oct. 11, 2018.
Office Action issued for U.S. Appl. No. 13/458,264 dated Jan. 4, 2018.
Office Action issued for U.S. Appl. No. 14/485,018 dated Aug. 9, 2017.
Office Action issued for U.S. Appl. No. 14/526,844 dated Sep. 15, 2017.
Office Action issued for U.S. Appl. No. 14/961,049 dated Mar. 22, 2018.
Office Action issued for U.S. Appl. No. 15/203,633 dated Jul. 12, 2017.
Office Action issued for U.S. Appl. No. 15/205,281 dated Nov. 13, 2017.
Office Action issued for U.S. Appl. No. 15/258,776 dated Jul. 11, 2017.
Office Action issued for U.S. Appl. No. 15/271,389 dated Mar. 24, 2017.
Office Action issued for U.S. Appl. No. 15/299,566 dated Oct. 19, 2017.
Office Action issued for U.S. Appl. No. 15/600,485 dated Sep. 8, 2017.
Office Action issued for U.S. Appl. No. 15/631,368 dated Oct. 13, 2017.
Office Action issued for U.S. Appl. No. 15/669,454 dated Nov. 22, 2017.
Supplemental Notice of Allowability issued for U.S. Appl. No. 12/791,370 dated Sep. 6, 2013.

* cited by examiner

IMAGING A SUBSURFACE GEOLOGICAL MODEL AT A PAST INTERMEDIATE RESTORATION TIME

FIELD OF THE INVENTION

Embodiments of the invention relate to the field of geological tomography for generating an image of the interior subsurface of the Earth based on geological data collected by transmitting a series of incident waves and receiving reflections of those waves across discontinuities in the subsurface. The incident and reflected waves are reconstituted by a 3D model to generate an image of the reflecting surfaces interior to the Earth. Accordingly, geological tomography allows geophysicists to "see inside" the Earth.

Embodiments of the invention further relate to geological restoration in which the tomographic images of the present day geology are transformed into images of the past geology, as it was configured at an intermediate restoration time in the past τ before the present day and after the start of deposition of the oldest subsurface layer being imaged. New techniques are proposed herein to improve both the accuracy and computational speed of generating those images of the past restored geology. Improved images may aid geoscientists exploring the subsurface geology for applications such as predicting tectonic motion or earthquakes, or by engineers in the mining or oil and gas industries.

BACKGROUND OF THE INVENTION

The accuracy of a geological model of the present day configuration of the subsurface of the Earth may be improved by "restoring" the model to a past intermediate time τ and checking model consistency at that time in the past. However, restoring geological models is a complex task and current methods are typically inefficient, requiring extensive processing resources and time, as well as inaccurate, relying on overτ-simplifications that induce errors to moderate the complexity of the task.

There is a longstanding need in the art to efficiently and accurately restore geological models from their present day geology to their past geology at restored past time τ.

SUMMARY OF EMBODIMENTS OF THE INVENTION

Some embodiments of the invention are directed to modeling restored geological models with τ-active and τ-inactive faults. In an embodiment of the invention, a system and method is provided for restoring a 3D model of the subsurface geology of the Earth from a present day geometry measured at a present time to a predicted past geometry at a past restoration time. The 3D model of the present day measured geometry comprising a network of faults may be received, wherein a fault is a discontinuity that divides fault blocks that slide in opposite directions tangential to the surface of the fault as time approaches a modeled time. A past restoration time τ may be selected that is prior to the present time and after a time when an oldest horizon surface in the 3D model was originally deposited. The network of faults may be divided into a subset of τ-active faults and a subset of τ-inactive faults, wherein a τ-active fault is a fault that is active at the past restoration time τ and a τ-inactive fault is a fault that is inactive at the past restoration time τ. A fault may be determined to be τ-active when the fault intersects a horizon Hτ that was originally deposited at the past restoration time τ and a fault may be determined to be τ-inactive when the fault does not intersect the horizon $H_\tau$ that was originally deposited at the past restoration time τ. The 3D model may be restored from the present day measured geometry to the predicted past geometry at the past restoration time τ by modeling each τ-active and τ-inactive fault differently. Each τ-active fault may be modeled to join end points of a horizon $H_\tau$ separated on opposite sides of the fault in the present day model to merge into the same position in the restored model by sliding the end points towards each other in a direction tangential to the surface of the τ-active fault. Each τ-inactive fault may be modeled to keep collocated points on opposite sides of the fault together.

Some embodiments of the invention are directed to modeling restored geological models with new restoration coordinates $u_\tau$, $v_\tau$, $t_\tau$. In an embodiment of the invention, a system and method is provided for restoring a 3D model of the subsurface geology of the Earth from a present day measured geometry to a predicted past geometry at a restoration time in the past τ. The 3D model of the present day geometry of the subsurface may be received, including one or more folded geological horizon surfaces. A value may be selected of a restoration time in the past τ before the present day and after a time an oldest horizon surface in the 3D model of the subsurface was deposited. The 3D model may be restored from the present day measured geometry to the predicted past geometry at the restoration time in the past τ using a 3D transformation. The vertical component of the 3D transformation may restore the geometry to the vertical coordinate $t_\tau$ such that: points along a horizon surface $H_\tau$ modeling sediment that was deposited at the selected restoration time in the past τ have a substantially constant value for the restored vertical coordinate $t_\tau$; and at any location in the 3D model, the restored vertical coordinate $t_\tau$ is equal to a sum of a first approximation $t'_\tau$ of the vertical coordinate and an error correction term $\varepsilon_\tau$, wherein the error correction term $\varepsilon_\tau$ is computed by solving a linear relationship in which a variation in the sum of the first approximation $t'_\tau$ of the vertical coordinate and the error correction term $\varepsilon_\tau$ between any two points separated by an infinitesimal difference in the direction of maximal variation of the sum is approximately equal to the distance between the points in the direction of maximal variation; and displaying an image of the restored 3D model of the subsurface geology of the Earth such that each point in the 3D model is positioned at the restored vertical coordinate $t_\tau$ as it was configured at the restoration time in the past τ.

BRIEF DESCRIPTION OF THE DRAWINGS

The principles and operation of the system, apparatus, and method according to embodiments of the present invention may be better understood with reference to the drawings, and the following description, it being understood that these drawings are given for illustrative purposes only and are not meant to be limiting.

Figure 1:
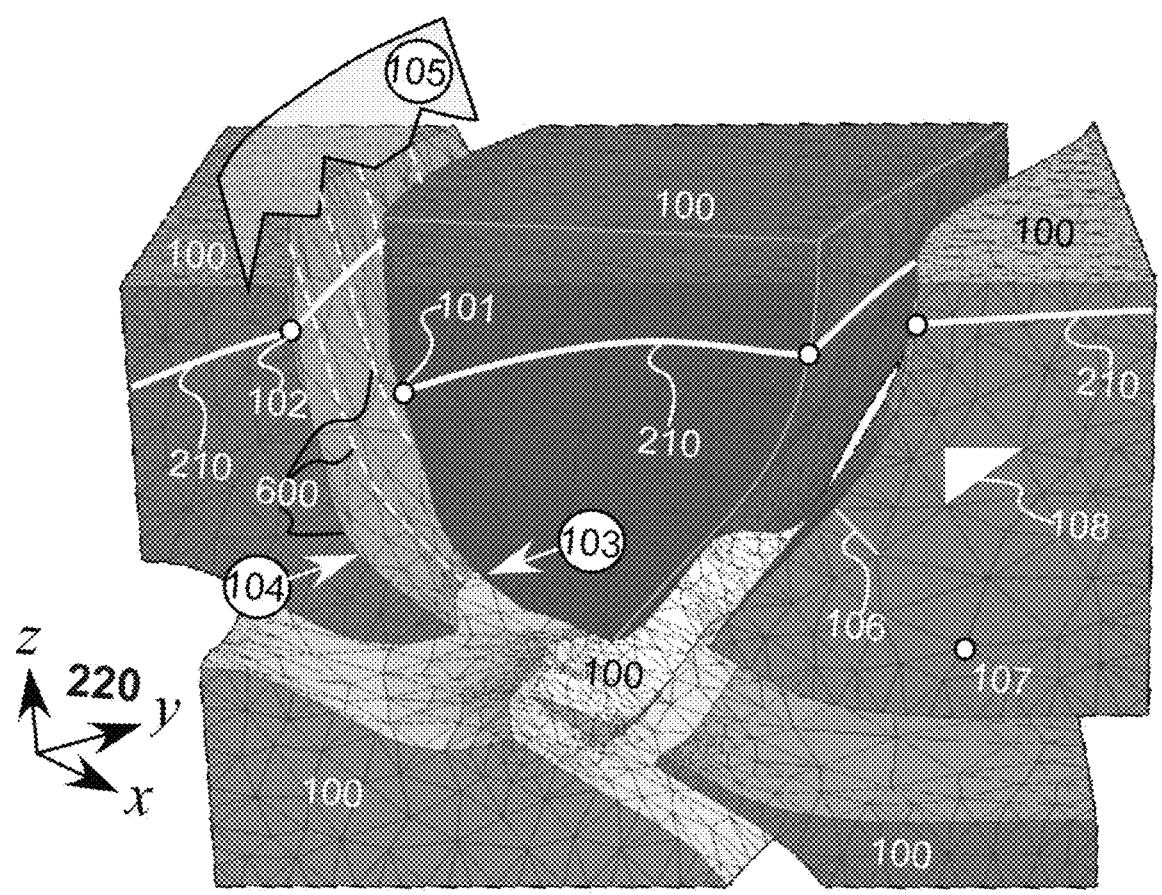
FIG. 1 schematically illustrates an exploded view of a 3D present day geological model of the subsurface of the Earth according to an embodiment of the invention. The 3D geological model may comprise a faulted 3D grid Γ 100. Cell edges 106 of the grid are constrained to never cross faults 105. During restoration, twin faces F⁻ 104 and F⁺ 103 on opposite sides of a fault F 105 may slide along one another only in a direction tangential to the surface of the fault F 105. Points ($r_F^+$, $r_F^-$) (101, 102) are twin-points. "Twin" points or faces may refer to points or faces that were collocated at the time of their deposition, but which may have separated at a later time.

For simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF EMBODIMENTS
OF THE INVENTION

Embodiments of the invention improve conventional restoration techniques for imaging restored geological models as follows:

"τ-active" faults vs. "τ-inactive" faults:

In conventional restoration models, all faults are active (as discontinuous surfaces) at all times. However, in reality, certain faults have not yet formed or activated at various intermediate restoration times τ. Accordingly, conventional restoration models generate false or "phantom" faults that erroneously divide geology that has not yet fractured, leading to geological inaccuracies in subsurface images.

Embodiments of the invention solve this problem by selectively activating and deactivating individual fault surfaces to be discontinuous or continuous, respectively, depending on the specific restoration geological-time τ. For each intermediate restoration time in the past τ, embodiments of the invention split faults into two complementary subsets of "τ-active" faults and "τ-inactive" faults. τ-active faults are activated at restoration time τ (e.g., a discontinuous fault surface along which fault blocks slide tangentially), whereas τ-inactive faults are deactivated at restoration time τ (e.g., a continuous surface that does not behave as a fault).

As faults form and evolve over time, they behave differently at different geological times in the past. For example, a fault that forms at an intermediate geological-time τ, where $\tau_1 < \tau < \tau_2$, is T-active in a restored model at later time $\tau_2$ (after the fault has formed), but τ-inactive in a restored model at earlier time $\tau_1$ (before the fault has formed). This fault classification allows faults to be modelled differently at each restoration time τ in a geologically consistent way, thereby preventing unrealistic deformations from being generated in the neighborhood of these faults.

Figure 8:
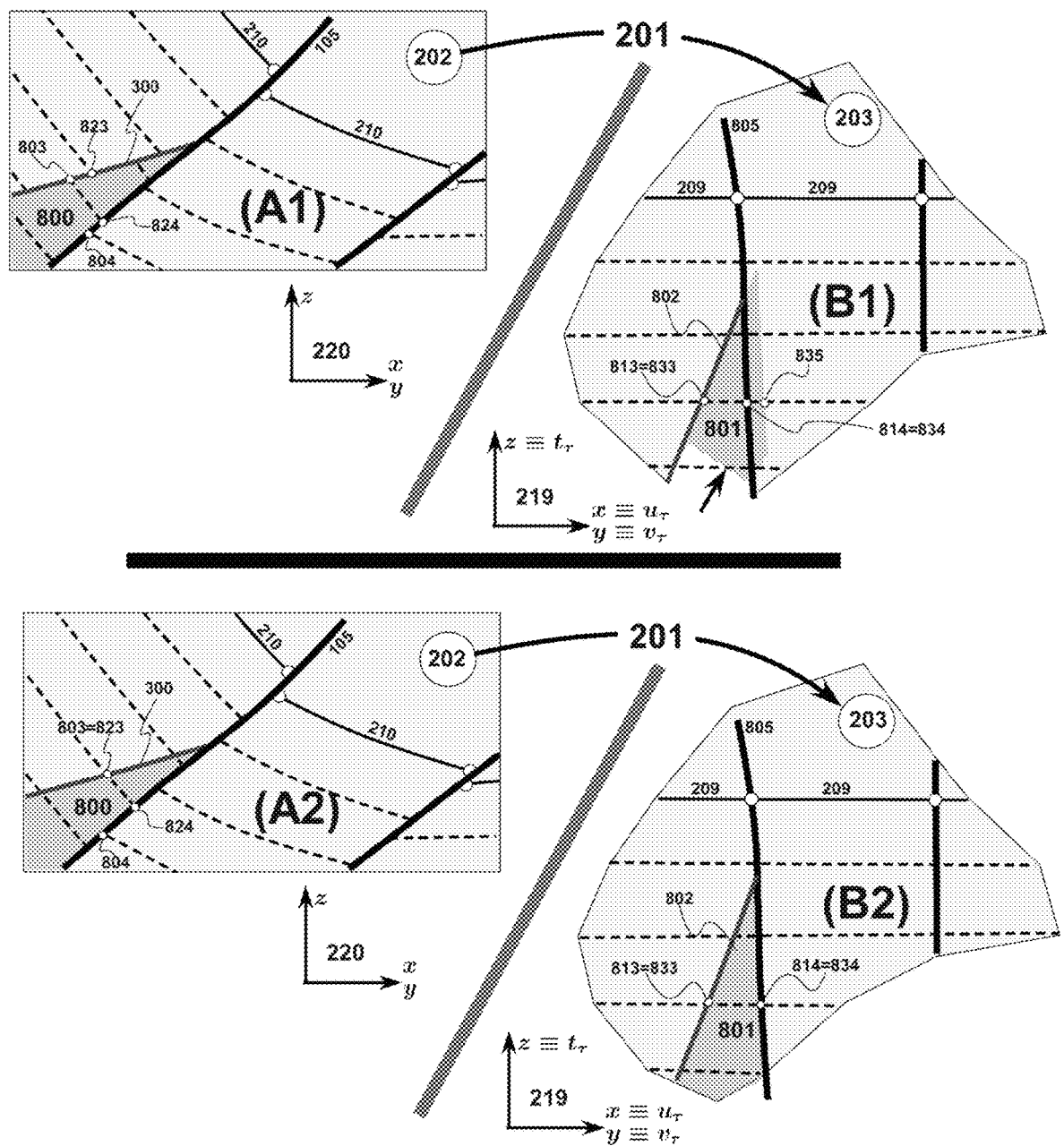
FIG. 8 schematically illustrates a $u_\tau v_\tau t_\tau$-transform 201 of a vertical cross-section of a 3D subsurface model showing the geological impact between fault 300 being erroneously considered a $\tau$-active fault (top image of FIG. 8) vs. correctly considered a $\tau$-inactive fault with respect to restored horizon $H_\tau$ 210 (bottom image of FIG. 8). In the top image of FIG. 8, when fault 300 is erroneously considered a $\tau$-active fault, in order to preserve geological volume, present day fault block 800 is transformed to a restored fault block 801 that intersects $\tau$-active fault 805, which contradicts geological rules. In contrast, in the bottom image of FIG. 8, when fault 300 is correctly considered a $\tau$-inactive fault, a volume-preserving transformation maps the present day fault block 800 correctly to a restored fault block that stays within (and does not cross) $\tau$-active fault 805, according to geological rules.

FIG. 8 shows the problem of a fault 300 being erroneously considered active at a restoration time before it formed (top image of FIG. 8) and the solution of modeling the fault as a τ-inactive fault to correctly deactivate the fault at restoration time τ according to embodiments of the invention (bottom image of FIG. 8). In the top image of FIG. 8, when a horizon $H_\tau$ 210 is restored using $u_\tau v_\tau t_\tau$-transform 201, fault block 800 (shaded region in the top-left image of FIG. 8) is bounded by an active fault 105 and an inactive fault 300. If however fault 300 is erroneously considered as an active fault then, after applying restoration 201:

erroneous r-twin points (803,823) are transformed into a pair of collocated points 813=833, r-twin points (804,824) are transformed into collocated points 814=834.

It is clear that, if d(a, b) denotes the distance between any arbitrary pair of points (a, b), then:

$$d(803,824) = d(833,835) \neq d(833,834) \quad (2)$$

This observation shows that erroneously considering fault 300 as a τ-active fault inevitably generates unrealistic deformations.

This problem is solved according to embodiments of the invention, e.g., as shown in the bottom image of FIG. 8. In this image, fault 105 is modeled as a τ-active fault (activating the fault), but fault 300 is modeled as a τ-inactive fault (deactivating the fault). Accordingly, when $u_\tau \ v_\tau \ t_\tau$-transform 201 is applied to fault block 800 (shaded region in the bottom-left image of FIG. 8), restored fault block 801 (shaded region in the bottom-right image of FIG. 8) is no longer bounded by an active fault (τ-inactive fault 300 is inactive at restored time τ). Accordingly, the restored fault block 801 preserves volume and stays within (and does not cross) τ-active fault 805 (because the deactivated boundary transformed from τ-inactive fault 300 may shift to accommodate a shift in the restored τ-active fault 805).

Contrary to conventional methods, the use of τ-active and τ-inactive faults produces more accurate results, e.g., even if there is no continuous path between (no way to continuously connect) a given fault block (e.g., 800) and the horizon $H_\tau$ (e.g., 210) deposited at geological time τ, which typically requires additional processing that may induce errors. By selectively activating and inactivating faults at the various restoration times according to when they form, embodiments of the invention eliminate erroneous phantom faults and more accurately represent the faulted geology.

Figure 16:
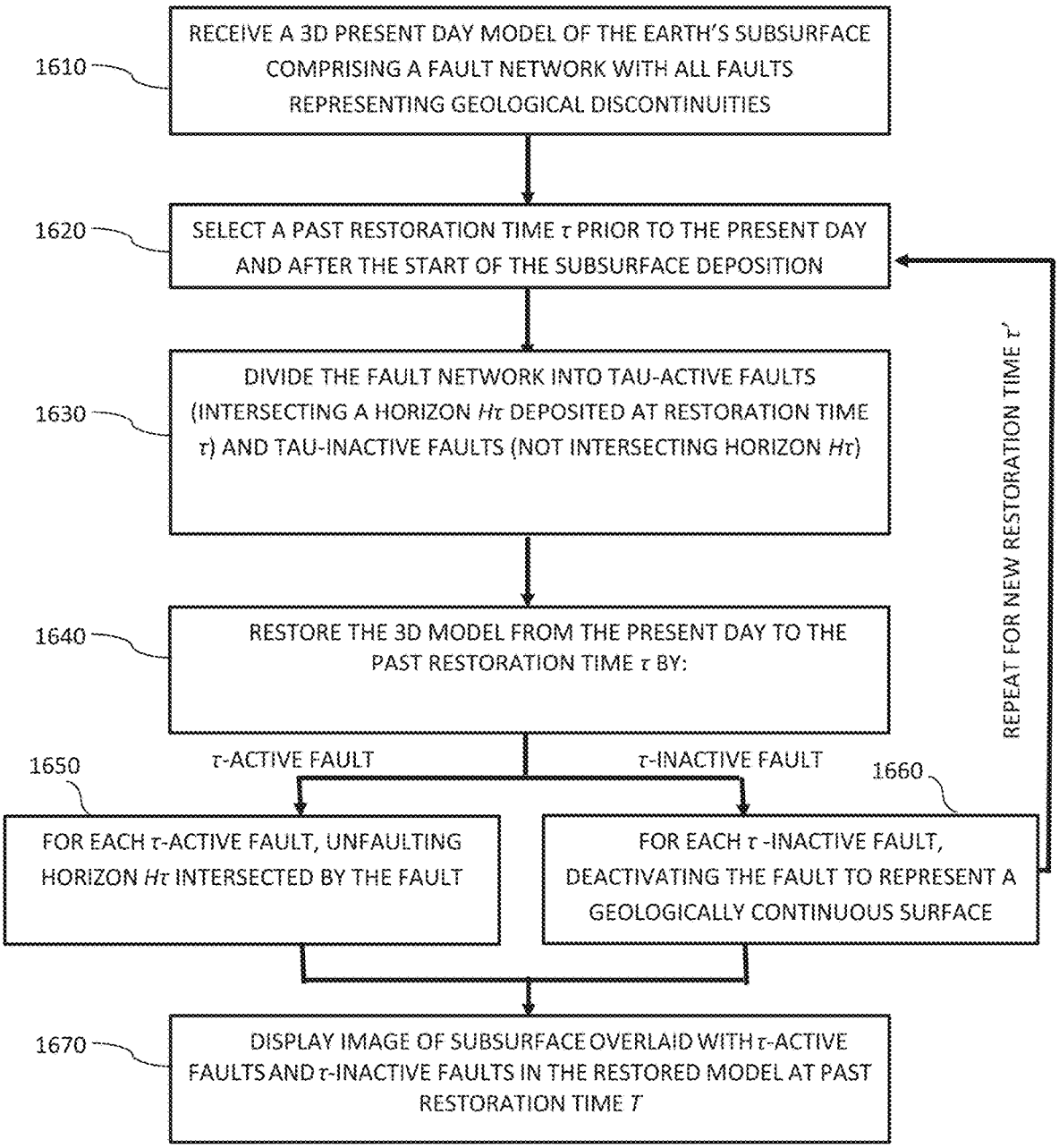
FIG. 16 is a flowchart of a method to restore a geological model with $\tau$-active and $\tau$-inactive faults, according to an embodiment of the invention.

Reference is made to FIG. 16, which is a flowchart of a method to restore a geological model using τ-active and τ-inactive faults, according to an embodiment of the invention.

In operation 1610, a processor may receive a 3D model of the present day measured geometry comprising a network of faults (e.g., present day model 202). The present day model may be measured tomographically by scanning the Earth's subsurface e.g., as described in reference to FIGS. 14 and 15. In the present day geology, all faults in the model have already formed and so, represent active discontinuities that divide fault blocks which slide in opposite directions tangential to the surface of the fault as time approaches a modeled time.

In operation 1620, a processor may select or receive a past restoration time τ that is "intermediate" or prior to the present time and after the start of the subsurface's deposition (the time period when an oldest horizon surface in the 3D model was originally deposited).

In operation 1630, a processor may divide the network of faults into a subset of τ-active faults and a subset of τ-inactive faults. τ-active faults may be faults that are active at the past restoration time τ and τ-inactive faults are faults that are inactive at the past restoration time τ. A fault is determined to be τ-active when the fault intersects a horizon $H_\tau$ that was originally deposited at the past restoration time τ (e.g., see τ-active faults 105 of FIG. 3) and a fault is determined to be τ-inactive when the fault does not intersect the horizon $H_\tau$ that was originally deposited at the past restoration time τ (e.g., see τ-inactive faults 300 of FIG. 3). Because different faults activate to fracture the subsurface at different geological times, the processor may divide the fault network differently at different geological times. Thus, a fault may be τ-active at a first restoration time τ' (e.g., a time period during which the fault has formed) and τ-inactive at a second restoration time τ" (e.g., a time period different than that during which the fault has formed). In one embodiment, iso-value surfaces (e.g., 208 of FIG. 3) of each restoration coordinate (e.g., $u_\tau$, $v_\tau$, and $t_\tau$) are continuous across τ-inactive faults (e.g., 300 of FIG. 3) and discontinuous across τ-active faults (e.g., 105 of FIG. 3).

In operation 1640, a processor may restore the 3D model from the present day measured geometry to the predicted past geometry at the past restoration time τ. During restoration, the processor may flatten a horizon $H_\tau$ (e.g., 210 of FIG. 4) that was originally deposited at time τ to a substantially planar surface of approximately constant depth. For horizons older (e.g., deposited deeper in the subsurface) than horizon $H_\tau$, the processor may restore the horizons to non-planar surfaces, e.g., when the thickness of the layers is not constant. Because the region of the subsurface deposited after the restoration time τ (e.g., deposited shallower in the subsurface) did not yet exist at the time of the restored model, restoring the 3D model to a past restoration time τ may eliminate (e.g., removing or not displaying) all relatively shallower horizon surfaces that were originally deposited after the past restoration time τ. During restoration, the processor may treat τ-active and τ-inactive faults differently in operations 1650 and 1660, respectively.

In operation 1650, for each τ-active fault, a processor may model the τ-active fault as an active discontinuous fault surface and restore the horizon surface by removing or omitting the fault surface at the time of restoration. The processor may eliminate the τ-active fault during restoration by sliding its adjacent fault blocks together. This may join end points of a horizon $H_\tau$ separated on opposite sides of the fault in the present day model to merge into the same position in the restored model by sliding the end points towards each other in a direction tangential to the surface of the τ-active fault.

In operation 1660, for each τ-inactive fault, a processor may model the τ-inactive fault, not as a discontinuous fault surface, but as a continuous non-fault surface in the restoration transformation. The τ-inactive fault may be modeled as a surface in which the discontinuity induced by the fault has been deactivated to prevent fault blocks from sliding in directions tangential to the surface of the fault as time approaches the restoration time τ. The processor may model the τ-inactive fault during restoration by keeping collocated points on opposite sides of the fault in the present day model together in the restored model.

After the geological model has been restored for a first past restoration time τ (operations 1620-1660), the process may repeat to restore the model for a second different past restoration time τ'. In some embodiments, the geological model may be sequentially restored to a sequence of multiple past restoration times $\tau_1, \tau_2, \ldots, \tau_n$. In multiple (all or not all) of the past restoration times $\tau_1, \tau_2, \ldots, \tau_n$, the fault network may be divided into a different subset of τ-active and τ-inactive faults, e.g., because different faults fracture the subsurface at different geological times. In some embodiments, a processor may play a moving image sequence in which the 3D model is iteratively restored in a forward or reverse order of the sequence of past restoration times $\tau_1, \tau_2, \ldots, \tau_n$ to visualize changes in the subsurface geology over the passage of time.

In operation 1670, a processor may display a visualization of an image of the subsurface geology of the Earth overlaid with τ-active faults and τ-inactive faults in the restored model at past restoration time τ. The processor may display the τ-active faults and the τ-inactive faults with different visual identifiers, such as, different levels of translucency, different colors, different patterns, etc.

New Restoration Transformation $u_\tau$, $v_\tau$, and $t_\tau$:

A restoration transformation may transform a geological image of the subsurface of the Earth from a present day space (e.g., x,y,z coordinates) to a restoration space (e.g., $u_\tau$, $v_\tau$, and $t_\tau$ coordinates) as it was formed at an intermediate restoration time in the past τ (before the present-day but after the start of the subsurface deposition). An ideal restoration should transform the vertical coordinate $t_\tau$ in a manner that strictly honors the thickness of layers, to preserve areas and volumes of the Earth, so that terrains are not stretched or squeezed over time in the vertical dimension. However, conventional restoration transformations typically deform the vertical coordinates, forcing terrains to stretch and squeeze, resulting in errors in the restoration model.

Embodiments of the invention improve the accuracy of the restoration model by establishing a vertical restoration coordinate $t_\tau$ that preserves layer thickness. This may be achieved by implementing a thickness-preserving constraint that sets a variation in the vertical restoration coordinate $t_\tau$ between any two points separated by an infinitesimal difference in the direction of maximal variation of the vertical coordinate $t_\tau$ to be approximately equal to the distance between the points in the direction of maximal variation. An example of this constraint may be modeled by $\|\text{grad } t_\tau(x,y,z)\|=1$. This constraint, however, is non-linear and highly complex and time-consuming to solve. Due to its complexity, this constraint is rarely used in conventional restoration models, and instead replaced by over-simplifications, such as equations (33) and (34), that result in model errors as shown in histograms 501 and 502 of FIG. 5, and histograms 901 and 902 of FIG. 9, respectively.

Embodiments of the invention improve the accuracy of the restored model by establishing a new thickness-preserving constraint that introduces an error correction term $\varepsilon_\tau$. The new thickness-preserving constraint sets the restored vertical coordinate $t_\tau$ to be equal to a sum of a first approximation $t'_\tau$ of the vertical coordinate and an error correction term $\varepsilon_\tau$, wherein the error correction term $\varepsilon_T$ is computed by solving a relationship in which a variation in the sum of the first approximation $t'_\tau$ of the vertical coordinate and the error correction term $\varepsilon_\tau$ between any two points separated by an infinitesimal difference in the direction of maximal variation of the sum is approximately equal to the distance between the points in the direction of maximal variation. An example of this constraint may be modeled by $\|\text{grad}(t'_\tau+\varepsilon_\tau)\|=1$. The new thickness-preserving constraint preserves layer thickness with greater accuracy as shown in histogram 503 of FIG. 5 as compared to conventional approximations shown in histograms 501 and 502 of FIG. 5 and minimizes volume variation with greater accuracy as shown in histogram 903 of FIG. 9 as compared to conventional approximations shown in histograms 901 and 902 of FIG. 9, respectively.

Embodiments of the invention further improve the performance and computational speed of the computer generating the restored model by linearizing the new thickness-preserving constraint. As an example, the new thickness-preserving constraint may be linearized as follows. $\|\text{grad}(t'_\tau+\varepsilon_\tau)\|=1$ may be squared to obtain $\|\text{grad } t'_\tau\|^2+\|\text{grad } \varepsilon_\tau\|^2+\|2\cdot\text{grad } t'_\tau\cdot\text{grad } \varepsilon_\tau\|=1$. The error correction term $\varepsilon_\tau$ may be generated such that the square of its spatial variation, $\|\text{grad } \varepsilon_\tau\|^2$, is negligible. Accordingly, the thickness-preserving constraint simplifies to a new linear thickness-preserving constraint of grad $\varepsilon_\tau \cdot \text{grad } t'_\tau \cong \frac{1}{2}\{1-\|\text{grad } t'_\tau\|^2\}$ (eqn. (37)). This thickness-preserving constraint is linear because $t'_\tau$ is already known, so the constraint is a relationship between the gradient of the error $\varepsilon_\tau$ and the gradient of the known first approximation of the vertical coordinate $t'_\tau$. The computer may therefore compute the new thickness-preserving constraint in linear time, which is significantly faster than computing the non-linear constraints $\|\text{grad } t_\tau\|=1$ or $\|\text{grad}(t'_\tau+\varepsilon_\tau)\|=1$.

Contrary to conventional methods, the computational complexity for performing the restoration transformation according to embodiments of the invention is significantly reduced compared to classical methods that are based on the mechanics of continuous media. As a consequence, the modeling computer uses significantly less computational time and storage space to generate the inventive restoration model.

Contrary to conventional methods that allow variations of geological volumes and deformations, embodiments of the invention implement a new set of geometrical constraints and boundary conditions that preserve geological volumes and deformations while adhering to geological boundaries.

Figure 12:
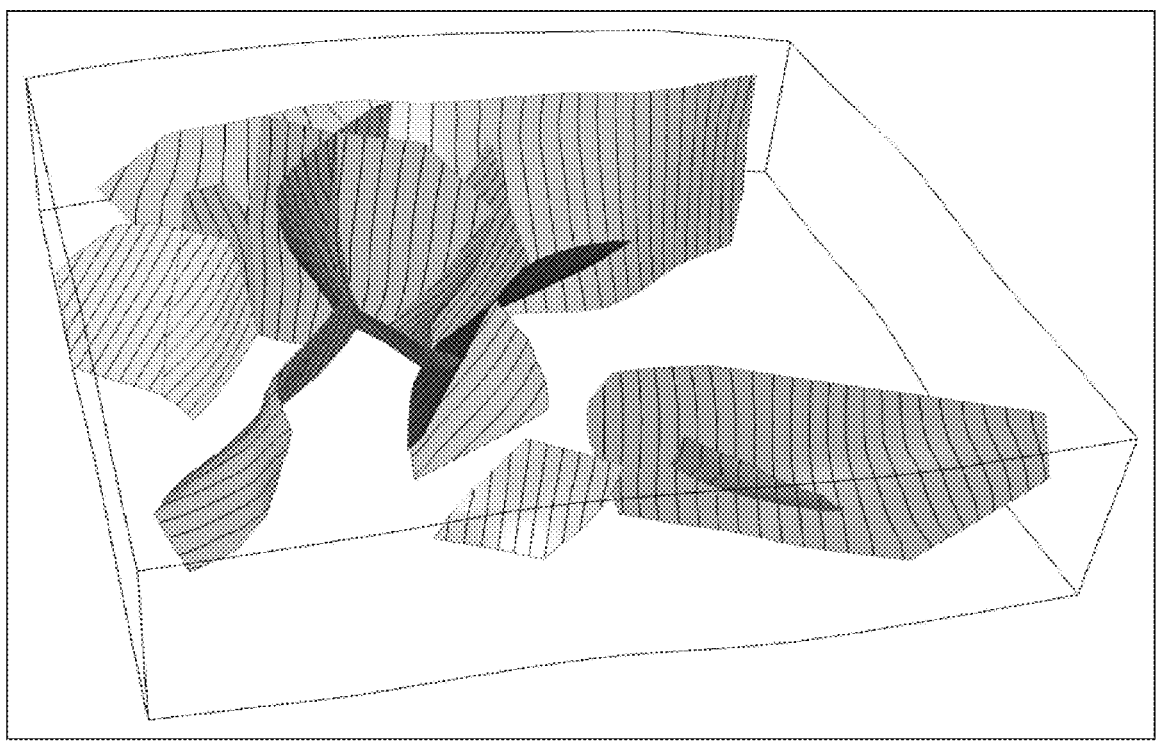
FIG. 12 schematically illustrates an example of fault striae induced on faults by paleo-geographic coordinates u(r) and v(r) of a depositional model provided as input to the restoration according to an embodiment of the invention.

Contrary to conventional methods, embodiments of the invention restore faults along fault striae (e.g., see FIG. 12) induced by the twin points associated with the paleogeographic coordinates of a depositional (e.g., GeoChron) model, given as input of the restoration method.

An ideal restoration should also transform the horizontal coordinates $u_\tau$ and $v_\tau$ in a manner that strictly honors lateral spatial distribution, to preserve areas and volumes of the Earth, so that terrains are not stretched or squeezed over time in the horizontal dimensions. However, conventional restoration transformations based on depositional coordinates (e.g., paleo-geographic coordinates u and v) typically deform the horizontal coordinates, forcing terrains to stretch and squeeze, resulting in errors in the restoration model.

Embodiments of the invention improve the accuracy of the restoration model at time $\tau$ by establishing horizontal restoration coordinates $u_\tau$ and $v_\tau$ that restore the horizon surface $H_\tau$ deposited at time $\tau$ consistently with horizontal depositional coordinates u and v whilst minimizing deformations. In one embodiment, on the horizon surface $H_\tau$ only, the horizontal restoration coordinates $u_\tau$ and $v_\tau$ are equal to the depositional coordinates u and v (see e.g., equation (20)) and the spatial variations of the horizontal restoration coordinates $u_\tau$ and $v_\tau$ are preserved with respect to the horizontal depositional coordinates u and v (see e.g., equation (21)). Thus, each restoration model at time $\tau$, presents a horizon surface $H_\tau$, as it was configured at that time $\tau$ when it was originally deposited. Additionally or alternatively, horizontal restoration coordinates $u_\tau$ and $v_\tau$ are modeled in a tectonic style (e.g., using constraints (22) or (23)) that is consistent with that of the horizontal coordinates u and v of the depositional model, which makes the restoration more accurate because the geological context is taken into account. Additionally or alternatively, horizontal restoration coordinates $u_\tau$ and $v_\tau$ are modeled to minimize deformations induced by the restoration of horizon $H_\tau$, rather than minimizing deformations in the whole volume G. This may be achieved by implementing constraints (41) and (42) that only enforce orthogonality of gradients of $u_\tau$ and $v_\tau$ with local axes $b_\tau$ and $a_\tau$, but which do not constrain the norm of grad $u_\tau$ and grad $v_\tau$, as is typically constrained for horizontal depositional coordinates u and v consistent with the depositional time model. Horizontal restoration coordinates $u_\tau$ and $v_\tau$ may also be constrained only in $G_\tau$, thereby only taking into account the part of the subsurface to be restored, not the entire model G. Additionally or alternatively, horizontal restoration coordinates $u_\tau$ and $v_\tau$ may be constrained to be equal on opposite sides of $\tau$-active faults at twin point locations, where the twin points are computed from fault striae, which also ensures consistency with the depositional model (see e.g., equation (43)). Additionally or alternatively, horizontal restoration coordinates $u_\tau$ and $v_\tau$ are constrained to be equal on opposite sides of $\tau$-inactive faults at mate point locations to cancel the effect of inactive faults on the restoration model (see e.g., equation (43)).

Figure 17:
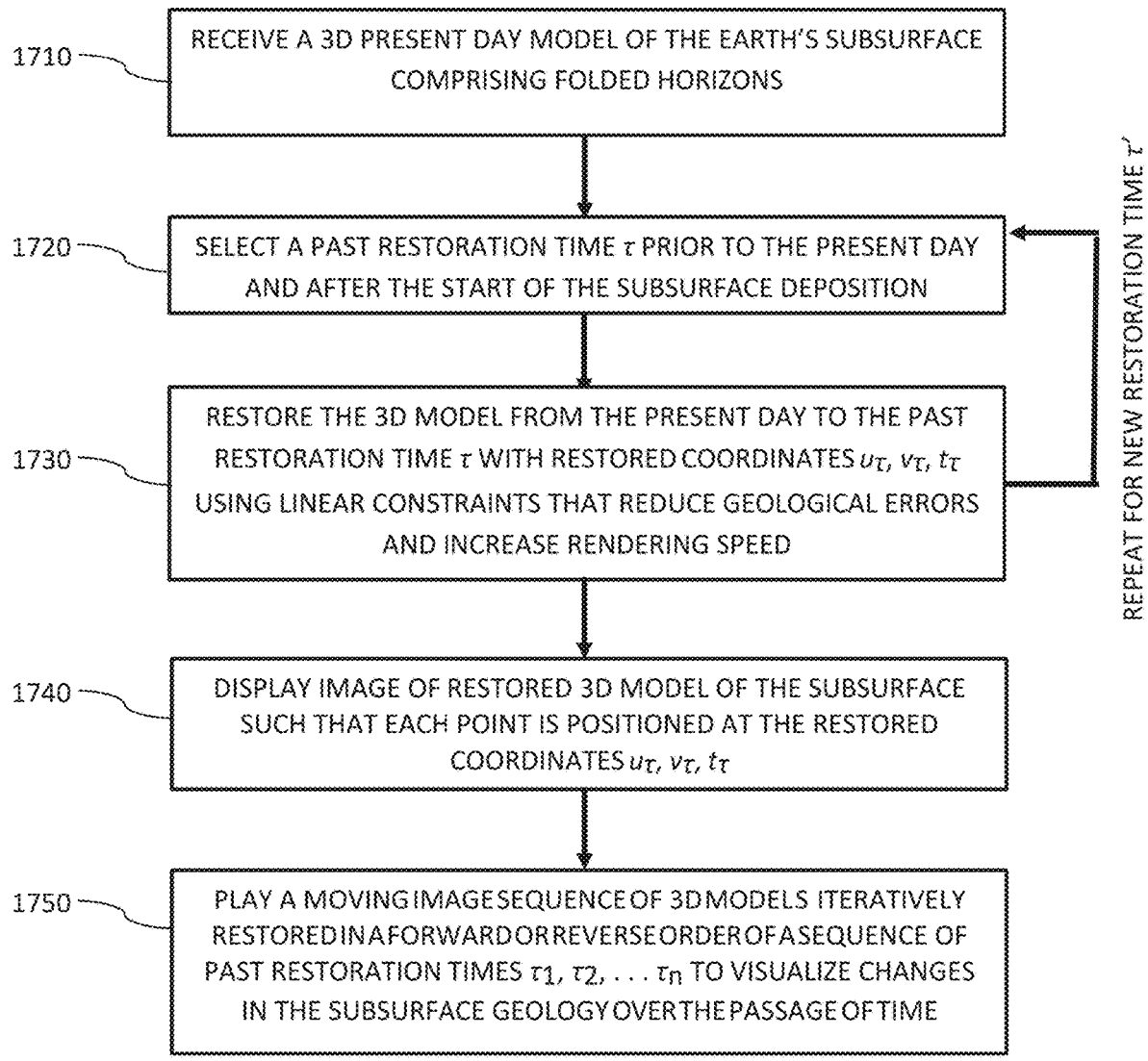
FIG. 17 is a flowchart of a method to restore a geological model with improved accuracy using a new thickness-preserving constraint, according to an embodiment of the invention.

Reference is made to FIG. 17, which is a flowchart of a method to restore a geological model with improved accuracy using a new thickness-preserving constraint, according to an embodiment of the invention.

In operation 1710, a processor may receive a 3D model of the present day measured geometry (e.g., present day model 202) comprising one or more folded (e.g., curvilinear or non-planar) geological horizon surfaces (e.g., 210). The present day model may be measured tomographically by scanning the Earth's subsurface e.g., as described in reference to FIGS. 14 and 15.

In operation 1720, a processor may select or receive a past restoration time $\tau$ that is "intermediate" or prior to the present time and after the start of the subsurface's deposition (the time period when an oldest horizon surface in the 3D model was originally deposited).

In operation 1730, a processor may restore the 3D model from the present day measured geometry (e.g., present day model $G_\tau$ 202 in xyz-space G 220) to the predicted past geometry at the restoration time in the past $\tau$ (e.g., restored model $\overline{G}_\tau$ 203 in $u_\tau v_\tau t_\tau$—space 219) using a 3D restoration transformation (e.g., $u_\tau v_\tau t_\tau$-transform 201). At the restored time in the past $\tau$, the geological layers above $H_\tau$ (e.g., $H_{\tau+1}$ ... $H_n$) did not yet exist, so the subregion above $H_\tau$ in the present day space G 220 is eliminated or omitted, and only the subregion $G_\tau$ 202 below and aligned with $H_\tau$ (e.g., $H_1$ ... $H_\tau$) in the present day space G 220 is restored. The 3D restoration transformation includes a vertical component that restores the geometry to the vertical coordinate $t_\tau$ and two lateral or horizontal components that restore the geometry to the horizontal coordinates $u_\tau$ and $v_\tau$. The restored vertical coordinate $t_\tau$ and horizontal coordinates $u_\tau$ and $v_\tau$ represent the predicted vertical and horizontal positions, respectively, where particles in the subsurface were located in the Earth at the restoration time in the past $\tau$. Because the region of the subsurface deposited after the restoration time $\tau$ (e.g., deposited shallower in the subsurface than $H_\tau$) did not yet exist at the time of the restored model, the processor may restore and compute coordinates for the part or subregion $G_\tau$ of the subsurface G that was deposited at a geological time of deposition t prior to or during the past restoration time $\tau$ (e.g., deposited deeper than, or at the same layer in the subsurface as, $H_\tau$). Accordingly, the restored model eliminates or omits all relatively shallower or younger horizon surfaces or layers that were originally deposited after the past restoration time $\tau$.

The processor may restore the vertical coordinate $t_\tau$ such that points along a horizon surface $H_\tau$ (e.g., 210) modeling sediment that was deposited at the selected restoration time $\tau$ have a substantially constant value for the restored vertical coordinate $t_\tau$ (see e.g., eqn. (19)). Further, the processor may restore the vertical coordinate $t_\tau$ such that at any location in the 3D model, the restored vertical coordinate $t_\tau$ is equal to a sum of a first approximation $t'_\tau$ of the vertical coordinate and an error correction term $\varepsilon_\tau$, wherein the error correction term $\varepsilon_\tau$ is computed by solving a relationship in which a variation in the sum of the first approximation $t'_\tau$ of the vertical coordinate and the error correction term $\varepsilon_\tau$ between any two points separated by an infinitesimal difference in the direction of maximal variation of the sum is approximately equal to the distance between the points in the direction of maximal variation. The error correction term $\varepsilon_\tau$ may correct errors in the first approximation $t'_\tau$ of the vertical coordinate. This constraint may be represented by a linear second order approximation (see e.g., eqn. (37)).

In some embodiments, the processor computes the first approximation $t'_\tau$ of the vertical coordinate by solving a relationship in which the spatial variation of the vertical coordinate $t'_\tau$ is locally approximately proportional to the spatial variation of a geological time of deposition t. In some embodiments, the coefficient of proportionality is locally equal to the inverse of the magnitude of the maximal spatial variation of the geological time of deposition (see e.g., eqn. (34)-(1)). This relationship may give the vertical restoration coordinate $t_\tau$ the shape of the horizon $H_\tau$ because, on the horizon, the gradient of depositional time t is normal to the horizon surface. Thus, the ratio grad t/∥grad t∥ follows the shape of the horizon.

In some embodiments, the processor computes the first approximation $t'_\tau$ of the vertical coordinate by solving a relationship in which any infinitesimal displacement in the direction orthogonal to horizon surface $H_\tau$ results in a variation of the vertical coordinate $t'_\tau$ approximately equal to the length of the infinitesimal displacement for points on the horizon surface $H_\tau$ (see e.g., eqn. (33)-(1)).

In some embodiments, the processor computes the restored vertical coordinate $t_\tau$ in parts of the subsurface which are older than restoration time $\tau$ such that iso-value surfaces of the restored vertical coordinate $t_\tau$ are parallel to the horizon surface $H_\tau$ and the difference in the restored vertical coordinate $t_\tau$ between two arbitrary iso-values is equal to the distance between the corresponding iso-surfaces (see e.g., eqn. (31)). Parallel surfaces may be planar parallel in the restored model, and curved parallel (e.g., having parallel tangent surfaces) in present day model, such that the surfaces are non-intersecting at limits.

In some embodiments, the error correction term $\varepsilon_\tau$ is null at points along the horizon surface $H_\tau$ that was deposited at the selected restoration time in the past $\tau$ so that the restored horizon surface $H_\tau$ is flat (see e.g., eqn. (36)).

In some embodiments, the restored horizontal coordinates $u_\tau$ and $v_\tau$ are constrained such that for each point along the horizon surface $H_\tau$ that was deposited at the selected restoration time in the past $\tau$: the restored horizontal coordinates $u_\tau$ and $r_\tau$ are equal to depositional horizontal coordinates it and v, respectively, and the spatial variations of the restored horizontal coordinates $u_\tau$ and $v_\tau$ are equal to the spatial variations of the depositional horizontal coordinates u and v, respectively (see e.g., eqns. (20)-(21)). On average, globally over the entire model, the processor may compute $\|\mathrm{grad}\, u\|=1$ and $\|\mathrm{grad}\, v\|=1$. However, locally, this is not necessarily true e.g., on horizon $H\tau$. So, while the processor sets $\mathrm{grad}\, u_\tau = \mathrm{grad}\, u$ and $\mathrm{grad}\, v_\tau = \mathrm{grad}\, v$ on $H\tau$, the processor may not constrain $\|\mathrm{grad}\, u_\tau\|=1$ and $\|\mathrm{grad}\, v_\tau\|=1$ on $H_\tau$. Moreover, the processor may not constrain $\mathrm{grad}\, u_\tau$ to be orthogonal to $\mathrm{grad}\, t_\tau$. This results from the boundary condition on $H\tau$ and propagation through its constant gradient.

In some embodiments, the restored horizontal coordinates $u_\tau$ and $v_\tau$ are constrained in parts of the subsurface which are older than restoration time $\tau$ such that directions of maximal change of the restored horizontal coordinates $u_\tau$ and $v_\tau$ are linearly constrained by a local co-axis vector $b_\tau$ and a local axis vector $a_\tau$, respectively (see e.g., eqn. (41)).

In some embodiments, the local axis vector $a_\tau$ is oriented approximately in the direction of maximal change of depositional horizontal coordinate u and orthogonal to the direction of maximal change of the vertical restoration coordinate $t_\tau$, and the local co-axis vector $b_\tau$ is oriented orthogonal to the direction of the local axis vector $a_\tau$ and orthogonal to the direction of maximal change of the vertical restoration coordinate $t_\tau$ (see e.g., eqn. (40)).

In some embodiments, if the tectonic style of the 3D model is minimal deformation, the restored horizontal coordinates $u_\tau$ and $v_\tau$ are computed over the part of the 3D model of the subsurface which is older than restoration time $\tau$ such that the directions of maximal change of $u_\tau$ and $v_\tau$ are approximately orthogonal to the local co-axis vector $b_\tau$ and the local axis vector $a_\tau$, respectively. For example, equation (40) constrains the local axis vector $a_\tau$ to be parallel to the gradient of u and the local co-axis vector $b_\tau$ to be orthogonal to the local axis vector $a_\tau$, which means that the gradient of u is orthogonal to the local co-axis vector $b_\tau$. Equation (41) further constrains the gradient of $u_\tau$ to be approximately orthogonal to the local co-axis vector $b_\tau$. Accordingly, the gradient of $u_\tau$ is approximately parallel to the gradient of u. The same logic implies the gradient of $v_\tau$ is approximately parallel to the gradient of v.

In some embodiments, if the tectonic style of the 3D model is flexural slip, the restored horizontal coordinates $u_\tau$ and VT are computed over the part of the 3D model of the subsurface which is older than restoration time $\tau$ such that projections of their directions of maximal change over the iso-value surfaces of the restored vertical coordinate $t_\tau$ are approximately orthogonal to local co-axis vector $b_\tau$ and the local axis vector $a_\tau$, respectively (see e.g., eqn. (42)).

In some embodiments, the values of the restored horizontal coordinates $u_\tau$ and $v_\tau$ are constrained in parts of the subsurface which are older than the restoration time $\tau$ to be respectively equal on twin points on $\tau$-active faults, wherein twin points are points on opposite sides of a $\tau$-active fault that were collocated at the restoration time $\tau$ and are located on the same fault stria in the present day model, to merge the twin points into the same position in the restored model by sliding the twin points towards each other in a direction tangential to the surface of the $\tau$-active fault (see e.g., eqn. (43)).

In some embodiments, the values of the restored horizontal coordinates $u_\tau$ and $v_\tau$ are constrained in parts of the subsurface which are older than the restoration time $\tau$ to be respectively equal on mate points on $\tau$-inactive faults, wherein mate points are points on opposite sides of a $\tau$-inactive fault that are collocated at present day time, to move mate points together on opposite sides of $\tau$-inactive faults (see e.g., eqn. (43)).

In operation 1740, a processor may display an image of the restored 3D model of the subsurface geology of the Earth such that each point in the 3D model is positioned at the restored coordinates $u_\tau$, $v_\tau$, $t_\tau$ defining the location that a piece of sediment represented by the point was located at the restoration time in the past $\tau$.

In some embodiments, the processor may receive an increasing chronological sequence of past restoration times $\tau_1, \tau_2, \ldots, \tau_n$. For each restoration time $\tau_i$ in sequence $\tau_1, \tau_2, \ldots, \tau_n$, the processor may repeat operations 1720-1730 to compute a corresponding 3D restoration transformation $R\tau_i$. 3D restoration transformation $R\tau_i$ restores the part of the subsurface older than horizon $H_{\tau_i}$ to its predicted past geometry at time $\tau_i$, e.g., to 3D restored coordinates $u_{\tau_i}$, $v_{\tau_i}$, and $t_{\tau_i}$.

In operation 1750, in some embodiments, a processor may play a moving image sequence in which the 3D model is iteratively restored in a forward or reverse order of the sequence of past restoration times $\tau_1, \tau_2, \ldots, \tau_n$ to visualize changes in the subsurface geology over the passage of time.

In some embodiments, the processor may edit the model in the restoration space and then reverse the restoration transformation to apply those edits in the present day space. For example, the processor may edit the depositional values u, v, and t associated with the restored 3D model, and then reverse transform the restored 3D model forward in time from the predicted past geometry at the restoration time in the past $\tau$ to the present day measured geometry using an inverse of the 3D restoration transformation 200 to incorporate the edits from the restored model into the present day model.

Figure 15:
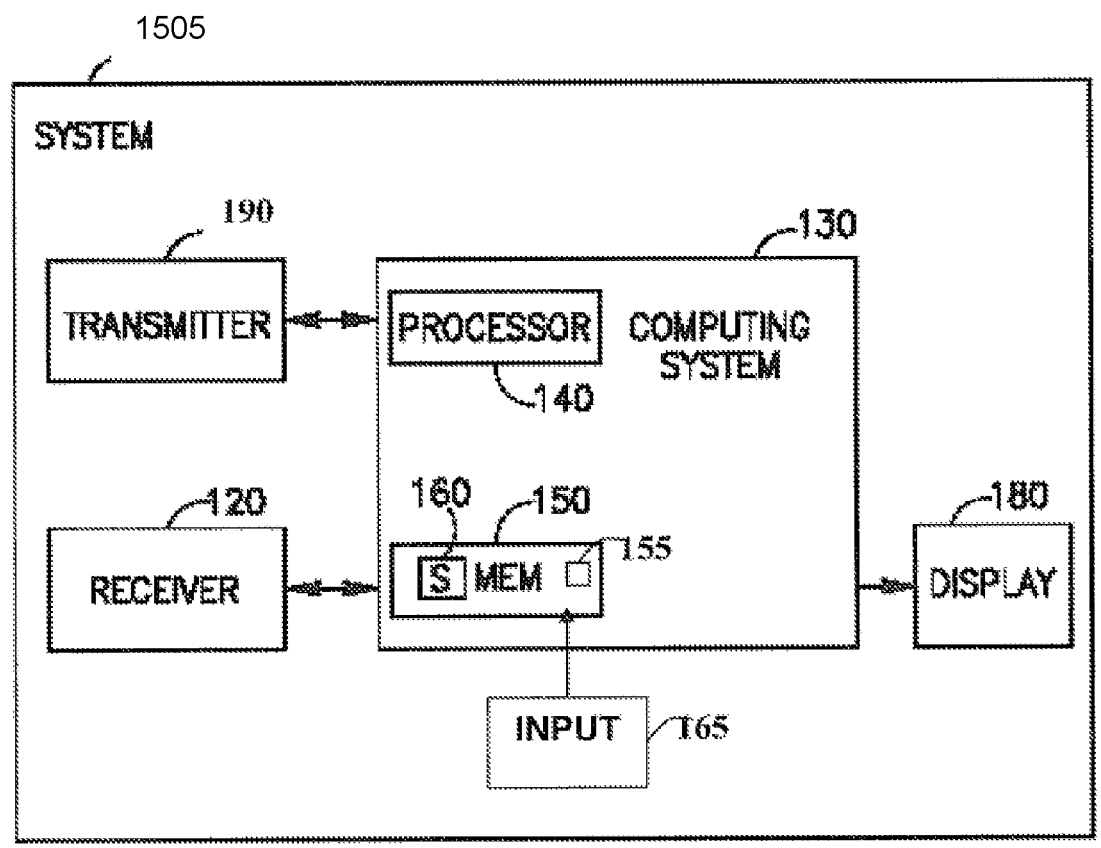
FIG. 15 schematically illustrates a system for restoring a present day geological model to an intermediate restoration time $\tau$, according to an embodiment of the invention.

Operations of FIGS. 16 and 17 may be performed for example using system 1505 of FIG. 15, e.g., by one or more processor(s) 140 of FIG. 15, or another suitable computing system. The embodiments disclosed in reference to FIGS. 16 and 17 may be performed using other operations or orders of the operations, and the exact set of steps shown in the figures may be varied.

In the past 30 years, many methods have been proposed to build geological models of sedimentary terrains having layers that are both folded and faulted. For any given geological-time τ, checking geological model consistency is considered both simpler and more accurate if terrains have previously been "restored" to their pre-deformational, unfolded and unfaulted state, as they were at geological-time τ.

Embodiments of the invention provide a new, purely geometrical 3D restoration method based on the input of a depositional (e.g., GeoChron model). Embodiments of the invention are able to handle depositional models of any degree of geometrical and topological complexity, with both small and large deformations, do not assume elastic mechanical behavior, and do not require any prior knowledge of geo-mechanical properties. Embodiments of the invention further reduce or eliminate gaps and overlaps along faults as part of the restoration transformation and do not resort to any post-processing to minimize such gaps and overlaps. Compared to other conventional methods, embodiments of the invention minimize deformations and volume variations induced by geological restoration with a higher degree of precision, unequaled so far (see e.g., FIG. 5 and FIG. 9). Embodiments of the invention further ensure that 2D deformations of horizon surfaces induced by the uvt-transform are kept coherent with 3D deformations of volumes induced by the new proposed 3D restoration method.

Figure 3:
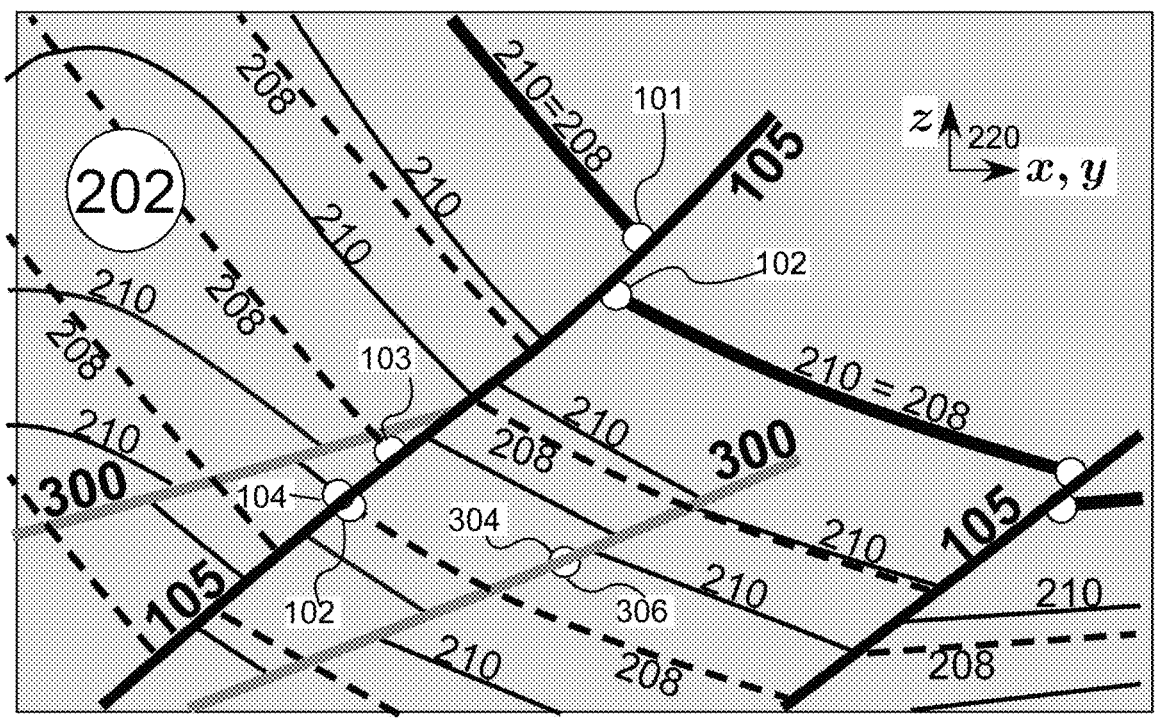
FIG. 3 schematically illustrates a vertical cross section of the present day domain $G_\tau$ 202 according to an embodiment of the invention. Horizons 210 are shown in bold lines and level sets 208 of the vertical restoration coordinate $t_\tau(r)$ are shown in dashed lines. $\tau$-active faults 105 (depicted as bold black lines) cut the horizon $H_\tau$ 210 deposited at restoration time $\tau$ whilst $\tau$-inactive faults 300 (depicted as bold gray lines) do not cut horizon $H_\tau$ 210. Level sets of the vertical restoration coordinate $t_\tau(r)$ (dashed lines 208) are continuous across $\tau$-inactive faults 300 and only separated across $\tau$-active faults 105 because the sedimentary layers of those level sets were not divided when the faults were inactive (at a time before the faults formed).

Referring to FIG. 3, for a given restoration time τ, the set of faults is split into τ-active and τ-inactive subsets. Such a distinction allows:
deformations along faults 105 to be minimized,
restoration to work correctly even though there are regions of $G_\tau$ not continuously connected to $H_\tau$,
gaps and overlaps along faults and the geometry of fault striae 600 are minimized by the restoration transformation, so no post-processing is needed to correct gaps or overlaps.

Embodiments of the invention input a 3D model of sedimentary terrains in the subsurface. In one example, the input model may be the GeoChron™ model generated by SKUA® software for use in mining and oil and gas industries. Embodiments of the invention may build a 3D restoration transformation of this model in such a way that, after transformation, the new model represents terrains as they were at a given intermediate restoration-time τ (where $\tau_1 < \tau < \tau_2$, before the present day $\tau_2$ and after the time of the deposition of the oldest layer $\tau_1$).

For example, G may represent the present day 3D geological domain of the region of the subsurface being modeled and $G_\tau$ 202 may represent the subset of G containing particles of sediment that were deposited at a time prior to or equal to τ. In some embodiments, for all points r∈G, a geologic restoration transformation may move a particle of sediment observed today at location r to a new restored location $\bar{r}_\tau(r)$, e.g., defined as follows:

$$\bar{r}_\tau(r) = r + R_\tau(r) \forall r \in G_\tau \qquad (1)$$

where $R_\tau(r)$ represents a 3D field of restoration vectors, e.g., generated to minimize deformations in $G_\tau$.

Depositional Model

A depositional model may be generated by inputting a tomographic model of the present day subsurface geology of the Earth and transforming that geology to a past depositional time as each particle was configured when originally deposited in the Earth. Sedimentary particles are deposited over time in layers from deepest to shallowest from the earliest to the most recent geological time periods. Since various layers of terrain are deposited at different geological times, a depositional model does not image the geology at any one particular time period, but across many times periods, each layer modeled at the geological time when the layer was deposited. Accordingly, the vertical axis or depth in the depositional model may be a time dimension representing the time period of deposition, progressing from oldest to newest geological time as the model progresses vertically from deepest to shallowest layers.

In one embodiment, the depositional model may be the GeoChron™ model, which is generated by SKUA™ software, that is routinely used by many oil & gas companies to build models of geologic reservoirs which help optimize hydrocarbon production and exploration. An example implementation of the GeoChron model is discussed in U.S. Pat. No. 8,600,708, which is incorporated by reference herein in its entirety. The depositional model is described in reference to the GeoChron model only for example, though any other depositional model may be used.

Figure 7:
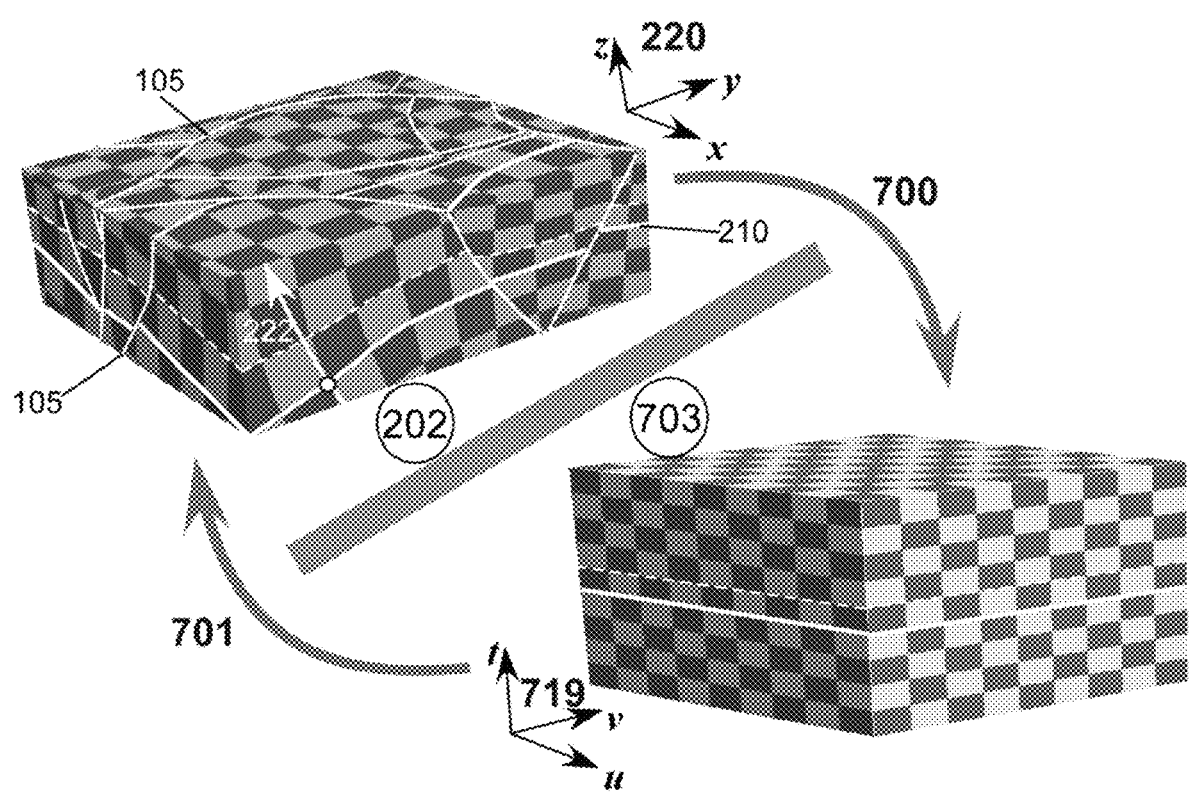
FIG. 7 schematically illustrates a direct uvt-transform 700 and inverse uvt-transform 701 that transform a 3D model between a present day geological space G 220 and a depositional geological space $\overline{G}$ 719 according to an embodiment of the invention.

Reference is made to FIG. 7, which schematically illustrates an example transformation from a present day model (upper-left image) to a depositional GeoChron model (bottom-right image), according to an embodiment of the invention. The transformation may be referred to as a "uvt-transform" 700 that transforms a particle of sediment observed today at location r=r(x,y,z) in the present day geological domain G (also referred to as "G-space") 220 to be moved to a new depositional location $\bar{r}(r)=\bar{r}(u,v,t)$ in the depositional geological domain $\bar{G}$ (also referred to as "$\bar{G}$-space"). The new depositional location F has a vertical coordinate that is the geological time t(r) when the particle at location r was deposited and has horizontal or paleo-geographic coordinates {u(r), v(r)} equal to the lateral spatial location where the particle at r was located at its depositional time t(r). The paleo-geographic coordinates {u(r), v(r)} may be linked to the vertical time coordinate t(r) by different relationships (e.g., constrained by different systems of differential equations) depending on the structural style of their deposition (e.g., minimal deformation or flexural slip).

In the example uvt-transform 700 shown in FIG. 7, when the geological time coordinate t(r) is equal to the curvilinear distance to the top horizon $H_\tau$ 210 along curvilinear axis 222, the uvt-transform is a valid technique for imaging the depositional model. In other words, the uvt-transform is a valid depositional rendering technique if the module of its gradient grad t(r) honors the following constraint:

$$\|\text{grad } t(r)\| = 1 \forall r \in G \qquad (3)$$

Embodiments of the invention observe that when ||grad t(r)|| differs from "1," replacing the depositional coordinates {u(r), v(r), t(r)} of the uvt-transform 700 by new restoration coordinates {$u_\tau(r), v_\tau(r), t_\tau(r)$} where ||grad $t_\tau$||=1 allows the uvt-transform to be replaced by a $u_\tau v_\tau t_\tau$ r-transform that generates a valid restoration model at restoration time τ.

In some embodiments, the depositional (e.g., GeoChron) model includes the following data structures stored in a memory (e.g., memory 150 of FIG. 15) (see FIGS. 1, 3, 6, and 7):

A network of geological faults 105 within the present day domain G 220.
A 3D corner-point grid Γ 100 that fills the G-space 220 with 3D polyhedral cells 108 (e.g., tetrahedra or hexahedra), without any gaps or overlaps in the studied domain, in such a way that no cell edge crosses any fault. The location of each node α 107 of grid Γ 100 in the G-space is denoted r(a).

For each geological fault F 105, two disconnected and independently meshed, collocated surfaces $F^+$ 103 and $F^-$ 104 on opposite sides of the fault 105. Surfaces $F^+$ 103 and $F^-$ 104 may be composed of 2D facets from the 3D polyhedral cells of grid $\Gamma$ 100 bordering F 105 on either side of the fault 105. Fault surfaces $F^+$ 103 and $F^-$ 104 that are collocated in the present day model may, during the restoration process of transforming the model backwards in time, typically slide against one another, without generating gaps or overlaps between adjacent fault surfaces or fault blocks.

Figure 6:
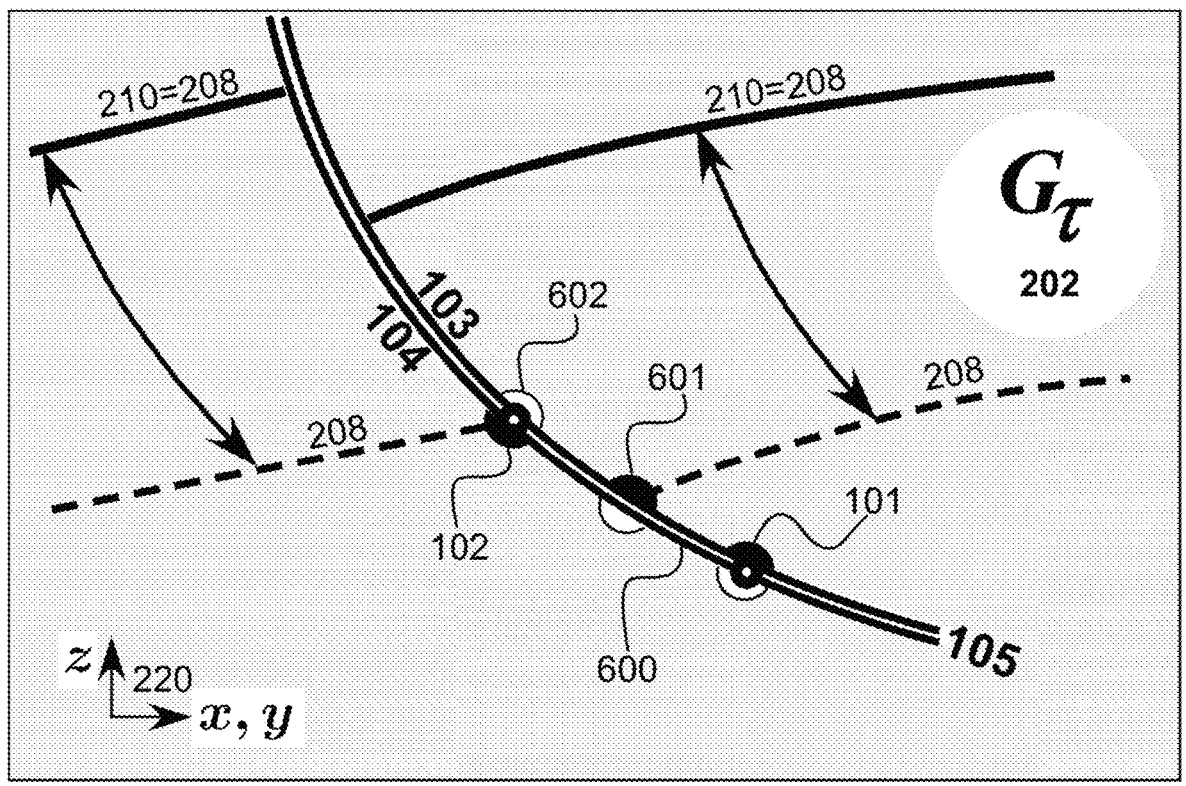
FIG. 6 schematically illustrates a vertical cross section of a 3D subsurface model in which a pair of $\tau$-twin-points ($\tilde{r}_F^+$, $\tilde{r}_F^-$)$_\tau$ (601,602) are deduced from a pair of present day twin-points ($r_F^+$, $r_F^-$) (101,102), using a depositional (e.g., GeoChron) model as input, according to an embodiment of the invention.

Referring to FIGS. 1, 3 and 6, for each fault F 105, a set of pairs of points $(r_F^+, r_F^-)$ (101,102) called "twin-points," such that:

1. The two twin points in each pair are located on opposite sides of a corresponding pair of twin fault surfaces, $r_F^+ \in F^+$ and $r_F^- \in F^-$.
2. At geological times before fault F 105 formed in the subsurface, particles of sediment were collocated which are observed today at locations $r_F^+$ and $r_F^-$.

During the activation of fault F 105, particles of sediment initially located on F are assumed to slide along fault-striae (e.g., see FIG. 12), which are the shortest paths, on F, between pairs of twin points $(r_F^+, r_F^-)$ (101,102).

A tectonic style which may be either a "minimal deformation" style or a "flexural slip" style. Choosing this tectonic style is a model decision assumed to have been made by a structural geologist.

A triplet (e.g., $\{u(r), v(r), t(r)\}$) of discrete coordinates defined on a 3D grid $\Gamma$ 100 of the depositional $\bar{G}$-space, such that, for a particle of sediment observed today at location r, the coordinate values $\{u(r), v(r)\}$ represent the paleo-geographic coordinates of the particle at geological-time $t(r)$ during the time period when it was deposited. According to the depositional (e.g., GeoChron) model, the paleo-geographic coordinates $\{u(r), v(r)\}$ may honor different differential equations depending on the tectonic style.

Figure 2:
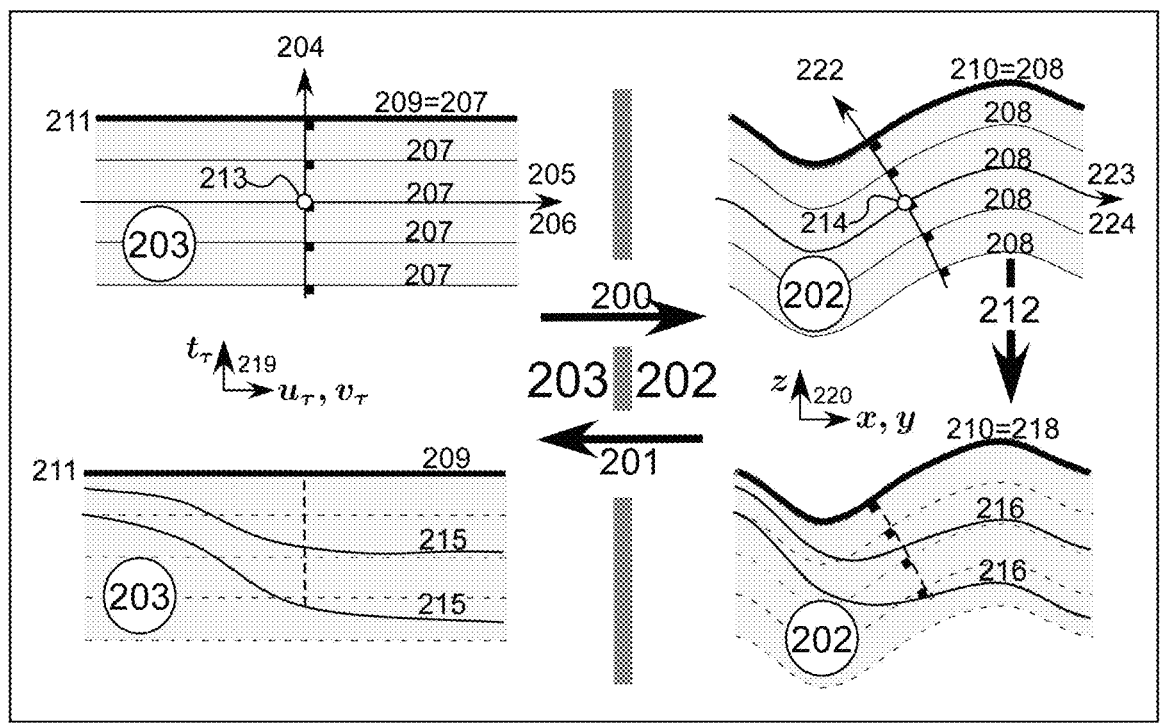
FIG. 2 schematically illustrates a vertical cross section of a 3D subsurface model in a volume deformation: the $u_\tau$ $v_\tau$ $t_\tau$-transform 201 restores the volume $G_\tau$ 202 in a present day space G 220 to a past volume $\overline{G}_\tau$ 203 in a past restored space 219 as the subsurface was configured at restoration time $\tau$ according to an embodiment of the invention.

Moreover, referring to FIG. 1 and FIG. 2, the depositional model may have the following properties:

Within the present day domain G, each geological horizon $H_\tau$ 210 may be defined by a set of particles of sediment which were deposited at geological time $\tau$:

$$r \in H_\tau \iff t(r) = \tau \quad (4)$$

In other words, each horizon $H_\tau$ 210 is a level-set (constant value) surface of the geological-time t.

Paleo-geographic coordinates $\{u(r), v(r)\}$ and twin-points (101,102) given as input are linked e.g. by the following equations:

$$\begin{vmatrix} \{(r_F^+, r_F^-) \text{ is a pair of twin-points}\} \\ \iff \begin{cases} r_F^+ \in F^+ \ \& \ r_F^- \in F^- & (5) \\ u(r_F^-) = u(r_F^+) & (6) \\ v(r_F^-) = v(r_F^+) & (7) \\ t(r_F^-) = t(r_F^+) & (8) \end{cases} \end{vmatrix}$$

Additionally or alternatively, each pair of twin-points $(r_F^+, r_F^-)$ (101,102) may be the intersection of a level set 210 of vertical depositional coordinate $t(r)$ with a "fault stria" $\sigma(r_F^-)$ 600 comprising a curved surface passing through point $r_F^-$ 102 whose geometry is defined by geological rules, e.g., defining fault blocks sliding against one another according to tectonic forces and geological context. As a consequence of constraints defined by equations (6), (7), and (8) above, fault-striae (e.g., see FIG. 12) may characterize the paleo-geographic coordinates $\{u(r), v(r)\}$, and vice versa.

Each point $r \in G$ 214 may be characterized by its present day coordinates (e.g., $\{x(r), y(r), z(r)\}$) with respect to a present day coordinate system $\{r_x, r_y, r_z\}$ 220 comprising three mutually orthogonal unit vectors, e.g., where $r_z$ is assumed to be oriented upward.

It would be appreciated by a person of ordinary skill in the art that the GeoChron model and its features described herein are discussed only as an example of a depositional model and that these elements may differ in other models or implementations without changing the essence of the invention.

$u_\tau \ v_\tau \ t_\tau$—Transformation

Referring to the volume deformation of FIG. 2, the restoration time $\tau$ may be a given geological time in the past and subdomain $G_\tau$ 202 may be a part of a 3D present day geological domain G that has terrains older than (deposited at a time prior to) or equal to restoration time $\tau$ and defined by a depositional model. Embodiments of the invention provide a new unfolding technique that replaces the uvt-transform (converting the present day model to a depositional model rendering all layers at their many respective times of deposition) by a $u_\tau \ v_\tau \ t_\tau$-transform 201 (converting the present day model to a restored model at a single restoration time $\tau$ before the present day but after the earliest times of deposition of the deepest model layer):

$$(x, y, z) \xrightarrow{u_\tau v_\tau t_\tau} \{u_\tau(x, y, z), v_\tau(x, y, z), t_\tau(x, y, z)\} \quad (9)$$

Accordingly, present day geological space $G_\tau$ 202 is transformed into a restored geological space $\bar{G}_\tau$ 203, such that:

$t_\tau(r)$ is a vertical spatial coordinate of the subsurface at the past restoration time $\tau$, and is derived from, but different than, the geological time of deposition $t(r)$. The vertical restoration coordinate $t_\tau(r)$ honors the following constraint:

$$\|\text{grad } t_\tau(r)\| = 1 \ \forall r \in G_\tau \quad (10)$$

$\{u_\tau(r), v_\tau(r)\}$ are lateral restoration coordinates derived from, but different than, the paleogeographic coordinates $\{u(r), v(r)\}$ of the depositional model.

restoration coordinates $\{u_\tau(r), v_\tau(r), t_\tau(r)\}$ honor specific inventive constraints described below in such a way that, using the $u_\tau \ v_\tau \ t_\tau$-transform as a restoration operator minimizes deformations in the present day domain $G_\tau$.

for each point $r \in G_\tau$ 202, the restoration vector field $R_\tau$ may be defined e.g. by:

$$R_\tau(r) = u_\tau(r) \cdot r_x + v_\tau(r) \cdot r_y + t_\tau(r) \cdot r_z - r \quad (11)$$

Volume Deformation

Compaction may be handled in pre and post-restoration stages, as is known in the art. Thus, the model may be restored without taking compaction into account.

Some embodiments of the invention provide an inventive volume deformation with a new set of inventive geometric constraints on the depositional model to allow geologic layers to be restored at a given geological time τ with a precision that has never before been reached. As shown in FIG. 2, in this volume deformation, paleo-geographic coordinates {u(r) and v(r)} and the geological time coordinate t(r) are replaced by new restoration coordinates respectively denoted {$u_\tau(r)$, $v_\tau(r)$} and $t_\tau(r)$.

As shown in FIG. 2:
- a restored volume 203, denoted $\overline{G}_\tau$, contains a (e.g., direct or "right-handed") coordinate space 219 having orthogonal coordinate unit vectors {$\overline{r}_{u_\tau}$, $\overline{r}_{v_\tau}$, $\overline{r}_{t_\tau}$} and a family of horizontal planes {$\overline{S}_\tau(d):d\geq 0$} 207 parallel to horizontal coordinate vectors {$\overline{r}_{u_\tau}$, $\overline{r}_{v_\tau}$};
- a deformed version $G_\tau$ of $\overline{G}_\tau$ contains a (e.g., direct or "right-handed") coordinate space 220 having orthogonal coordinate unit vectors {$r_x$, $r_y$, $r_z$} and a family of curved surfaces {$S_\tau(d):d\geq 0$} 208 parallel to horizon {$H_\tau \cong S_\tau(0)$}(210=208).

For simplicity and without loss of generality, the coordinate frame unit vectors {$\overline{r}_{u_\tau}$, $\overline{r}_{v_\tau}$, $\overline{r}_{t_\tau}$} 219 of the $\overline{G}_\tau$-space and its origin $\overline{O}_{u_\tau v_\tau t_\tau}$ may be equal to the coordinate frame unit vectors {$r_x$, $r_y$, $r_z$} 220 of the G-space and its origin $O_{xyz}$:

$$r_{u_\tau}=r_x; r_{v_\tau}=r_y; r_{t_\tau}=r_z$$

$$\overline{O}_{u_\tau v_\tau t_\tau} = O_{xyz} \quad (12)$$

Referring to FIG. 2, the following notation is used:
each point $r \in G_\tau$ 214 is transformed into point $\overline{r}_\tau \in \overline{G}_\tau$ 213 and vice versa:

$$\overline{r}_\tau \in \overline{G}_\tau \longleftrightarrow r \in G_\tau \quad (13)$$

{$u_\tau(\overline{r}_\tau)$, $v_\tau(\overline{r}_\tau)$} represent the horizontal restoration coordinates of $\overline{r}_\tau$ 213 with respect to {$\overline{r}_{u_\tau}$, $\overline{r}_{v_\tau}$} 219 whilst $t_\tau(\overline{r})$ represents the vertical restoration coordinate or altitude 204 of $\overline{r}_\tau$ 213 with respect to $\overline{r}_{t_\tau}$ oriented upward;

for each point $r \in G_\tau$ 214:
- {x(r), y(r)} represent the horizontal present day coordinates of r with respect to {$r_x$, $r_y$} whilst z(r) represents the vertical present day coordinate or altitude of r with respect to the vertical unit frame vector $r_z$ oriented upward; and
- {$u_\tau(r)$, $v_\tau(r)$, $t_\tau(r)$} represent the restoration coordinates of $\overline{r}_\tau$ with respect to the restoration coordinate frame unit vectors ($\overline{r}_{u_\tau}$, $\overline{r}_{v_\tau}$, $\overline{r}_{t_\tau}$) 219 of the restored volume $\overline{G}_\tau$ 203.

Equivalently to equations (12) and in accordance with equation (1), during restoration of $G_\tau$, a particle of sediment observed today at location r 214 is moved to a new location $\overline{r}(r)$ 213 defined e.g., as follows, where $R_\tau(r)$ is a restoration vector field:

$$\overline{r}(r) = r + R_\tau(r) \quad (14)$$

with, in matrix notation:

$$R_\tau(r) = [r_x, r_y, r_z] \cdot \begin{bmatrix} u_\tau(r) - x(r) \\ v_\tau(r) - y(r) \\ t_\tau(r) - z(r) \end{bmatrix} \quad (15)$$

Referring to FIG. 2, surface $\overline{S}_\tau(0)$ 209 is located at an altitude ($t_\tau = z_\tau^O$) with respect to the vertical unit vector $\overline{r}_{t_\tau}$ oriented upward. In the frame of the presentation of the volume deformation and without loss of generality, $z_\tau^O$ may be assumed to be constant, e.g., equal to zero.

Referring to FIG. 2, surface $\overline{S}_\tau(d)$ 207 is located at a distance (d) from $\overline{S}_\tau(0)$ 209, implying that:

$$t_\tau(\overline{r}_\tau) = d - z_\tau^O \, \forall \overline{r}_\tau \in \overline{S}_\tau(d) \quad (16)$$

such that:

$$\begin{vmatrix} d < 0 \Longleftrightarrow \overline{S}_\tau(d) \text{ is located above } \overline{S}_\tau(0) \\ d > 0 \Longleftrightarrow \overline{S}_\tau(d) \text{ is located below } \overline{S}_\tau(0) \end{vmatrix} \quad (17)$$

FIG. 2 shows the folded present-day volume $G_\tau$ 202 resulting from the deformation of restored volume $\overline{G}_\tau$ 203 under tectonic forces following either a "minimal deformation" or a "flexural slip" tectonic style:

$$\overline{G}_\tau \rightarrow \text{tectonic forces} \rightarrow G_\tau \subseteq G \quad (18)$$

Referring to FIG. 2, the following notation is used:
- each horizontal plane $\overline{S}_\tau(d)$ 207 is transformed into a curved surface $S_\tau(d)$ 208 "parallel" (e.g., this notion of "parallelism" may be characterized by equation (10)) to surface $H_\tau$ 210=208 and each surface $S_\tau(d)$ 208 is a level set of vertical restoration coordinate $t_\tau(r)$;
- the images in $G_\tau$ 202 of the ($u_\tau$), ($v_\tau$) 205, 206 and ($t_\tau$) 204 coordinate axes initially rectilinear and contained in volume $\overline{G}_\tau$ 203 now consist of curvilinear coordinate axes (223, 224) and 222.

As shown in FIG. 2, the part of the subsurface observed today stratigraphically below $H_\tau$ 210 may be identified with the deformed volume $G_\tau$ 202, e.g., such that:
- $S_\tau(0)$ is assumed to be identical to the horizon $H_\tau$ 210 to be restored:

$$S_\tau(0) \cong H_\tau \quad (19)$$

which is equivalent to defining that, on horizon $H_\tau$ 216, restored vertical coordinate $t_\tau(r)$ is equal to $z_\tau^O$;
- for any t<τ the actual geologic horizon $H_t$ 216 is included (212) into the deformed volume $G_\tau$ 202; note that, contrary to surfaces {$S_\tau(d):d\geq 0$} 208, horizons {$H_t$: t<τ} 216 may be non-parallel to {$H_\tau \cong S_\tau(0)$} 210=208;
- after restoration of the volume $G_\tau$ 202 to its initial, unfolded state $\overline{G}_\tau$ 203:
  - all horizons, faults and geological objects included in $G_\tau$ 202 are dragged up by the embedding volume deformation,
  - $\overline{H}_\tau \cong \overline{S}_\tau(0)$) 209=207 may be defined as the restored sea floor as it was at geological time τ.

Minimizing Deformations and Volume Variation

With compaction handled separately in pre and post restoration steps, leaving aside the very particular case of clay and salt layers, tectonic forces generally induce no or negligible variations in volume. Therefore, restoration coordinates {$u_\tau(r)$, $v_\tau(r)$, $t_\tau(r)$} may be chosen in such a way that the $u_\tau$ $v_\tau$ $t_\tau$-transform 201 of the present-day volume $G_\tau$ 202 into the restored volume $\overline{G}_\tau$ 203 minimizes deformations and volume variations. This is achieved by constraining restoration coordinates {$u_\tau(r)$, $v_\tau(r)$, $t_\tau(r)$} to honor the two following conditions in the present day $G_\tau$ domain:
- Surfaces {$S_\tau(d):d\geq 0$} 208 are level sets of the vertical restoration coordinate $t_\tau(r)$ and, for any infinitely small increment ε, the thickness of the thin slice of the volume bounded by $S_\tau(d)$ and $S_\tau(d+\varepsilon)$ are, as much as possible, constant and equal to ε. In other words, $S_\tau(d)$ and $S_\tau(d+\varepsilon)$ are as parallel as possible. This is equivalent to honoring equation (10) as precisely as possible.
- In the frame of this invention, the consistency between the depositional (e.g., GeoChron) model provided as input and its restored version at geological time τ is preserved. Such a consistency is preserved if, and only if, the uvt-transform and the $u_\tau$ $v_\tau$ $t_\tau$-transform of $H_\tau$ are identical. This is achieved by honoring the following inventive boundary conditions, referred to as the ($u_\tau$, $v_\tau$) boundary constraints:

$$\forall r_\tau^o \in H_\tau \begin{vmatrix} 1) \; u_\tau(r_\tau^o) = u(r_\tau^o) \\ 2) \; v_\tau(r_\tau^o) = v(r_\tau^o) \end{vmatrix} \quad (20)$$

$$\forall r_\tau^o \in H_\tau \begin{vmatrix} 1) \; grad \; u_\tau(r_\tau^o) \simeq grad \; u(r_\tau^o) \\ 2) \; grad \; v_\tau(r_\tau^o) \simeq grad \; v(r_\tau^o) \end{vmatrix} \quad (21)$$

Whilst taking the same given tectonic style into account (minimal deformation or flexural slip) as the one honored by paleo-geographic coordinates {u(r), v(r)}, lateral restoration coordinates {$u_\tau(r)$, $v_\tau(r)$} may be defined so that their associated restoration deformations are minimized. To preserve consistency with boundary conditions (20) and (21), this is achieved by honoring the following inventive constraints:

in a minimal deformation tectonic style context, the following "minimal deformation constraints" may be honored by coordinates {$u_\tau$, $v_\tau$}$_r$ where $t_\tau(r)$ is given, e.g., as follows:

$$\forall r \in G_\tau \begin{vmatrix} 1) \; \{grad \; u_\tau \cdot grad \; v_\tau\}_r \simeq 0 \\ 2) \; \{grad \; t_\tau \cdot grad \; u_\tau\}_r \simeq 0 \\ 3) \; \{grad \; t_\tau \cdot grad \; v_\tau\}_r \simeq 0 \end{vmatrix} \quad (22)$$

in a flexural slip tectonic style context, the following "flexural slip constraint" is coupled (containing both lateral restoration coordinates $u_\tau$ and $v_\tau$) and may be honored by coordinates {$u_\tau$, $v_\tau$}$_r$, e.g., as follows:

$$\forall r \in G_\tau : \{grad_S \; u_\tau \cdot grad_S \; v_\tau\}_r \simeq 0 \quad (23)$$

where subscript "S" refers to a projection of the directions of maximal change over iso-value surfaces of the restored vertical coordinate $t\tau$.

So as not to conflict with equations (20) and (21), and contrary to conventional depositional coordinates u and v (e.g., in the GeoChron model), new constraints (22) and (23) do not constrain $\|grad \; u_\tau\|$, $\|grad \; v_\tau\|$, $\|grad_S \; u_\tau\|$, or $\|grad_S \; v_\tau\|$ to be equal to "1".

Restoration

Referring to FIG. 1 and FIG. 2, at geological-time $\tau$, the horizon $H_\tau$ 210 to be restored was coincident with a given surface $S_\tau(0)$ (208=210) considered as the sea-floor. The task of restoration includes:
restoring horizon $H_\tau$ 210 to its initial, unfaulted and unfolded state (e.g., mapping horizon $H_\tau$ onto the sea floor $\overline{S}_\tau(0)$) 209 and
shifting all sedimentary terrains in such a way that, for each point r∈G:
the particle of sediment currently located at point r moves to its former, "restored" location, where the particle was located at geological time $\tau$,
no overlaps or voids/gaps are created in the subsurface.

At geological time $\tau$, the sea floor $\overline{S}_\tau(0)$ (209) is assumed to be a continuous, unfaulted surface whose altitude $z_\tau^O$ is a given function $z_\tau^O(u, v)$. In practice, $\overline{S}_\tau(0)$ (209=207) is typically a flat, horizontal plane whose altitude $z_\tau^O(u, v)$ at geological time $\tau$ is constant. Accordingly, for concision, $z_\tau^O$ may refer to a given function $z_\tau^O(u(r), v(r))$ which may or may not be constant:

$$\forall r \in H_v : z_\tau^O \text{ stands for } t_\tau^O(u(r), v(r)) \quad (24)$$

Compaction

Deformation of sedimentary terrains is typically induced both by tectonic forces and terrain compaction. In order to model separately the effects of these phenomena, the restoration process may proceed as follows:
First, in a preprocessing phase, a total decompaction may be applied to the terrains to cancel the impact of compaction as it is observed today, at the present day or current geological time;
Next, the effects of compaction being canceled, a depositional-based restoration process taking only tectonic deformations into account (and not compaction) is applied to restore the geometry of the subsurface as it would have been observed at geological time $\tau$;
Finally, in a post-processing phase, a partial recompaction is applied to the restored terrains in order to take compaction into account, as it could have been observed at geological time $\tau$.

Depositional Based Restoration

As an input to the restoration process, a given depositional (e.g., GeoChron) model may be received from storage in a digital device (e.g., from memory 150 of FIG. 15).

Referring to FIG. 2, a geological time $\tau$ may be selected that is associated with the given horizon $H_\tau$ 210 to be restored and the given altitude $z_\tau^O$ of the surface $\overline{S\tau}(0)$ 209 onto which the horizon $H\tau$ should be restored.

The region $G_\tau$ 202 may be retrieved as the part of the depositional model where geological time of deposition t(r) is less than or equal to $\tau$ (subsurface regions deposited in a layer deeper than or equal to the layer deposited at time $\tau$).

The set of faults may be split into a subset of $\tau$-active faults cutting $H_\tau$ 210 and a subset of $\tau$-inactive faults which do not cut $H_\tau$.

A geologist or other user may decide to manually transfer some faults from the $\tau$-inactive fault set to the $\tau$-active set, or vice versa, which typically causes greater restoration deformations. For example, manually altering the set of automatically computed $\tau$-active and $\tau$-inactive faults typically makes the restoration less accurate.

Four new 3D piecewise continuous discrete functions {$u_\tau$, $v_\tau$, $t_\tau$, $\varepsilon_\tau$}$_r$ may be created that are defined on grid $\Gamma$ 100 whose discontinuities occur only across $\tau$-active faults, Referring to FIG. 3, to remove discontinuities of discrete functions {$u_\tau$, $v_\tau$, $t_\tau$, $\varepsilon_\tau$}$_r$ across $\tau$-inactive faults, for all $\tau$-inactive faults F 300, one or more of the following inventive (e.g., DSI) constraints may be installed on $\Gamma$ 100, e.g., as:

$$\left. \begin{matrix} 1) \; u_\tau(r_F^\oplus) = u_\tau(r_F^\ominus) \\ 2) \; v_\tau(r_F^\oplus) = v_\tau(r_F^\ominus) \\ 3) \; t_\tau(r_F^\oplus) = t_\tau(r_F^\ominus) \end{matrix} \right\} \forall (r_F^\oplus, r_F^\ominus)_\tau \quad (25)$$

-continued $$\left.\begin{array}{l}1)\ grad\ u_\tau(r_F^\oplus) = grad\ u_\tau(r_F^\ominus)\\ 2)\ grad\ v_\tau(r_F^\oplus) = grad\ v_\tau(r_F^\ominus)\\ 3)\ grad\ t_\tau(r_F^\oplus) = grad\ t_\tau(r_F^\ominus)\end{array}\right\}\forall\ (r_F^\oplus, r_F^\ominus)_\tau \quad (26)$$

$$\left.\begin{array}{l}1)\quad \varepsilon_\tau(r_F^\oplus) = \varepsilon_\tau(r_F^\ominus)\\ 2)\quad grad\ \varepsilon_\tau(r_F^\oplus) = grad\ \varepsilon_\tau(r_F^\ominus)_\tau\end{array}\right\}\forall\ (r_F^\oplus, r_F^\ominus)_\tau \quad (27)(28)$$

where $(r_F^\oplus, r_F^\ominus)_\tau$ (304,306) represents a pair of "mate-points" collocated on both sides of F 300 and assigned to F$^+$ 103 and F$^-$ 104, respectively, and $\varepsilon_\tau(r)$ represents an error correction constraint. Constraints (25), (26), (27) and (28) may be referred to collectively as "fault transparency constraints."

Assuming that $TH_{min}>0$ is a given threshold chosen by a geologist or other user, fault transparency constraints (25), (26), (27) and (28) may be locally installed at any point $r_F$ on a τ-active fault F where fault throw is lower than $TH_{min}$. As a non-limitative example, $TH_{min}$ may be equal to 1 meter.

Two new discrete vector fields r* and R$_\tau$ may be defined on 3D grid Γ 100.

For each node α∈Γ 107:

r*(α) may be initialized as the initial location of α:

$$r^*(\alpha) = r(\alpha) \quad (29)$$

a decompaction transformation C$^-$(r) known in the art may be used to move α vertically downward from its current compacted altitude z(a) to a new decompacted (e.g., deeper) altitude:

$$r(\alpha) \leftarrow C^-(r(\alpha)) \quad (30)$$

Vertical Restoration Coordinate $t_\tau(r)$

Referring to FIG. 2 and FIG. 7, the depositional uvt-transform 700 of G$_\tau$ 202 is typically correct when equation (3) is honored. Based on this observation, embodiments of the present invention adapt equation (3) for the inventive restoration technique, replacing the vertical depositional coordinate t(r) by a vertical restoration coordinate $t_\tau(r)$ and replacing equation (3) by the following inventive thickness-preserving constraint to ensure layer thickness is preserved and surfaces $\{S_\tau(d):d\geq 0\}$ are parallel:

$$\|grad\ t_\tau(r)\| \approx 1\ \forall r \in G_\tau \quad (31)$$

In addition, to allow H$_\tau$ 210 to be restored on surface $\bar{S}_\tau(0)$ 209, the vertical restoration coordinate $t_\tau(r)$ may honor the following boundary condition, e.g., as a DSI constraint on grid Γ 100, referred to as the "paleo-sea-floor constraint":

$$t_\tau(r_H) = z_\tau^o \forall r_H \in H_\tau \quad (32)$$

Due to its non-linearity, thickness-preserving equation (31) cannot be implemented as a DSI constraint, which must be linear. In order to incorporate the thickness-preserving equation into the restoration model using the DSI method, various linear surrogates of equation (31) may be used to approximate $t_\tau(r)$ as follows:

Referring to FIG. 1, to approximate thickness-preserving equation (31), as a non-limitative example, install the following DSI constraints on the grid Γ 100 where $r_{T0}$ and $r_{T*}$ are arbitrary points belonging to any pair (T$^o$, T*) of adjacent cells 108 of grid Γ 100 and where N(r$_h$) is the field of unit vectors defined on H$_\tau$, orthogonal to H$_\tau$ and oriented in the direction of younger terrains:

1) grad $t_\tau(r_H) = N(r_H) \forall r_H \in H_\tau$ 2) grad $t_\tau(r_{T0}) \approx$ grad $i_\tau(r_{T*}) \forall (T^o, T^*)$ (33)

Referring to FIG. 1, to approximate thickness-preserving equation (31), alternatively as a non-limitative example, install the inventive DSI constraints on grid Γ 100 as follows:

$$1)\ grad\ t_\tau(r) = \frac{grad\ t(r)}{\|grad\ t(r)\|} \quad \forall\ r \in G_\tau \quad (34)$$

2) grad $i_\tau(r_{T_o}) \approx$ grad $t_\tau(r_{T^*}) \forall (T^\circ, T^*)$ where $r_{T0}$ and $r_{T*}$ are arbitrary points belonging to any pair (T$^o$, T*) of adjacent cells of grid Γ 100 (e.g., the centers of T$^o$ and T*, respectively).

Constraints (33) and (34) are only examples of possible surrogate-thickness-preserving constraints. Other examples of such surrogate thickness-preserving constraints may be used.

Referring to FIG. 3, contrary to constraint (33)-(1), new inventive constraint (34)-(1) benefits from the geologic observation that, throughout the entire domain G$_\tau$ 202, surfaces $\{S_\tau(d):d\geq 0\}$ 208 generally have a shape roughly similar to the level sets of the geologic time of deposition t(r);

Assuming that constraints (32) and (33) or (34) are installed on grid Γ 100, a first approximation of vertical restoration coordinate $t'_\tau(r)$ may be computed by running the DSI method on grid Γ 100.

Honoring constraint (31) significantly increases the accuracy of the restoration model and a violation of this constraint not only degrades the accuracy of the vertical restoration coordinate $t_\tau(r)$ but also the horizontal restoration coordinates $\{u_\tau(r), v_\tau(r)\}$ as they are linked to $t_\tau(r)$ (e.g., by equations (22) and (23)). Accordingly, there is a great need for validating any approximation technique used to compute $t_\tau(r)$.

Figure 4:
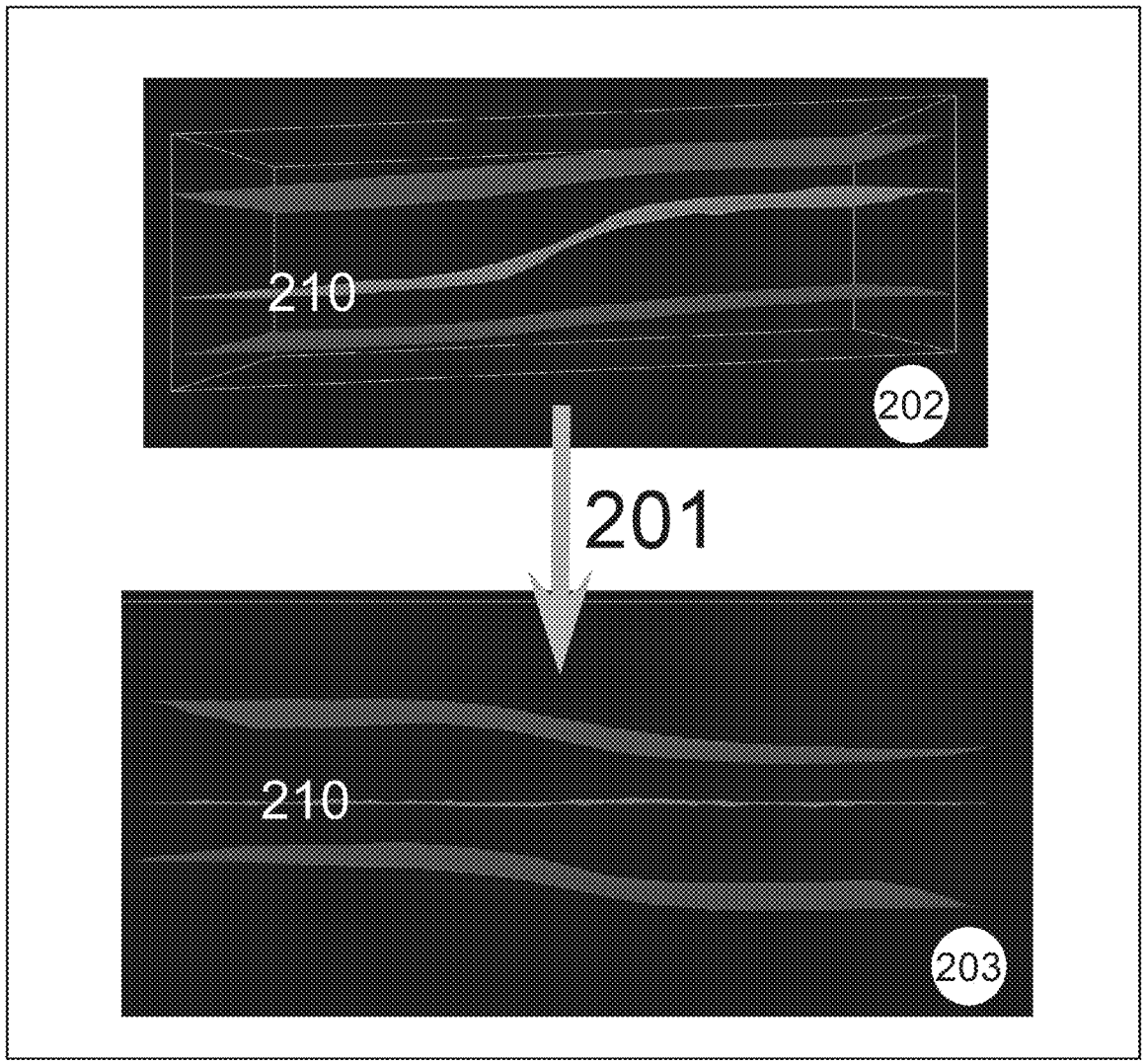
FIG. 4 schematically illustrates an example 3D geological model used to test the accuracy of the vertical restoration coordinate $t_\tau(r)$ according to an embodiment of the invention. This example 3D geological model has a "ramp" geological structure with a restored horizon $H_\tau$ 210 as the central, sigmoid surface. This seemingly "simple" test comprises highly complex calculations because there are large variations in layer thickness which make numerical computation of the geological time of deposition t(r) more challenging.

To test the accuracy of the various approximations of $t_\tau(r)$, an example geological terrain is provided in FIG. 4. Despite the apparent simplicity of this terrain, because the thicknesses of the layers vary, this test example is challenging and useful in comparing the accuracy of inventive embodiments with other conventional techniques.

Figure 5:
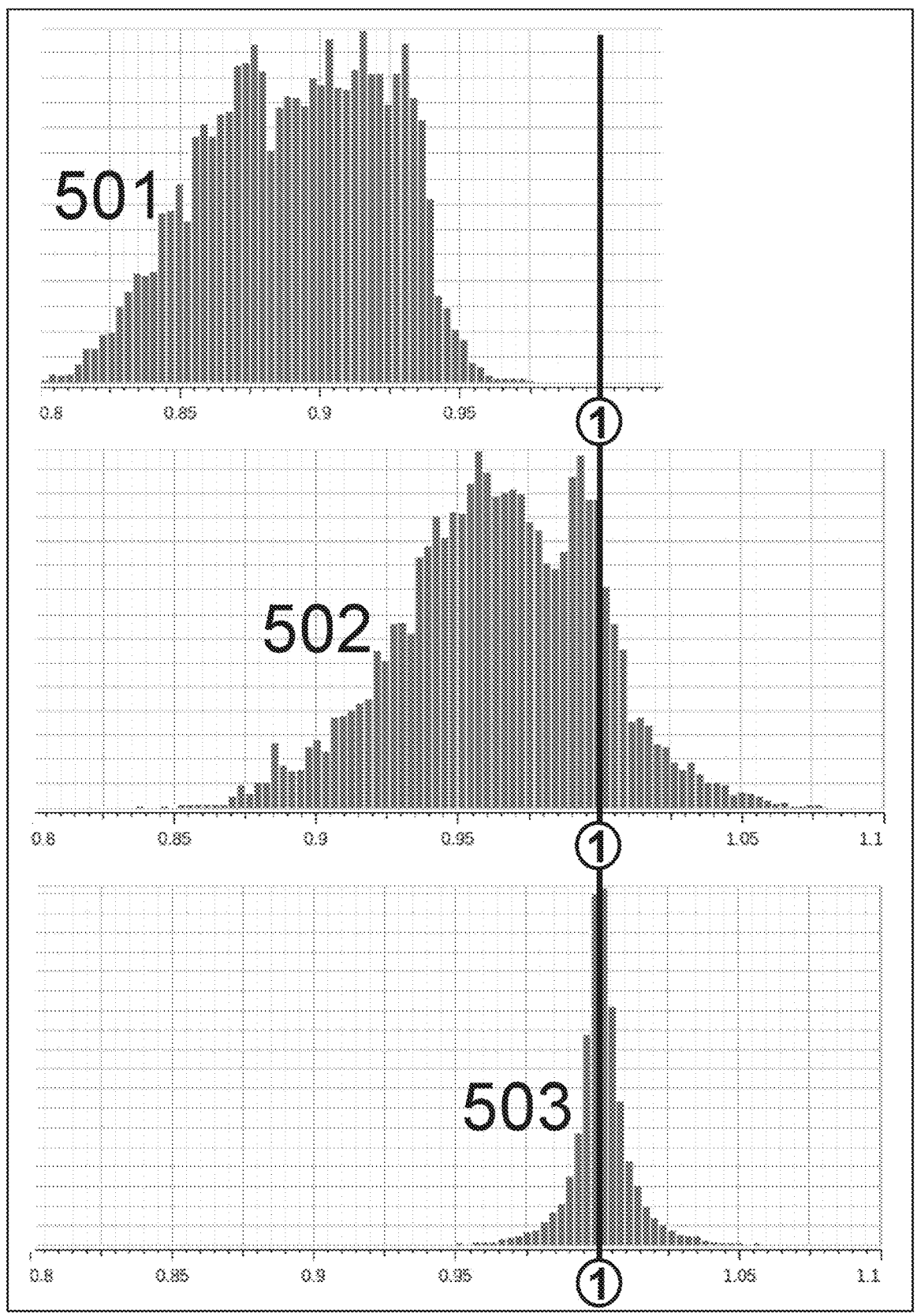
FIG. 5 shows a comparison of multiple histograms 501, 502 and 503 of $\|\text{grad } t_\tau(r)\|$ each using a different method to compute $t_\tau(r)$ in the test case domain $G_\tau$ of FIG. 4. Depending on the method used to compute $t_\tau(r)$, the resulting magnitude of grad $t_\tau(r)$ may severely deviate from the ideal value of "1," as required by equation (10). Histogram 503, which is generated according to an inventive embodiment, is the closest approximation of (10), yielding the most accurate restoration model.

FIG. 5 shows histograms 501 and 502 of the distributions of $\|grad\ t_\tau\|$, where $t_\tau$ is approximated using constraints (33) or (34), respectively, in the example geological terrain G$_\tau$ 202 shown in FIG. 4. FIG. 5 shows that when $t_\tau$ is approximated by constraints (33) or (34), $\|grad\ i_\tau\|$ significantly differs from "1". Therefore, while constraints (34) provide a better approximation of the thickness-preserving equation (31) than constraints (33), both of these approximations are inaccurate.

Figure 9:
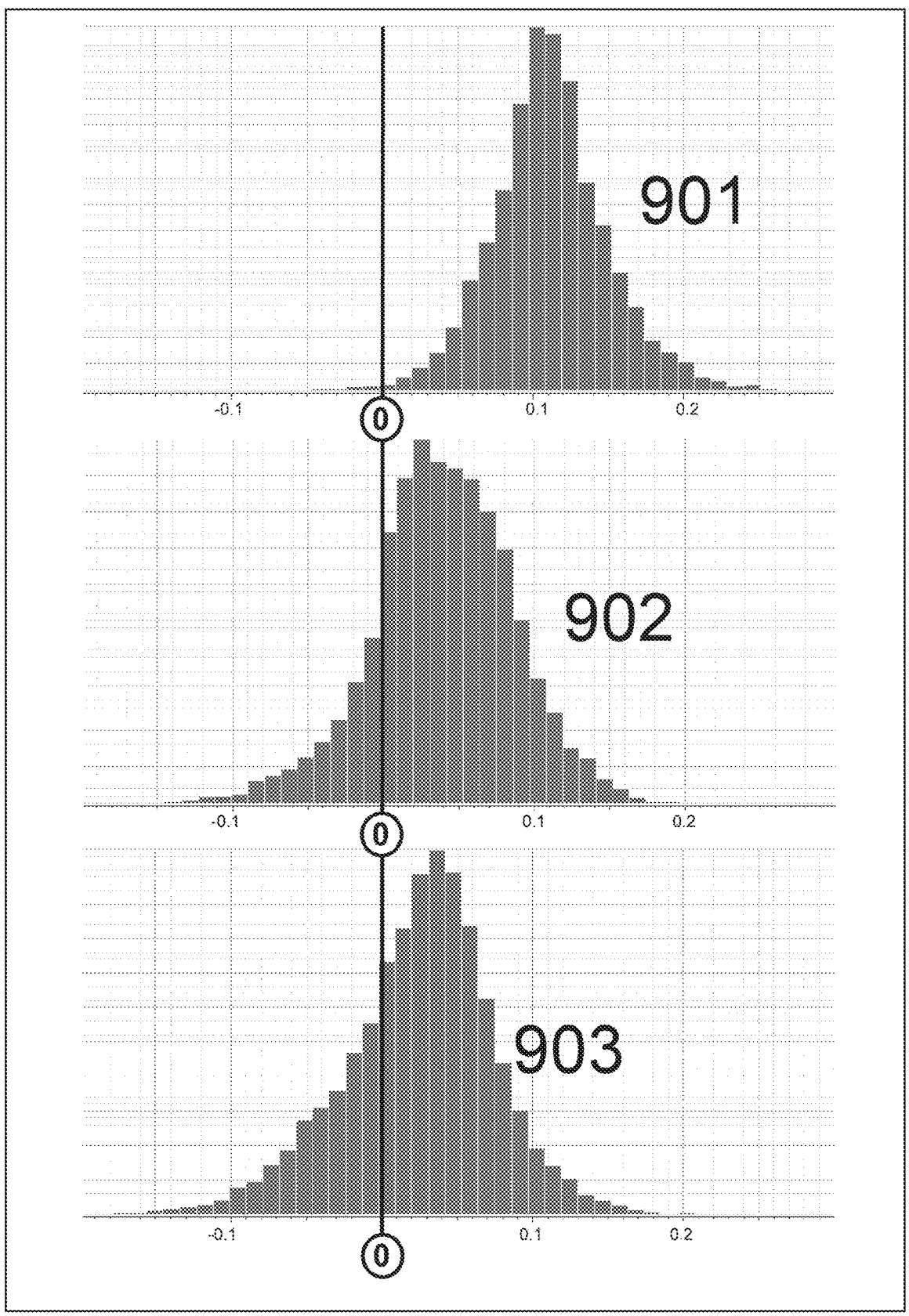
FIG. 9 shows a comparison of multiple histograms 901, 902 and 903 of $\Delta V/V$ each using a different method to compute $t_\tau(r)$ in the test case domain $G_\tau$ of FIG. 4. Depending on the method used to compute $t_\tau(r)$, the resulting magnitude of $\Delta V/V$ may severely deviate from the target value of "0". Histogram 903, which is generated according to an embodiment of the invention, has the least amount of volume variation, yielding the most accurate restoration model.
Figure 10:
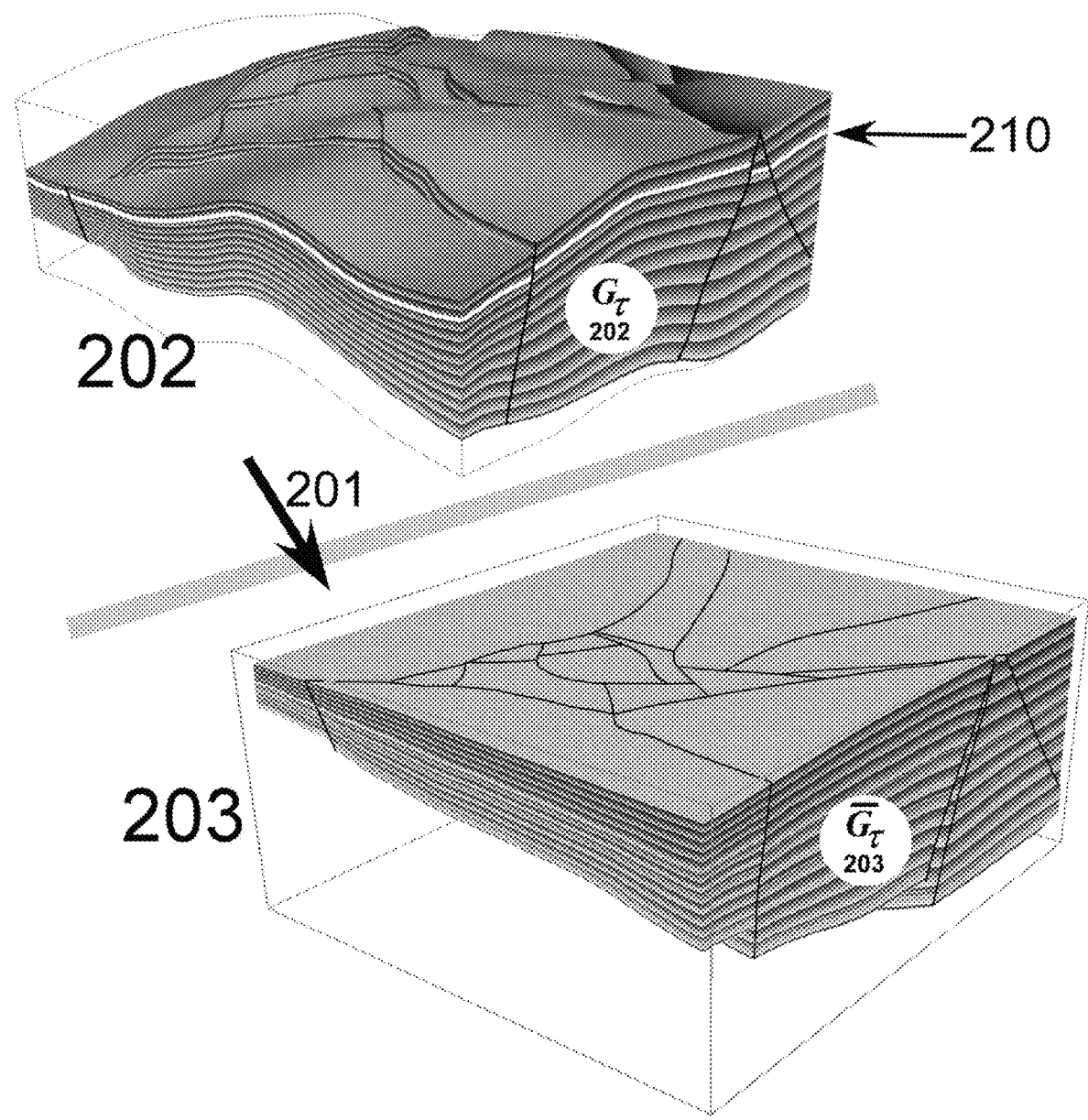
FIG. 10 schematically illustrates an example of a 3D $u_\tau$ $v_\tau$ $t_\tau$-transform 201 of a horizon $H_\tau$ 210 (depicted as a white layer) from a present day domain G 202 to a restored domain $\overline{G}_\tau$ 203 at restoration time $\tau$ according to an embodiment of the invention.
Figure 11:
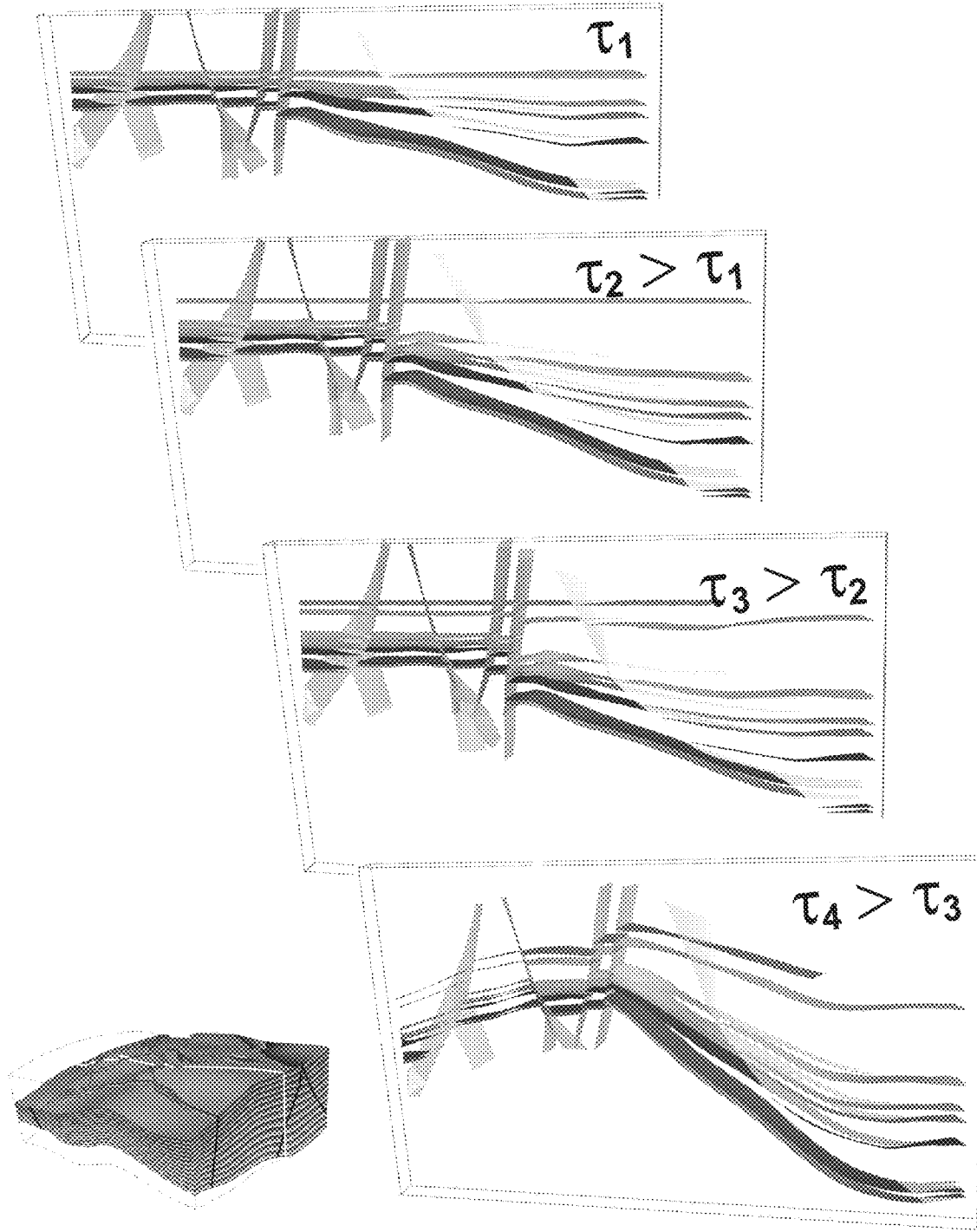
FIG. 11 schematically illustrates an example of a sequence of restorations at geological times $\{\tau_1 < \tau_2 < \ldots < \tau_n\}$ of vertical cross sections of the 3D model of FIG. 10 according to an embodiment of the invention.

Similarly, FIG. 9 shows histograms 901 and 902 of relative variations of volume ΔV/V induced by the restoration of H$_\tau$ 210 over G$_\tau$ 202 shown in FIG. 4, where $t_\tau$ is approximated using constraints (33) or (34), respectively. Ideally, a restoration transformation should minimize variations in volume ΔV/V from the present day to the restored model. FIG. 9 however shows that a restoration based on constraints (33) or (34) results in a volume variation ΔV/V that significantly differs from the ideal value of "0". While constraints (34) result in a smaller volume variation ΔV/V than constraints (33), both of these approximations induce a significant volume variation ΔV/V and are inaccurate.

Improving Vertical Restoration Coordinate $t_\tau(r)$

An approximation of the vertical restoration coordinate $t'_\tau(r)$ may be improved by a "$t_\tau$-incremental improvement" constraint, e.g., as follows:

$$t_\tau(r) = t'_\tau(r) + \varepsilon_\tau(r) \, \forall r \in G_\tau \tag{35}$$

where $\varepsilon_\tau(r)$ is an error correction term, e.g., as characterized below.

Accordingly, assuming that an initial approximation $t'_\tau(r)$ has already been obtained, to compute an improved version of $t_\tau(r)$, the following inventive incremental procedure may be executed:

For each point $r_H \in H_\tau$, set the following equation as an inventive sea-floor-error constraint e.g., using the DSI method:

$$\varepsilon_\tau(r_H) = 0 \, \forall r_H \in H_\tau \tag{36}$$

this constraint assumes that constraint (32) remains honored.

For each cell $T \in \Gamma \cap G_\tau$ 108, choose a point $r_\tau$ in the cell T (e.g., its center) and install the new linear thickness-preserving constraint, e.g., using the DSI method as follows:

$$\text{grad } \varepsilon_\tau(r_\tau) \cdot \text{grad } t'_\tau(r_\tau) \simeq \tfrac{1}{2}\{1 - \|\text{grad } t'_\tau(r_\tau)\|^2\} \tag{37}$$

This constraint is linear, deduced from a linear second order approximation of equation (31). Further, this constraint ensures that, after applying the $t_\tau$—incremental improvement correction constraint (35), the local value of $\|\text{grad } t_\tau(r)\|$ at any point $r \in G_\tau$ is as close as possible to "1."

For each sampling point r located on a $\tau$-active fault, install for $\varepsilon_\tau(r)$ the following inventive DSI constraint referred to as the "$t_\tau$—incremental boundary" constraint:

$$\text{grad } \varepsilon_\tau(r) \times \text{grad } t_\tau(r) \simeq 0 \tag{38}$$

This constraint specifies that, after applying correction constraint (35), in the close neighborhood of $\tau$-active faults, the shape of level sets of $t_\tau(r)$ remains roughly unchanged.

To ensure piecewise continuity of the error correction $\varepsilon_\tau(r)$, install DSI gradient smoothness constraints, known in the art, for the error correction $\varepsilon_\tau(r)$.

Assuming that constraints (36), (37) and (38) are installed on grid $\Gamma$ 100, to interpolate the error correction $\varepsilon_\tau(r)$, run DSI on grid $\Gamma$ 100.

For each node $\alpha \in \Gamma$ 107, update the vertical restoration coordinate $t_\tau(\alpha)$ as follows:

$$t_\tau(\alpha) = t'_\tau(\alpha) + \varepsilon_\tau(\alpha) \tag{39}$$

In the test case represented by FIG. 4 and FIG. 5, the histogram 503 of the distribution of $\|\text{grad } t_\tau\|$, where $t_\tau$ is approximated by constraints (37) over $G_\tau$ 202 is now considerably better than histograms 501 and 502 obtained with constraints (33) or (34), respectively. In particular:

As specified by equation (10), distribution 503 is now centered on value "1". This condition is of paramount importance to minimize deformations during the restoration process generated by a $u_\tau v_\tau t_\tau$-transform.

The standard deviation of distribution 503 is considerably reduced as compared to the relatively wider standard deviation of distributions 501 and 502.

Moreover, in the test case represented in FIG. 4 and FIG. 9, the histogram 903 of the distribution of relative variations of volume $\Delta V/V$ induced by a restoration of $H_\tau$ 210 over $G_\tau$ 202, where $t_\tau$ is obtained using constraints (37) is significantly more accurate than histograms 901 and 902, where $t_\tau$ is obtained using constraints (33) or (34), respectively. The center of histogram 903 of volume variation $\Delta V/V$ is closer to the ideal value "0" than histograms 901 and 902, which indicates that variations of volume are better minimized after applying second order constraints (37) than constraints (33) or (34).

Horizontal Restoration Coordinates $\{u_\tau(r), v_\tau(r)\}$

Referring to FIG. 2, with respect to surfaces $\{S_\tau(d):d \geq 0\}$ 208, horizontal restoration coordinates $\{u_\tau(r), v_\tau(r)\}$ play a role similar to the one played by paleo-geographic coordinates $\{u(r), v(r)\}$ with respect to horizons $\{H_t: t \geq 0\}$ 216 of the depositional model provided as input. Based on this similarity, horizontal restoration coordinates $\{u_\tau(r), v_\tau(r)\}$ may be generated as follows:

install equations (20) and (21) as inventive boundary constraints.

for all points $r \in G_\tau$ 214, define as follows inventive vectors fields $a_\tau(r)$ and $b_\tau(r)$ respectively, referred to as the "$\tau$-axe" and "$\tau$-coaxe" vector fields:

$$a_\tau(r) = \text{grad } t_\tau(r) \times \text{grad } u(r) \times \text{grad } t_\tau(r)$$

$$b_\tau(r) = \text{grad } t_\tau(r) \times a_\tau(r) \tag{40}$$

The $\tau$-axe and $\tau$-coaxe vector fields $a_\tau(r)$ and $b_\tau(r)$ differ considerably from the local axe and co-axe vectors fields $a(r)$ and $b(r)$, e.g., as discussed in U.S. Pat. No. 8,711,140, which is incorporated by reference herein in its entirety. These new $\tau$-axe and $\tau$-coaxe vectors $a_\tau(r)$ and $b_\tau(r)$ strongly depend on the new vertical restoration coordinate $t_\tau(r)$ (e.g., already computed as above) and also take into account the gradient of the paleo-geographic coordinate $u(r)$ (e.g., associated to the depositional model provided as input).

if the tectonic style is minimal deformation then, to approximate equations (22), install the following inventive "surrogate minimal-deformation" constraints e.g., using the DSI method:

$$\forall r \in G_\tau : \begin{vmatrix} \text{grad } u_\tau(r) \cdot b_\tau(r) \simeq 0 \\ \text{grad } v_\tau(r) \cdot a_\tau(r) \simeq 0 \end{vmatrix} \tag{41}$$

if the tectonic style is flexural slip then, to approximate equations (23), install the following inventive "surrogate flexural-slip" constraints e.g., using the DSI method:

$$\forall r \in G_\tau : \begin{vmatrix} \text{grad}_s \, u_\tau(r) \cdot b_\tau(r) \simeq 0 \\ \text{grad}_s \, v_\tau(r) \cdot a_\tau(r) \simeq 0 \end{vmatrix} \tag{42}$$

where subscript "S" refers to a projection of the directions of maximal change over iso-value surfaces of the restored vertical coordinate $t\tau$.

Referring to FIG. 1 and FIG. 6, to prevent the $u_\tau v_\tau t_\tau$-transform used as a restoration operator from generating gaps and overlaps along $\tau$-active faults, specific constraints may be added along fault striae induced by twin-points of the depositional model provided as input. For that purpose, for each pair of twin-points $(r_F^+, r_F^-)$ (101,102) located on faces $F^+$ 103 and $F^-$ 104 of a τ-active fault F 105, respectively, a process may proceed according to as follows:

retrieve the fault stria $\sigma(r_F^-)$ 600 passing through twin points $(r_F^+, r_F^-)$ (101,102), and on curve $\sigma(r_F^-)$ 600, retrieve a point $\tilde{r}_F^+$ 601 located on $F^+$ 103 and such that $t_\tau(\tilde{r}_F^+)$ is approximately equal to $t_\tau(r_F^-)$.

install the following inventive "τ-fault-striae" constraints e.g., using the DSI method:

$$\begin{vmatrix} 1) & u_\tau(\tilde{r}_F^+) \simeq u_\tau(r_F^-) \\ 2) & v_\tau(\tilde{r}_F^+) \simeq v_\tau(r_F^-) \end{vmatrix} \qquad (43)$$

To ensure piecewise continuity of horizontal restoration coordinates $u_\tau(r)$ and $v_\tau(r)$, install gradient smoothness constraints e.g., using the DSI method.

To compute the pair of horizontal restoration coordinates $\{u_\tau(r), v_\tau(r)\}$ honoring constraints (20), (41 or 42) and (43), run DSI on grid Γ 100.

Computing the Restoration $R_\tau(r)$

The restoration vector field $R_\tau(r)$ represents the field of deformation vectors from the present day (e.g., xyz) space to the restoration (e.g., $u_\tau v_\tau t_\tau$) space, e.g., computed from the $u_\tau v_\tau t_\tau$-transform.

Referring to FIG. 1, for each node α 107 of 3D grid Γ 100, move α to restored location $\bar{r}(\alpha)$, e.g., defined as follows:

$$\bar{r}(\alpha) = u_\tau(\alpha) \cdot r_x + v_\tau(\alpha) \cdot r_y + t_\tau(\alpha) \cdot r_z \qquad (44)$$

For each node α 107 of 3D grid Γ 100:

if, to compute vertical restoration coordinate $t_\tau(r)$, compaction was taken into account, then, using a recompaction operator $C^+(r)$ known in the art, move α vertically upward from its current decompacted altitude z(α) to a new recompacted (shallower) altitude:

$$r(\alpha) \leftarrow C^+(r(\alpha)) \qquad (45)$$

save the restoration vector Rτ(α) on a digital device:

$$R\tau(\alpha) = r(\alpha) - r^*(\alpha) \qquad (46)$$

where $r^*(\alpha)$ is defined e.g., in equation (29).

reset location r(α) of α to its initial location before restoration:

$$r(\alpha) \leftarrow r^*(\alpha) \qquad (47)$$

stop.

Scanning the Subsurface Through Time

Consider a series of geological restoration times ($\{\tau_1 < \tau_2 < \ldots < \tau_n\}$ associated with reference horizons $H_{\tau_1}, H_{\tau_2}, \ldots, H_{\tau_n}$, respectively. Using the restoration method described herein, for each ($\tau_j = \tau$), build and store on a digital device a restoration vector field $R_{\tau_i}(r) = R_\tau(r)$, e.g., as:

$$\begin{array}{cccc} \tau_1 & < & \tau_2 & < & \ldots & < & \tau_n \\ \updownarrow & & \updownarrow & & & & \updownarrow \\ R_{\tau_1} & & R_{\tau_2} & & & & R_{\tau_n} \end{array} \qquad (48)$$

In addition to these reference restoration times, an additional restoration time $\tau_{n+1}$ may be added to be associated with the horizontal plane $H_{t_{n+1}}$ located at a constant altitude $z_{r_{n+1}}^0$ of the sea level. Time $\tau_{n+1}$ may be the present day geological time and, provided that $\tau_{n+1}$ is greater than $\tau_n$, any arbitrary value may be chosen for $\tau_{n+1}$. As a non-limitative example, $\tau_{n+1}$ may be defined as:

$$\tau_{n+1} = \tau_n + 1 \qquad (49)$$

Because $\tau_{n+1}$ is the present day, applying the restoration vector field $R\tau_{n+1}(r)$ to the present day horizon $H_{t_{n+1}}$ should leave $H_{t_{n+1}}$ unchanged e.g., as follows:

$$R\tau_{n+1}(r) = 0 \quad \forall r \in G \qquad (50)$$

To explore subsurface evolution throughout geological times, a process may proceed as follows:

as input, read a depositional (e.g., GeoChron) model and associated series of restoration vector fields $\{R_{\tau_1}, R_{\tau_2}, \ldots, R_{\tau_{n+1}}\}$ stored on a digital device;

using an input device such as, in a non-limitative example, the keyboard of a computer or the wheel of a computer mouse, select a geological time $\tau_i$ in the given list of geological times $\{\tau_1 < \tau_2 < \ldots \tau_{n+1}\}$;

for each vertex α∈Γ 107, save a copy $r^*(\alpha)$ of the location of this node in the depositional model given as input;

apply the restoration vector field $R_{\tau_i}(r)$ to the depositional model given as input;

display the restored model on a device such as, in a non-limitative example, a display (e.g., display 180 of FIG. 15), such as, a screen, a hologram or a 3D printer;

repeat the previous operations as long as desired.

optionally, to modify the geometry of the horizons at geological time $\tau_i$, use a computerized tool known in the art to edit the geological time of deposition t(r);

for each vertex α 107 of 3D grid Γ 100, use copy $r^*(\alpha)$ to restore r(α) to its present day location:

$$r(\alpha) \leftarrow r^*(\alpha) \forall \alpha \in \Gamma \qquad (51)$$

such an operation implicitly and automatically propagates the modifications of the geometry of horizons optionally performed above;

return to the first step above.

Geological Tomography

Geological models are generated using geological or seismic tomography technology. Geological tomography generates an image of the interior subsurface of the Earth based on geological data collected by transmitting a series of incident waves and receiving reflections of those waves across discontinuities in the subsurface. A transmitter may transmit signals, for example, acoustic waves, compression waves or other energy rays or waves, that may travel through subsurface structures. The transmitted signals may become incident signals that are incident to subsurface structures. The incident signals may reflect at various transition zones or geological discontinuities throughout the subsurface structures, such as, faults or horizons. The reflected signals may include seismic events. A receiver may collect data, for example, reflected seismic events. The data may be sent to a modeling mechanism that may include, for example, a data processing mechanism and an imaging mechanism.

Figure 14:
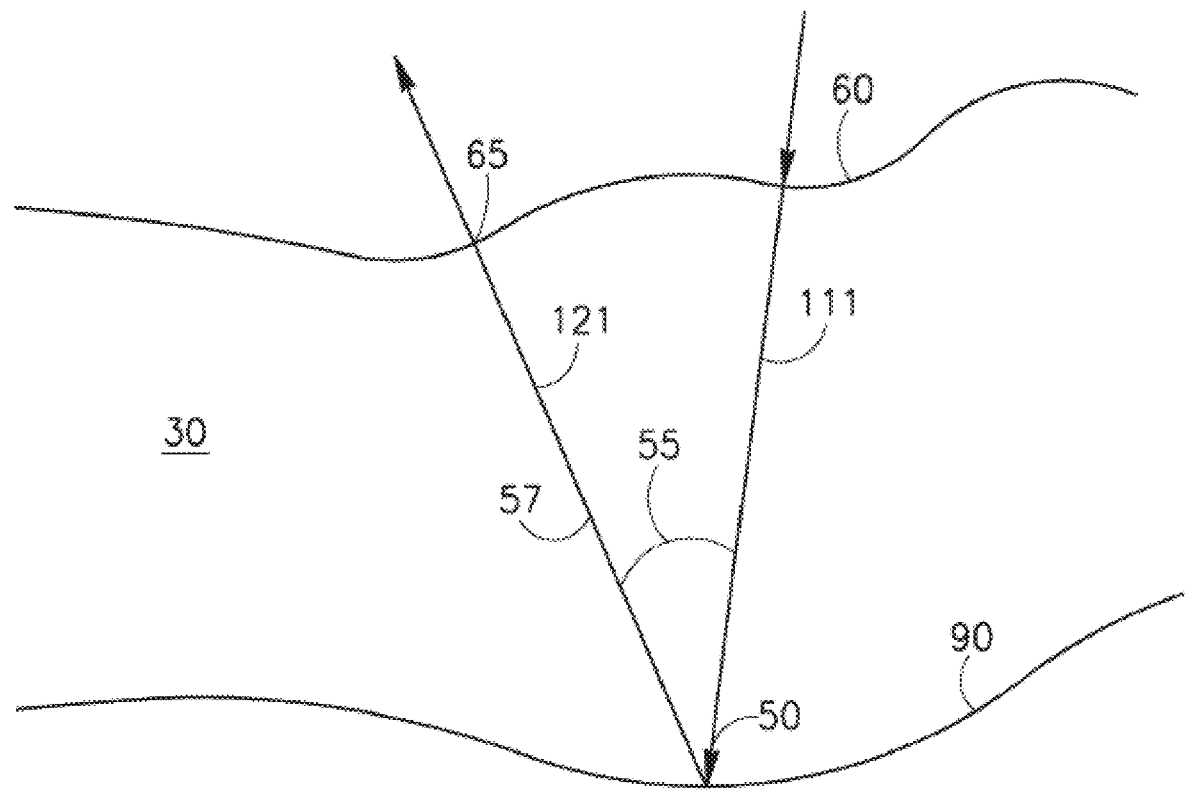
FIG. 14 schematically illustrates a geological tomography technique in which a series of incident and reflected waves are propagated through a subsurface region of the Earth to image the subsurface according to an embodiment of the invention.

Reference is made to FIG. 14, which is a schematic illustration of a geological tomography technique in which a series of incident rays 111 and reflected rays 121 are propagated through a subsurface region of the Earth 30 to image the subsurface, according to an embodiment of the invention.

One or more transmitter(s) (e.g., 190 of FIG. 15) located at incident location(s) 60 may emit a series of incident rays 111. Incident rays 111 may include for example a plurality of energy rays related to signal waves, e.g., sonic waves, seismic waves, compression waves, etc. Incident rays 111 may be incident on, and reflect off of, a subsurface structure or surface 90 at a reflection point 50. Multiple reflection points 50 may be identified or imaged or displayed in conjunction to display, for example, a horizon.

One or more receiver(s) (e.g., 140 of FIG. 15) located at reflected location(s) 65 may receive the reflection rays 121. Reflection rays 121 may be the reflected images of incident rays 111, for example, after reflecting off of image surface 90 at target point 50. The angle of reflection 55 may be the angle between corresponding incident rays 111 and reflected rays 121 at reflection point 50. An incident rays 111 and a corresponding reflected rays 121 may propagate through a cross-section of a subsurface structure 30. Incident rays 111 may reflect off of a subsurface feature 90 at a reflection point 50, for example, a point on an underground horizon, the seafloor, an underground aquifer, etc.

One or more processor(s) (e.g., 140 of FIG. 15) may reconstitute incident and reflected rays 111 and 121 to generate an image the subsurface 30 using an imaging mechanism. For example, a common reflection angle migration (CRAM) imaging mechanism may image reflection points 50 by aggregating all reflected signals that may correspond to a reflection point, for example, reflected signals that may have the same reflection angle. In other examples, imaging mechanisms may aggregate reflected signals that may have the same reflection offset (distance between transmitter and receiver), travel time, or other suitable conditions.

The processor(s) may compose all of the reflection points 50 to generate an image or model of the present day underground subsurface of the Earth 30. The processor(s) may execute a restoration transformation (e.g., $u_\tau v_\tau t_\tau$-transform 201) to transform the present day model of subsurface 30 to a restored subsurface image 203 at a restoration time $\tau$. One or more display(s) (e.g., 180 of FIG. 15) may visualize the present day subsurface image 30 and/or the restored subsurface image 203.

System Overview

Reference is made to FIG. 15, which schematically illustrates a system including one or more transmitter(s), one or more receiver(s) and a computing system in accordance with an embodiment of the present invention. Methods disclosed herein may be performed using a system 1505 of FIG. 15.

System 1505 may include one or more transmitter(s) 190, one or more receiver(s) 120, a computing system 130, and a display 180. The aforementioned data, e.g., seismic data used to form intermediate data and finally to model subsurface regions, may be ascertained by processing data generated by transmitter 190 and received by receiver 120.

Intermediate data may be stored in memory 150 or other storage units. The aforementioned processes described herein may be performed by software 160 being executed by processor 140 manipulating the data.

Transmitter 190 may transmit signals, for example, acoustic waves, compression waves or other energy rays or waves, that may travel through subsurface (e.g., below land or sea level) structures. The transmitted signals may become incident signals that are incident to subsurface structures. The incident signals may reflect at various transition zones or geological discontinuities throughout the subsurface structures. The reflected signals may include seismic data.

Receiver 120 may accept reflected signal(s) that correspond or relate to incident signals, sent by transmitter 190. Transmitter 190 may transmit output signals. The output of the seismic signals by transmitter 190 may be controlled by a computing system, e.g., computing system 130 or another computing system separate from or internal to transmitter 190. An instruction or command in a computing system may cause transmitter 190 to transmit output signals. The instruction may include directions for signal properties of the transmitted output signals (e.g., such as wavelength and intensity). The instruction to control the output of the seismic signals may be programmed in an external device or program, for example, a computing system, or into transmitter 190 itself.

Computing system 130 may include, for example, any suitable processing system, computing system, computing device, processing device, computer, processor, or the like, and may be implemented using any suitable combination of hardware and/or software. Computing system 130 may include for example one or more processor(s) 140, memory 150 and software 160. Data 155 generated by reflected signals, received by receiver 120, may be transferred, for example, to computing system 130. The data may be stored in the receiver 120 as for example digital information and transferred to computing system 130 by uploading, copying or transmitting the digital information. Processor 140 may communicate with computing system 130 via wired or wireless command and execution signals.

Memory 150 may include cache memory, long term memory such as a hard drive, and/or external memory, for example, including random access memory (RAM), read only memory (ROM), dynamic RAM (DRAM), synchronous DRAM (SD-RAM), flash memory, volatile memory, non-volatile memory, cache memory, buffer, short term memory unit, long term memory unit, or other suitable memory units or storage units. Memory 150 may store instructions (e.g., software 160) and data 155 to execute embodiments of the aforementioned methods, steps and functionality (e.g., in long term memory, such as a hard drive). Data 155 may include, for example, raw seismic data collected by receiver 120, instructions for building a mesh (e.g., 100), instructions for partitioning a mesh, and instructions for processing the collected data to generate a model, or other instructions or data. Memory 150 may also store instructions to divide and model $\tau$-active faults and $\tau$-inactive faults. Memory 150 may generate and store the aforementioned constraints, restoration transformation (e.g., $u_\tau v_\tau t_\tau$-transform 201), restoration coordinates (e.g., $u_\tau, v_\tau, t_\tau$), a geological-time and paleo-geographic coordinates (e.g., u, v, t), a model representing a structure when it was originally deposited (e.g., in uvt-space), a model representing a structure at an intermediate restoration time (e.g., in $u_\tau, v_\tau, t_\tau$-space), and/or a model representing the corresponding present day structure in a current time period (e.g., in xyz-space). Memory 150 may store cells, nodes, voxels, etc., associated with the model and the model mesh. Memory 150 may also store forward and/or reverse $u_\tau, v_\tau, t_\tau$-transformations to restore present day models (e.g., in xyz-space) to restored models (e.g., in $u_\tau, v_\tau, t_\tau$-space), and vice versa. Memory 150 may also store the three-dimensional restoration vector fields, which when applied to the nodes of the initial present day model, move the nodes of the initial model to generate one of the plurality of restored models.

Applying a restoration vector field to corresponding nodes of the present day model may cause the nodes to "move", "slide", or "rotate", thereby transforming modeled geological features represented by nodes and cells of the initial model. Data 155 may also include intermediate data generated by these processes and data to be visualized, such as data representing graphical models to be displayed to a user. Memory 150 may store intermediate data. System 130 may include cache memory which may include data duplicating original values stored elsewhere or computed earlier, where the original data may be relatively more expensive to fetch (e.g., due to longer access time) or to compute, compared to the cost of reading the cache memory. Cache memory may include pages, memory lines, or other suitable structures. Additional or other suitable memory may be used.

Computing system 130 may include a computing module having machine-executable instructions. The instructions may include, for example, a data processing mechanism (including, for example, embodiments of methods described herein) and a modeling mechanism. These instructions may be used to cause processor 140 using associated software 160 modules programmed with the instructions to perform the operations described. Alternatively, the operations may be performed by specific hardware that may contain hardwired logic for performing the operations, or by any combination of programmed computer components and custom hardware components.

Embodiments of the invention may include an article such as a non-transitory computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

Figure 13:
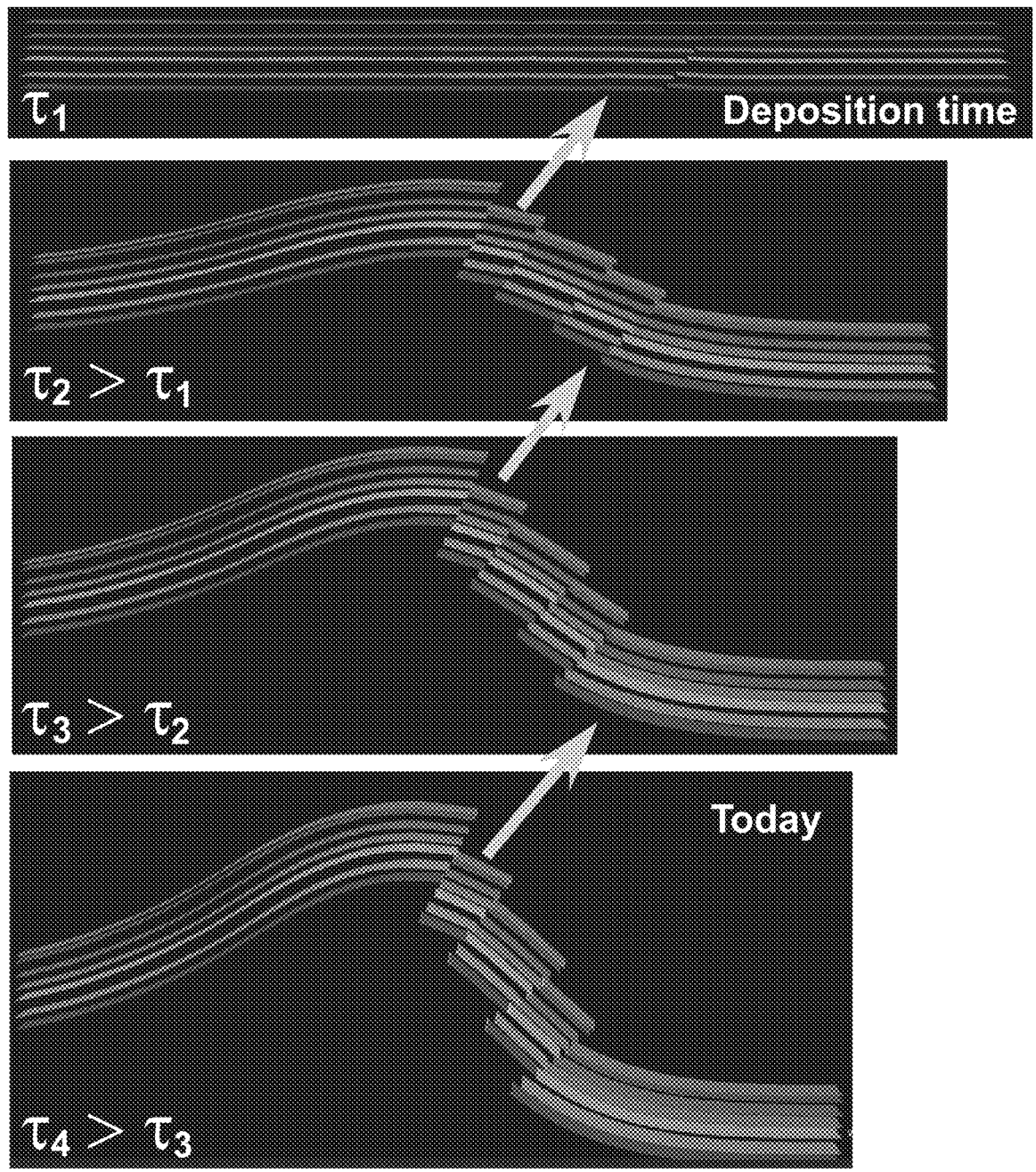
FIG. 13 schematically illustrates an example display of a sequential chronological transformation of a vertical cross section of a 3D subsurface model according to an embodiment of the invention. Chronological transformation may correspond to a plurality of restoration times $\tau_i$ ordered in a sequence either "forward modeling" according to a forward passage of time (e.g., with sequentially ascending or later values of time) or "restoration" according to a reverse passage of time (e.g., with sequentially descending or earlier values of time). In the example shown in FIG. 13, the sequence of chronological transformation progresses according to a forward passage of time, from the start of deposition at earliest geological time $\tau$, to one or more subsequent intermediate restorations times $\tau_2 < \tau_3$, to a latest present day geological time $\tau_4$ (although the sequence may progress according to the reverse passage of time). Further, any other number or orders of restorations or times may be used).

Display 180 may display data from transmitter 190, receiver 120, or computing system 130 or any other suitable systems, devices, or programs, for example, an imaging program or a transmitter or receiver tracking device. Display 180 may include one or more inputs or outputs for displaying data from multiple data sources or to multiple displays. For example, display 180 may display visualizations of subsurface models including subsurface features, such as faults, horizons and unconformities, as a present day subsurface image (e.g., 202), a restored subsurface image (e.g., 203) and/or a depositional model (e.g., 703). Display 180 may display one or more present day model(s), depositional model(s), restoration model(s), as well as a series of chronologically sequential restoration models associated with a sequence of respective restoration times (e.g., $\tau_1 < \tau_2 < \tau_3 < \tau_4$, as shown in FIG. 13). The models may be displayed one at a time, two at a time, or many at a time (e.g., the number selected by a user or automatically based on the difference between models or the total number of models). Display 180 may display the models in a sequence of adjacent models, through which a user may scan (e.g., by clicking a 'next' or 'previous' button with a pointing device such as a mouse or by scrolling through the models).

Input device(s) 165 may include a keyboard, pointing device (e.g., mouse, trackball, pen, touch screen), or cursor direction keys, for communicating information and command selections to processor 140. Input device 165 may communicate user direction information and command selections to the processor 140. For example, a user may use input device 165 to select one or more preferred models from among the plurality of perturbed models, recategorize faults as τ-active faults and τ-inactive, or edit, add or delete subsurface structures.

Processor 140 may include, for example, one or more processors, controllers or central processing units ("CPUs"). Software 160 may be stored, for example, in memory 150. Software 160 may include any suitable software, for example, DSI software.

Processor 140 may generate a present day subsurface image (e.g., 202), a restored subsurface image (e.g., 203) and/or a depositional model (e.g., 703), for example, using data 155 from memory 150. In one embodiment, a model may simulate structural, spatial or geological properties of a subsurface region, such as, porosity or permeability through geological terrains.

Processor 140 may initially generate a three dimensional mesh, lattice, grid or collection of nodes (e.g., 100) that spans or covers a domain of interest. The domain may cover a portion or entirety of the three-dimensional subsurface region being modeled. Processor 140 may automatically compute the domain to be modeled and the corresponding mesh based on the collected seismic data so that the mesh covers a portion or the entirety of the three-dimensional subsurface region from which geological data is collected (e.g., the studied subsurface region). Alternatively or additionally, the domain or mesh may be selected or modified by a user, for example, entering coordinates or highlighting regions of a simulated optional domain or mesh. For example, the user may select a domain or mesh to model a region of the Earth that is greater than a user-selected subsurface distance (e.g., 100 meters) below the Earth's surface, a domain that occurs relative to geological features (e.g., to one side of a known fault or riverbed), or a domain that occurs relative to modeled structures (e.g., between modeled horizons $H(t_1)$ and $H(t_{100})$). Processor 140 may execute software 160 to partition the mesh or domain into a plurality of three-dimensional (3D) cells, columns, or other modeled data (e.g., represented by voxels, pixels, data points, bits and bytes, computer code or functions stored in memory 150). The cells or voxels may have hexahedral, tetrahedral, or any other polygonal shapes, and preferably three-dimensional shapes. Alternatively, data may include zero-dimensional nodes, one-dimensional segments, two-dimensional facet and three-dimensional elements of volume, staggered in a three-dimensional space to form three-dimensional data structures, such as cells, columns or voxels. The cells preferably conform to and approximate the orientation of faults and unconformities. Each cell may include faces, edges and/or vertices. Each cell or node may correspond to one or more particles of sediment in the Earth (e.g., a node may include many cubic meters of earth, and thus many particles).

Data collected by receiver 120 after the time of deposition in a current or present time period, include faults and unconformities that have developed since the original time of deposition, e.g., based on tectonic motion, erosion, or other environmental factors, may disrupt the regular structure of the geological domain. Accordingly, an irregular mesh may be used to model current geological structures, for example, so that at least some faces, edges, or surfaces of cells are oriented parallel to faults and unconformities, and are not intersected thereby. In one embodiment, a mesh may be generated based on data collected by receiver 120, alternatively, a generic mesh may be generated to span the domain and the data collected by receiver 120 may be used to modify the structure thereof. For example, the data collected may be used to generate a set of point values at "sampling point". The values at these points may reorient the nodes or cells of the mesh to generate a model that spatially or otherwise represents the geological data collected from the Earth. Other or different structures, data points, or sequences of steps may be used to process collected geological data to generate a model. The various processes described herein (e.g., restoring a geological model using τ-active and τ-inactive faults, or restoring a geological model using a new thickness-preserving constraint) may be performed by manipulating such modeling data.

Restoration coordinates may be defined at a finite number of nodes or sampling points based on real data corresponding to a subsurface structure, e.g., one or more particles or a volume of particles of Earth. Restoration coordinates may be approximated between nodes to continuously represent the subsurface structure, or alternatively, depending on the resolution in which the data is modeled may represent discrete or periodic subsurface structures, e.g., particles or volumes of Earth that are spaced from each other.

The computing system of FIG. 15 may accept the data used in the operations of FIGS. 16 and 17 as for example a set of data generated by tomographic scanning of a subsurface geological region of the Earth as disclosed in reference to FIG. 14, or such data augmented by another process. The computing system may accept one or more of seismic and well data. The computing device may generate one or more of seismic and well data.

"Restoration" or "intermediate" time τ may refer to a time in the past before the present day and after a time when an oldest or deepest horizon surface in the 3D model was deposited. "Restoration" or "intermediate" transformation or model may refer to a model or image of the surface as it was configured at the "intermediate" time in the past τ. An intermediate horizon may refer to a horizon that was deposited at the "intermediate" time τ, which is located above the deepest horizon and below the shallowest horizon.

"Time" including the present-day, current or present time, the past restoration time τ, and/or the depositional time t, may refer to geological time periods that span a duration of time, such as, periods of thousands or millions of years.

"Geological-time" $t(r)$ may refer to the time of deposition when a particle of sediment represented by point r was originally deposited in the Earth. In some embodiments, the geological-time of the deposition may be replaced, e.g., by any arbitrary monotonic increasing function of the actual geological-time. It is a convention to use an monotonically increasing function, but similarly an arbitrary monotonic decreasing function may be used. The monotonic function may be referred to as the "pseudo-geological-time".

The geological-time of the deposition and restoration time of particles are predicted approximate positions since past configurations can not typically be verified.

"Current" or "present day" location for a particle (or data structure representing one or more particles) or subsurface feature may refer to the location of the item in the present time, as it is measured.

In stratified terrain, layers, horizons, faults and unconformities may be curvilinear surfaces which may be for example characterized as follows.

A horizon, Hτ, may be a surface corresponding to a plurality of particles of sediment which were deposited approximately at substantially the same geological-time, τ.

A fault may be a surface of discontinuity of the horizons that may have been induced by a relative displacement of terrains on both sides of such surfaces. In other words, the geological-time of deposition of the sediments is discontinuous across each fault. Faults may cut horizons and may also cut other faults.

An unconformity may be a surface of discontinuity of the horizons that may have been induced by for example an erosion of old terrains replaced by new ones. In other words, similarly to faults, the geological-time of deposition of the sediments is discontinuous across each unconformity.

Terrain deformed in the neighborhood of a point r in the G-space may occur according to a "minimal deformation" tectonic style when, in this neighborhood:
 the strain tensor is approximately equal to the null tensor.
Terrain deformed in the neighborhood of a point r in the G-space may occur according to a "flexural slip" tectonic style when, in this neighborhood:
 the length of any small increment of distance $d(r)$ on the horizon passing through point r is preserved, e.g., in any direction, and,
 the volume of the terrains in the neighborhood of point r does not vary.

Discrete-Smooth-Interpolation (DSI) is a method for interpolating or approximating values of a function $f(x,y,z)$ at nodes of a 3D grid or mesh Γ (e.g., 100), while honoring a given set of constraints. The DSI method allows properties of structures to be modeled by embedding data associated therewith in a (e.g., 3D Euclidean) modeled space. The function $f(x,y,z)$ may be defined by values at the nodes of the mesh, Γ. The DSI method allows the values of $f(x,y,z)$ to be computed at the nodes of the mesh, Γ, so that a set of one or more (e.g., linear) constraints are satisfied. DSI generally only applies linear constraints on the model.

In some embodiments, bold symbols represent vectors or multi-dimensional (e.g., 3D) functions or data structures.

In some embodiments, the "simeq" symbol "≅" or "≅" may mean approximately equal to, e.g., within 1-10% of, or in a least squares sense. In some embodiments, the symbol "≡" may mean identical to, or defined to be equal to.

While embodiments of the invention describe the input depositional model as the GeoChron model, any other depositional model visualizing the predicted configuration of each particle, region or layer at its respective time of depositional may be used.

While embodiments of the invention describe the present day coordinates as xyz, the restoration coordinates as $u_\tau v_\tau i_\tau$, the depositional coordinates as uvt, the restoration transformation as a $u_\tau v_\tau i_\tau$-transform, and the depositional transformation as a uvt-transform, any other coordinates or transformations may be used.

In the foregoing description, various aspects of the present invention have been described. For purposes of explanation, specific configurations and details have been set forth in order to provide a thorough understanding of the present invention. However, it will also be apparent to one skilled in the art that the present invention may be practiced without the specific details presented herein. Furthermore, well known features may have been omitted or simplified in order not to obscure the present invention. Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the invention may manipulate data representations of real-world objects and entities such as underground geological features, including faults and other features. The data may be generated by tomographic scanning, as discussed in reference to FIG. 14, e.g., received by for example a receiver receiving waves generated e.g., by an air gun or explosives, that may be manipulated and stored, e.g., in memory 150 of FIG. 15, and data such as images representing underground features may be presented to a user, e.g., as a visualization on display 180 of FIG. 15.

When used herein, a subsurface image or model may refer to a computer-representation or visualization of actual geological features such as horizons and faults that exist in the real world. Some features when represented in a computing device may be approximations or estimates of a real world feature, or a virtual or idealized feature, such as an idealized horizon as produced in a $u_\tau$ $v_\tau$ $t_\tau$-transform. A model, or a model representing subsurface features or the location of those features, is typically an estimate or a "model", which may approximate or estimate the physical subsurface structure being modeled with more or less accuracy.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

The invention claimed is:

1. A method for restoring a 3D model of the subsurface geology of the Earth from a present day geometry measured at a present time to a predicted past geometry at a past restoration time, the method comprising:
receiving the 3D model of the present day measured geometry comprising a network of faults, wherein a fault is a discontinuity that divides fault blocks that slide in opposite directions tangential to the surface of the fault as time approaches a modeled time;
selecting a past restoration time $\tau$ that is prior to the present time and after a time when an oldest horizon surface in the 3D model was originally deposited;
dividing the network of faults into a subset of $\tau$-active faults and a subset of $\tau$-inactive faults, wherein a $\tau$-active fault is a fault that is active at the past restoration time $\tau$ and a $\tau$-inactive fault is a fault that is inactive at the past restoration time $\tau$, wherein a fault is determined to be $\tau$-active when the fault intersects a horizon $H_\tau$ that was originally deposited at the past restoration time $\tau$ and a fault is determined to be $\tau$-inactive when the fault does not intersect the horizon $H_\tau$ that was originally deposited at the past restoration time $\tau$;
restoring the 3D model from the present day measured geometry to the predicted past geometry at the past restoration time $\tau$ by:
modeling each $\tau$-active fault to join end points of a horizon $H_\tau$ separated on opposite sides of the fault in the present day model to merge into the same position in the restored model by sliding the end points towards each other in a direction tangential to the surface of the $\tau$-active fault; and
modeling each $\tau$-inactive fault to keep collocated points on opposite sides of the fault together.

2. The method of claim 1 comprising displaying a visualization of an image of the subsurface geology of the Earth overlaid with $\tau$-active faults and $\tau$-inactive faults in the restored model at past restoration time $\tau$.

3. The method of claim 2 comprising displaying the $\tau$-active faults with different levels of translucency or different colors from the $\tau$-inactive faults.

4. The method of claim 1, wherein a $\tau$-inactive fault is a surface in which the discontinuity induced by the fault has been deactivated to prevent fault blocks from sliding in directions tangential to the surface of the fault as time approaches the restoration time $\tau$.

5. The method of claim 1, wherein the present day model has iso-value surfaces of each coordinate of a 3D restoration to a past restored model of the subsurface geology at a past restoration time $\tau$, wherein the iso-value surfaces are continuous across $\tau$-inactive faults and discontinuous across $\tau$-active faults.

6. The method of claim 1 comprising, at restoration time $\tau$, flattening the horizon $H_\tau$ that was originally deposited at time $\tau$ to a substantially planar surface of approximately constant depth.

7. The method of claim 6 wherein horizons older than horizon $H_\tau$ are restored to non-planar surfaces.

8. The method of claim 1 wherein restoring the 3D model to a past restoration time $\tau$ comprises eliminating all relatively shallower horizon surfaces that were originally deposited after the past restoration time $\tau$.

9. The method of claim 1, wherein a fault that is $\tau$-active at a first restoration time $\tau'$ is $\tau$-inactive at a second restoration time $\tau''$.

10. The method of claim 1 comprising sequentially restoring the 3D model to a sequence of past restoration times $\tau_1$, $\tau_2$, ..., $\tau_n$, wherein each of a plurality of the sequence of past restoration times has a different subset of $\tau$-active and $\tau$-inactive faults.

11. The method of claim 10 comprising playing a moving image sequence in which the 3D model is iteratively restored in a forward or reverse order of the sequence of past restoration times $\tau_1$, $\tau_2$, ..., $\tau_n$ to visualize changes in the subsurface geology over the passage of time.

12. A system for restoring a 3D model of the subsurface geology of the Earth from a present day geometry measured at a present time to a predicted past geometry at a past restoration time, the system comprising:
one or more processors configured to: receive the 3D model of the present day measured geometry comprising a network of faults, wherein a fault is a discontinuity that divides fault blocks that slide in opposite directions tangential to the surface of the fault as time approaches a modeled time,
select a past restoration time $\tau$ that is prior to the present time and after a time when an oldest horizon surface in the 3D model was originally deposited,
divide the network of faults into a subset of $\tau$-active faults and a subset of $\tau$-inactive faults, wherein a $\tau$-active fault is a fault that is active at the past restoration time $\tau$ and a $\tau$-inactive fault is a fault that is inactive at the past restoration time $\tau$, wherein the one or more processors determine a fault to be $\tau$-active when the fault intersects a horizon $H_\tau$ that was originally deposited at the past restoration time τ and determine a fault to be τ-inactive when the fault does not intersect the horizon $H_\tau$ that was originally deposited at the past restoration time τ, restore the 3D model from the present day measured geometry to the predicted past geometry at the past restoration time τ by:

modeling each τ-active fault to join end points of a horizon $H_\tau$ separated on opposite sides of the fault in the present day model to merge into the same position in the restored model by sliding the end points towards each other in a direction tangential to the surface of the τ-active fault, and modeling each τ-inactive fault to keep collocated points on opposite sides of the fault together.

13. The system of claim 12 comprising a display configured to visualize an image of the subsurface geology of the Earth overlaid with τ-active faults and τ-inactive faults in the restored model at time τ.

14. The system of claim 13 wherein the display is configured to visualize the τ-active faults with different levels of translucency or different colors from the τ-inactive faults.

15. The system of claim 12, wherein the one or more processors are configured to deactivate the discontinuity induced by the τ-inactive fault to prevent fault blocks from sliding in directions tangential to the surface of the fault as time approaches the restoration time τ.

16. The system of claim 12, wherein the one or more processors are configured to generate the present day model to have iso-value surfaces of each coordinate of a 3D restoration to a past restored model of the subsurface geology at a past restoration time τ, wherein the iso-value surfaces are continuous across τ-inactive faults and discontinuous across τ-active faults.

17. The system of claim 12, wherein the one or more processors are configured to, for restoration time τ, flatten the horizon $H_\tau$ that was originally deposited at time τ to a substantially planar surface of approximately constant depth.

18. The system of claim 12, wherein the one or more processors are configured to restore horizons older than horizon $H_\tau$ to non-planar surfaces.

19. The system of claim 12, wherein the one or more processors are configured to restore the 3D model to a past restoration time τ by eliminating all relatively shallower horizon surfaces that were originally deposited after the past restoration time τ.

20. The system of claim 12, wherein the one or more processors are configured to model a fault as τ-active at a first restoration time τ' and as τ-inactive at a second restoration time τ".

21. The system of claim 12, wherein the one or more processors are configured to sequentially restore the 3D model to a sequence of past restoration times $\tau_1, \tau_2, \ldots, \tau_n$, wherein each of a plurality of the sequence of past restoration times has a different subset of τ-active and τ-inactive faults.

22. The system of claim 21, wherein the one or more processors are configured to play a moving image sequence in which the 3D model is iteratively restored in a forward or reverse order of the sequence of past restoration times $\tau_1, \tau_2, \ldots, \tau_n$ to visualize changes in the subsurface geology over the passage of time.

\* \* \* \* \*